US012654958B2

(12) United States Patent
Hickman et al.

(10) Patent No.: US 12,654,958 B2
(45) Date of Patent: Jun. 16, 2026

(54) AUTONOMOUS DEVICES, SYSTEMS, AND METHODS FOR QUEUING FOLDED LAUNDRY

(71) Applicant: Monotony.ai, Inc., Watertown, MA (US)

(72) Inventors: Madeline R. Hickman, Arlington, MA (US); Samuel Duffley, Somerville, MA (US); Jesse Sielaff, Norfolk, MA (US); Benjamin D. Bixby, Newton Highlands, MA (US)

( * ) Notice: Subject to any disclaimer, the term of this patent is extended or adjusted under 35 U.S.C. 154(b) by 0 days.

(21) Appl. No.: 19/053,801

(22) Filed: Feb. 14, 2025

(65) Prior Publication Data

US 2025/0187856 A1     Jun. 12, 2025

Related U.S. Application Data

(63) Continuation of application No. 18/530,845, filed on Dec. 6, 2023, now Pat. No. 12,258,228, which is a
(Continued)

(51) Int. Cl.
*B65G 65/16* (2006.01)
*B65B 25/20* (2006.01)
(Continued)

(52) U.S. Cl.
CPC .............. *B65G 65/16* (2013.01); *B65B 25/20* (2013.01); *B65B 35/44* (2013.01); *B65B 35/50* (2013.01);
(Continued)

(58) Field of Classification Search
CPC ......... B65B 35/44; B65B 25/20; B65B 35/50; B65G 65/16; D06F 31/00
See application file for complete search history.

(56) References Cited

U.S. PATENT DOCUMENTS 3,967,716 A     7/1976 Smith
4,002,560 A     1/1977 Grantham
(Continued)

FOREIGN PATENT DOCUMENTS

CN     109365308 A     2/2019
CN     110595355 A     12/2019
EP     1012086 B1     12/2001

OTHER PUBLICATIONS

International Search Report and Written Opinion corresponding to PCT/US2021/057203; Mailed: Feb. 16, 2022, (14 pages).
(Continued)

*Primary Examiner* — Veronica Martin
(74) *Attorney, Agent, or Firm* — Myers Bigel, P.A.

(57) ABSTRACT

Devices, systems, and methods for autonomously stacking and compressing a plurality of unbound folded laundry articles in a packing queue are described. A method includes receiving output signal from one or more sensors determinative of the height of an unbound folded laundry article disposed on a conveyor configured to deposit the unbound folded laundry article atop one or more previously deposited one or more unbound folded laundry articles disposed on the packing queue platform; receiving an output signal determinative of a height of the previously deposited one or more unbound folded laundry articles; calculating a final stack height; depositing in a stack the folded laundry article atop the previously deposited one or more folded laundry articles upon determining the final stack height will not exceed a threshold height; and compressing the stack to a final stack height at or below the threshold height for compact loading into a container.

20 Claims, 42 Drawing Sheets

Related U.S. Application Data continuation of application No. 17/514,109, filed on Oct. 29, 2021, now Pat. No. 11,873,174.

(60) Provisional application No. 63/168,540, filed on Mar. 31, 2021, provisional application No. 63/168,555, filed on Mar. 31, 2021, provisional application No. 63/106,891, filed on Oct. 29, 2020.

(51) Int. Cl.

| | |
|---|---|
| *B65B 35/44* | (2006.01) |
| *B65B 35/50* | (2006.01) |
| *B65B 57/10* | (2006.01) |
| *B65B 59/00* | (2006.01) |
| *B65G 57/03* | (2006.01) |
| *B65G 65/00* | (2006.01) |
| *B65G 65/32* | (2006.01) |
| *B65G 69/02* | (2006.01) |
| *D06F 95/00* | (2006.01) |

(52) U.S. Cl.
CPC .............. *B65B 57/10* (2013.01); *B65B 59/00* (2013.01); *B65G 57/03* (2013.01); *B65G 65/005* (2013.01); *B65G 65/32* (2013.01); *B65G 69/02* (2013.01); *D06F 95/00* (2013.01); *B65G 2201/0229* (2013.01); *B65G 2203/0208* (2013.01); *B65G 2203/0283* (2013.01); *B65G 2203/041* (2013.01); *B65G 2814/0305* (2013.01); *B65G 2814/0331* (2013.01)

(56) References Cited

U.S. PATENT DOCUMENTS

| | | | |
|---|---|---|---|
| 4,124,967 A | 11/1978 | Beer et al. | |
| 4,765,487 A | 8/1988 | Bliss | |
| 4,854,111 A | 8/1989 | Roberts et al. | |
| 4,862,677 A | 9/1989 | Roberts et al. | |
| 6,122,895 A | 9/2000 | Schubert | |
| 6,227,377 B1 * | 5/2001 | Bonnet .................. | B65G 21/12 |
| | | | 209/941 |
| 7,814,733 B2 | 10/2010 | Carlson et al. | |
| 10,287,048 B2 | 5/2019 | Sytema et al. | |
| 10,882,705 B2 | 1/2021 | Overley | |
| 2001/0040107 A1 | 11/2001 | Tourre et al. | |
| 2003/0019798 A1 | 1/2003 | Capps et al. | |
| 2007/0209327 A1 | 9/2007 | Kent et al. | |
| 2009/0266037 A1 | 10/2009 | Odman et al. | |
| 2010/0230432 A1 | 9/2010 | Cardinal et al. | |
| 2012/0191240 A1 | 7/2012 | Gilmore | |
| 2016/0135510 A1 | 5/2016 | Ay | |
| 2016/0145055 A1 | 5/2016 | Sielermann et al. | |
| 2017/0321372 A1 | 11/2017 | Powell et al. | |
| 2018/0061255 A1 | 3/2018 | Ekambaram et al. | |
| 2019/0286138 A1 | 9/2019 | Skaaksrud et al. | |
| 2019/0287051 A1 | 9/2019 | Heinla | |
| 2020/0193336 A1 | 6/2020 | Capoia et al. | |
| 2020/0207550 A1 | 7/2020 | De Boer et al. | |
| 2020/0331645 A1 | 10/2020 | Almogy et al. | |
| 2020/0346792 A1 | 11/2020 | Curhan et al. | |
| 2020/0356951 A1 | 11/2020 | Cristache | |
| 2020/0376668 A1 | 12/2020 | Russell | |
| 2020/0407088 A1 | 12/2020 | White et al. | |
| 2021/0004646 A1 | 1/2021 | Guizilini et al. | |

OTHER PUBLICATIONS

Dekken Machinery, "T-Apparel—Folding & Packing Solution for Garment", YouTube Video—https://www.youtube.com/watch?v=wfn8DpXENms, Apr. 25, 2018.

Flexitechs APS, "Pullnose, Pull Nose, Conveyor", YouTube video retrieved from: https://www.youtube.com/watch?v=Wr3wlcO21D0, Nov. 13, 2013, (1 page).

Grenaamontage, "Pullnose, Pull nose, Conveyor, Teleskop conveyor, Teleskoptransportører", YouTube Video—https://www.youtube.com/watch?v=_DEqMz1SdTc, Jan. 21, 2014.

Ingenia Solutions Ltd, "Automated Box Packing System", YouTube Video—https://www.youtube.com/watch?v=qNF2vcOdQ04, Nov. 18, 2010.

INWATEC, "#Laundrynerds Expert Session: GREIT Stack Storage & Pack-Out System (Live Stream 2)", YouTube Video—https://www.youtube.com/watch?v=OchpR3VfUWo Streamed live on May 27, 2020.

INWATEC, "Automatic Linen Buffer and Storage", YouTube Video—https://www.youtube.com/watch?v=RthX_GzYXk0, May 18, 2018.

Lahooti Printech Pvt. Ltd., "N Fold Hand Towel Paper Packing Machine | N fold Tissue Packing Machine", YouTube Video—https://www.youtube.com/watch?v=wTARKYfzK6Y, Jan. 24, 2020.

Napkin Machine Manufacturer, "M Fold Paper Towel Machine with Automatic Packing Machine Line", YouTube Video—https://www.youtube.com/watch?v=O1DYItFHEKM, Aug. 1, 2019.

Pan, Darren, "Automatic Tissue Paper Napkin Packing Machine", YouTube Video—https://www.youtube.com/watch?v=Y5QZVjr-5rU, Apr. 24, 2019.

Paschalidis, George, "T-shirt Automatic Folding & Stacking Machine (FX23)", YouTube Video—https://www.youtube.com/watch?v=_uCL1e4j2PE, Jun. 17, 2010.

Proship, Inc., "CVP Automated Packaging Solution", YouTube Video—https://www.youtube.com/watch?v=0oe24YsavF8, Jun. 28, 2018.

Ryonet, "ROQ Fold, ROQ Pack and ROQ Stack Automatic Folding Machine", YouTube Video—https://www.youtube.com/watch?v=8X6mlKmulKQ, Mar. 28, 2017.

* cited by examiner

AUTONOMOUS DEVICES, SYSTEMS, AND METHODS FOR QUEUING FOLDED LAUNDRY

CROSS-REFERENCE TO RELATED APPLICATIONS

This application is a continuation application of U.S. patent application Ser. No. 18/530,845 filed Dec. 6, 2023, titled, "AUTONOMOUS DEVICES, SYSTEMS, AND METHODS FOR QUEUING FOLDED LAUNDRY,", which is a continuation application of U.S. Pat. No. 11,873, 174 issued Dec. 27, 2023, titled, "AUTONOMOUS DEVICES, SYSTEMS, AND METHODS FOR QUEUING FOLDED LAUNDRY," which in turn claims priority under 35 U.S.C. § 119(e) to U.S. Provisional Patent Application Ser. No. 63/168,555 filed Mar. 31, 2021, titled "Autonomous Devices, Systems, and Methods For Queuing Folded Laundry," U.S. Provisional Patent Application Ser. No. 63/168, 540 filed Mar. 31, 2021, titled "Autonomous Devices, Systems, and Methods For Packing Folded Laundry," and U.S. Provisional Patent Application Ser. No. 63/106,891 filed Oct. 29, 2020, titled "Autonomous Devices, Systems, And Methods For Handling Folded Laundry," the entirety of each of which applications is hereby incorporated by reference.

BACKGROUND

The present disclosure is directed to robotic laundry devices, systems, and methods.

Automating and outsourcing mundane, time-consuming household chores to robotic devices is increasingly common. Time-saving home robots include, for example, floor vacuuming and floor washing robots. Outsourcing responsibilities include, for example, engaging grocery shopping and delivery, and manually operated and human-operator dependent laundry washing and dry-cleaning pick up and return services.

Many homes are appointed with a dedicated washer and dryer for family use. Domestic washers and dryers are increasingly sophisticated and include IoT connectivity features and push notifications for alerting users about cycle progress and energy and resource usage. These technologically advanced machines, however, require human interaction and cannot eliminate the time required for processing loads of laundry in the home. Although more modern, "high efficiency" machines are equipped with sensors for metering water usage and dryer temperatures, the efficiency gains are capped by the constraints of sequentially processing single loads of laundry. Grey water is output to the city water and sewer system for mitigation with each load of laundry processed. Energy is consumed with each load of laundry washed and dried.

Households can outsource laundry chores to laundromat facilities for a fee in exchange for time. Laundromats offering residential mixed load laundering services, however, require human interaction for intake and sorting of dirty laundry, transferring loads from washer to dryer, and then manually folding and repacking clean laundry. These are costly processes as measured in time, energy consumption, water consumption, and wastewater output, and they rely on human intervention to keep the process running at every transition and throughout several process steps. This invites delays at every stage. Because these processes are human-dependent and inefficient, the costs are passed along to the customers outsourcing their laundry for cleaning. Human-reliant laundering services also require that employees touch the belongings of the customer, potentially exposing the employee to contaminants in the dirty laundry and potentially exposing the clean laundry to transferable pathogens, dust, hair, and other debris emanating from a laundromat employee. In addition to potentially introducing undesirable contact contamination from the employees processing the loads of laundry, a privacy barrier is breached. Outsourcing household laundry to a laundromat involves employees interacting with customers' personal belongings including bodily worn garments.

Industrial laundry services exist for handling uniform business-related items, such as hospital bed sheets, medical scrubs, and hotel towels. Such industrial machines are tailor-made to accept one type of laundry item of one size or style. For example, unique folding machines exist to accept washed flat sheets, fitted sheets, hotel towels, and hotel bathrobes. These machines require human operators to load the washed article into its dedicated machine, which is sized and designed to fold that one type and size of article. This type of process line relies on a human operator for properly aligning and loading the clean article into the machine, which could introduce bodily contaminants, bacteria, and viral matter into the clean articles. Like laundromat services, these industrial services rely on human intervention and potentially introduce bio-contaminants into clean loads of laundry. Because these services are only profitable by processing large volumes of like items, these industrial processors are generally subscription-based services for large clients like hotels and hospitals producing standard-size, repeat laundry articles and are not available to consumers at an individual household level. Additionally, these services are configured to combine laundry from more than one source and are not configured to isolate and process separate loads for individual households.

Autonomous robotic devices are needed to process loads of household laundry. Such devices eliminate human contact with deformable laundry articles and autonomously process batches of disparate article types and sizes. As such, the devices need to be designed to be efficient and reliable for replacing the common, human-dependent chore of laundry.

SUMMARY

In one example, a method of autonomously arranging a plurality of folded household laundry articles in a packing queue includes identifying an edge of a folded laundry article disposed on a surface, positioning a retrieving end of a conveyor in contact with the identified edge of the folded laundry article, rotating a conveyor surface in contact with the edge of the folded laundry article to retrieve the folded laundry article onto the conveyor and positioning the folded article adjacent a depositing end, receiving data indicative of at least two of an area footprint of the folded laundry article, an orientation of the area footprint relative to a longitudinal axis of the packing queue, a height of the folded laundry article, and an article type, selecting, based on the received data, a queue location along a length of a packing queue platform at which to deposit the folded laundry article, moving the conveyor at least one of vertically and laterally to align the depositing end with the selected queue location along the length of the packing queue platform, and cantilevering the depositing end of the conveyor over the packing queue platform to deposit the folded laundry article into the packing queue at the selected queue location.

Implementations of the method may include one or more of the following features.

In examples, the method includes an orienter preceding the conveyor receiving the folded laundry article from an autonomous folding device and rotating the folded laundry article such that the edge is oriented substantially parallel to the retrieving end. In examples, the received data is configured to be processed by at least one controller in communication with one or more sensors disposed proximate at least one of the autonomous folding device and the orienter. The one or more sensors include an optical sensor. In examples, the sensor includes at least one of a 3-D camera, an IR sensor, a 2-D camera, LIDAR, LADAR, a sonar proximity sensor, an ultrasonic ranging sensor, a radar sensor, and a pair of stereo depth cameras. Identifying the edge of the folded laundry article can include detecting with the one or more sensors a position and location of the edge relative to a known retrieving end orientation and location.

In examples, the received data is configured to be communicated via a wired or wireless communication network to at least one controller in operable communication with one or more drives of the conveyor, a conveyor cantilever motor, and a conveyor gantry. In examples, the method further includes executing, by the at least one controller, a set of instructions in operable communication with the drives and one or more position sensors. In examples, the retrieving end and the depositing end are substantially parallel to a longitudinal axis of the packing queue platform, and the one or more drives includes an elevator drive configured to raise and lower the conveyor vertically and a cantilever drive configured to slide the conveyor forward and backward toward and away from the packing queue platform. The cantilever drive is in operable communication with a cantilever drive motor configured engage a support carriage of the conveyor. In examples, positioning further includes instructing at least one of an elevator drive and a cantilever drive to position the retrieving end at a height in a range of between about 0.25 mm to 10 mm above the surface.

In examples, the one or more drives of the conveyor gantry includes a rail drive configured to move the conveyor laterally along a fixed rail to the selected queue location, and the fixed rail is substantially parallel to the packing queue platform. In examples, the method further includes receiving an output signal from at least positional one encoder determinative of a relative position of the conveyor along a length of the fixed rail.

In examples, depositing the folded laundry article into the packing queue further includes cantilevering the depositing end of the conveyor over the platform at selected queue location and instructing a conveyor drive to rotate the conveyor surface. The method can further include receiving a sensor signal indicative of the folded laundry article being proximate the depositing end and reversing the cantilevering direction. The sensor signal includes an output of one or more sensors disposed at least one of on the conveyor gantry and proximate the packing queue platform. In examples, the one or more sensors include an optical sensor. The sensor can include at least one of a 3-D camera, an IR sensor, a 2-D camera, LIDAR, LADAR, a sonar proximity sensor, an ultrasonic ranging sensor, a radar sensor, and a pair of stereo depth cameras.

In examples, depositing the folded laundry article into the packing queue include at least one of depositing the folded laundry article onto the packing queue platform and depositing the folded laundry article atop at least one other of the plurality of folded household laundry articles disposed on the packing queue platform. In examples, depositing further includes instructing at least one of an elevator drive and a cantilever drive to position the depositing edge at a height in a range of between about 0.25 mm to 10 mm above a surface of either the packing queue platform or the at least one other of the plurality of folded household laundry articles disposed on the packing queue platform. Aligning the depositing end with the selected queue location along the length of the packing queue platform can further include aligning the depositing end with a top surface of the at least one other of the plurality of folded household laundry articles. In examples, the depositing further includes identifying, based on the received sensor signal, at least one of an area footprint and a centroid of the at least one other of the plurality of folded laundry articles, and the method further includes determining, based on the received sensor signal, a centroid of the folded laundry article and depositing the at least one folded laundry article atop the at least one other of the plurality of folded laundry articles such that the centroids align. In examples, the method further includes depositing the folded laundry article atop the at least one other of the plurality of folded laundry articles such that the area footprint of the folded laundry article aligns with the area footprint of the at least one other of the plurality of folded laundry articles.

Depositing can further include detecting, based on the received sensor signal, a sloped receiving surface of the at least one other folded laundry article and depositing thereon a folded laundry article including an oppositely sloped top surface. In examples, the controller is further configured, based on a received sensor signal indicative of a tilted stack of folded laundry articles disposed on the queue platform, to instruct an orienter to rotate a folded laundry article such that a tilt of the folded laundry article is opposite that of the tilted stack of folded laundry articles.

In examples, the method further includes detecting, based on the received sensor signal, a height of a stack including the folded laundry article and at least one other of the plurality of folded household laundry articles. The method can further include lowering one or more compression plungers disposed on the conveyor gantry, the one or more compression plungers being configured to compress the stack. In any of the examples, the method further includes calculating a final stack height based on received data indicative of a height of the folded laundry article and a detected height of the at least one other of the plurality of folded household laundry articles and determining the final stack height will not exceed a threshold height range. The threshold height can include a range of between about 25 cm to 65 cm.

In examples, the stack is one of a plurality of stacks disposed on the packing queue platform. The queue platform can include two parallel conveyors and the plurality of stacks are laterally spaced and staggered between near and far ones of the two parallel conveyors. In examples, each pairing of staggered stacks includes substantially even stack heights. The plurality of stacks can be laterally spaced between adjacent predetermined locations such that the conveyor cantilevered above the queue platform avoids contacting one or more adjacent stacks. In examples, the lateral spacing is at least 8 mm.

In examples, the packing queue platform includes at least one movable conveyor configured to move a plurality of folded laundry articles thereon toward a packing cartridge. In examples, the folded laundry article area footprint includes one of a plurality of predetermined folded article area footprints. In examples, selecting a packing queue location includes selecting from a plurality of predetermined locations along the packing queue platform at which to depositing the folded laundry article such that an ordered packing queue fills a smallest number of packing boxes.

In examples, the received data includes an article type and an article size of the folded laundry article and one or more article types and one or more article sizes of each of the plurality of household laundry articles to be folded subsequently. In examples, the one or more article types and one or more articles sizes of the plurality of household laundry articles are detected by sensors of one or more preceding autonomous devices including at least one of an autonomous folding device and at least one autonomous separating device configured to separate individual items from the plurality of household laundry articles. In examples, selecting a queue location includes receiving from a controller in operable communication with the one or more preceding autonomous devices a predetermined queue location for each one of the plurality of household laundry articles based on detected quantities of each article type and size preceding the packing queue platform and a predicted folded article area footprint for each one of plurality of household laundry items.

In examples, the plurality of folded laundry articles are sorted into at least one of article type and area footprint on the queue platform and the at least one of article type, and the area footprint is duplicated in each one of two parallel queues disposed on the queue conveyor such the each one of the plurality of folded household laundry articles can be placed in either of the two parallel queues. In examples, the method further includes sorting the plurality of folded household laundry articles during loading onto the packing queue platform based on a cumulative height of each of the two parallel queues from a refillable cartridge end to an opposite end of the queue. The queue platform can include at least one conveyor configured to move a plurality of folded laundry articles thereon toward a packing cartridge.

In examples, the packing queue platform includes a movable conveyor configured to move a plurality of folded laundry articles thereon toward a packing cartridge.

In examples, the folded laundry article area footprint includes one of a plurality of predetermined folded article area footprints.

In examples, the folded laundry article is one of the plurality of folded household laundry articles. The plurality of folded household laundry articles includes household laundry belonging to a common household. In examples, the household laundry includes two or more article types of at least one of different sizes and different shapes. Each of the two or more article types includes a longest dimension of between about 4 cm to 500 cm.

In examples, the surface includes a folding surface of an autonomous folding device, and the autonomous folding device is configured to rotate the folded laundry article such that the edge is substantially parallel to the retrieving end of the conveyor.

In examples, the surface includes a conveyor configured to retrieve the folded laundry article from an autonomous folding device, and the autonomous folding device is configured to rotate the folded laundry article such that the edge is substantially parallel to the retrieving end of the conveyor.

In examples, the surface includes a stationary platform on to which the folded laundry article is disposed from an autonomous folding device, and the autonomous folding device is configured to rotate the folded laundry article such that the edge is substantially parallel to the retrieving end of the conveyor.

In examples, the packing queue platform includes at least one conveyor.

In examples, the packing queue platform includes two or more vertically stacked platforms.

In examples, the packing queue platform includes two or more end abutted platforms.

In one example, a robotic system for autonomously arranging a plurality of folded household laundry articles in a packing queue for ordered packing includes an orienter configured to rotate a folded laundry article of the plurality of household laundry articles for directional placement in the packing queue, at least one packing queue platform configured to receive the folded laundry article into the packing queue disposed thereon, and a double knife edge conveyor including a retrieving end and a depositing end, the conveyor configured to be mounted to a gantry for cantilevering the retrieving end over the orienter for retrieving the folded laundry article and the depositing end over the packing queue platform for depositing the folded laundry article onto either a surface of the packing queue platform or another folded laundry article of the plurality of household laundry articles.

Implementations of the system may include one or more of the following features.

In examples, the retrieving end and depositing end include a preceding downward sloped angle from a top surface of the conveyor in a range of between about 10 to 20 degrees. Rollers disposed at the retrieving end and the depositing end include a diameter of between about 4 mm to 10 mm, and no part of the conveyor extends lower than the retrieving end and the depositing end. In examples, a carriage and drive motor of the conveyor are disposed entirely within the bounds of a conveyor belt. In examples, a drive belt extends from the drive motor to at least one of the rollers disposed at the depositing end and the retrieving end.

In examples, a carriage of the conveyor includes a pair of longitudinal rails, each one of the longitudinal rails extending a length of the conveyor, and the longitudinal rails include a thickness of between about 5 mm to 10 mm.

In examples, the depositing end of the conveyor is parallel to a length of the packing queue platform. In examples, the gantry is further configured to transit the conveyor vertically and horizontally along a length of the packing queue platform to a predetermined position. The gantry can include a vertically actuated elevator moveably coupled to a horizontal rail extending parallel to the length of the packing queue platform. In examples, a carriage defines the structure of the conveyor, and the carriage is configured to mount to the elevator.

In examples, a cantilever drive motor is configured to extend the conveyor from the elevator to cantilever the retrieving end over the orienter and the depositing end over the packing queue platform. In examples, the system further includes one or more drives including at least one of one or more belt drives configured to rotate a belt of the conveyor, a cantilever drive in operable communication with the cantilever drive motor, an elevator drive in operable communication with an elevator drive motor, and a gantry drive configured to transit the conveyor along the horizontal rail. The one or more belt drives and the cantilever drive are configured to be controlled simultaneously.

In examples, the system further includes at least one sensor configured to output a signal indicative of at least two of an area footprint of the folded laundry article, an orientation of the area footprint relative to a longitudinal axis of the packing queue, a height of the folded laundry article, and an article type.

The system further includes at least one controller in operable communication with the one or more drives and the at least one sensor. In examples, the at least one controller is configured to determine, based on a received sensor signal, at least one detected characteristic of the folded laundry article including at least one of article size, article type, an area footprint, and an orientation of the area footprint relative to a longitudinal axis of the packing queue, instruct the elevator drive and the gantry drive to align the conveyor with a selected location along the horizontal rail based on the determined at least one characteristic, instruct the cantilever drive to extend the depositing end over the packing queue platform at the selected location, determine alignment of the depositing end based on the at least one sensor signal, and instruct, simultaneously, the one or more belt drives to rotate the belt of the conveyor and instruct the cantilever drive to withdraw the cantilevered depositing end to deposit article at the selected location.

In examples, the system further includes at least one positional encoder disposed on the gantry, the positional encoder being configured to output a signal to the controller determinative of a position of the conveyor along a length of the horizontal rail.

In examples, the packing queue platform is configured to receive each one of the plurality of folded laundry articles at a selected position along a length of the packing queue platform, the plurality of folded laundry articles including at least one of two or more types of laundry articles and two or more sizes of laundry articles.

In examples, the output signal of the at least one sensor is configured to be communicated via a wired or wireless communication network. The at least one sensor can be disposed proximate at least one of an autonomous folding device configured to folded the folded laundry article and the orienter. The at least one sensor can be disposed on the gantry.

In examples, the one or more sensors include an optical sensor. The sensor includes at least one of a 3-D camera, an IR sensor, a 2-D camera, LIDAR, LADAR, a sonar proximity sensor, an ultrasonic ranging sensor, a radar sensor, and a pair of stereo depth cameras.

In examples, the orienter is configured to receive the folded laundry article from an autonomous folding device and rotate the folded laundry article such that an edge detected by at least one sensor is oriented substantially parallel to the retrieving end. Detecting the edge of the folded laundry article can include detecting with the at least one sensor a position and location of the edge relative to a known retrieving end orientation and location. In examples, the at least one controller can be configured to select the edge from four edges of the folded laundry article based on the detected area footprint and a predetermined orientation of the detected area footprint to the longitudinal axis of the packing queue. In examples, the at least one controller is further configured to position the retrieving end of a conveyor cantilevered over the orienter in contact with the detected edge of the folded laundry article. In examples, the at least one controller is further configured to instruct at least one of the elevator drive and the cantilever drive to position the retrieving end at a height in a range of between about 0.25 mm to 10 mm above a top surface of the orienter.

In examples, prior to instructing the cantilever drive to withdraw the cantilevered depositing end, the at least one controller is configured to receive a sensor signal indicative of the folded laundry article being proximate the depositing end. The sensor signal can include an output of one or more sensors disposed at least one of on the gantry and proximate the packing queue platform. In examples, the one or more sensors include at least one of an optical sensor. The sensor can include at least one of a 3-D camera, an IR sensor, a 2-D camera, LIDAR, LADAR, a sonar proximity sensor, an ultrasonic ranging sensor, a radar sensor, and a pair of stereo depth cameras.

In examples, the at least one controller is further configured to instruct at least one of the elevator drive and the cantilever drive to position the depositing end at a height in a range of between about 0.25 mm to 10 mm above a surface of either the packing queue platform or another one of the plurality of folded household laundry articles disposed on the packing queue platform. Aligning the conveyor with the selected location further includes positioning the depositing end above a top surface of the at least one other of the plurality of folded household laundry articles. The at least one controller can be further configured to detect, based on the received sensor signal, a height of a stack including the folded laundry article and at least one other of the plurality of folded household laundry articles. In examples the system further includes one or more compression plungers disposed on the conveyor gantry. The one or more compression plungers are configured to compress the stack. In any of the examples, the controller is further configured to calculate a final stack height based on the received sensor signal height of the stack and compare the final stack height to a threshold height range.

In examples, the threshold height range includes a range of between about 25 cm to 65 cm.

In examples, the controller is further configured to identify, based on the received sensor signal, at least one of an area footprint and a centroid of the another one of the plurality of folded laundry articles. The controller can be further configured to determine, based on the received sensor signal, a centroid of the folded laundry article and deposit the at least one folded laundry article atop the another one of the plurality of folded laundry articles such that the centroids align.

In examples, the controller is further configured to deposit the folded laundry article atop another one of the plurality of folded laundry articles such that the area footprint of the folded laundry article substantially aligns with the area footprint of the at least one other of the plurality of folded laundry articles.

In examples, the controller is further configured to determine, based on the received sensor signal, a sloped receiving surface of the another one of the plurality of folded laundry articles and deposit thereon a folded laundry article including an oppositely sloped top surface.

In examples, the stack is one of a plurality of stacks disposed on the packing queue platform. The packing queue platform includes two parallel conveyors and the plurality of stacks are laterally spaced and staggered between near and far ones of the two parallel conveyors. In examples, each pairing of staggered stacks includes substantially even stack heights for evenly loading a refillable cartridge in a side-by-side, one stack at a time alternating loading scheme.

In examples, the plurality of stacks are laterally spaced between adjacent predetermined locations such that the conveyor cantilevered above the packing queue platform avoids contacting one or more adjacent stacks. In examples, the lateral spacing is at least 8 mm.

In examples, the packing queue platform includes at least one movable conveyor configured to move a plurality of folded laundry articles thereon toward a packing cartridge.

In examples, the folded laundry article area footprint includes a one of a plurality of predetermined folded article area footprints.

In examples, the selected location for each folded laundry article of a plurality of folded laundry articles is one of a plurality of predetermined locations along the packing queue platform at which to depositing the folded laundry article such that an ordered packing queue fills a smallest number of packing boxes.

In examples, the one or more article types and one or more articles sizes of the plurality of folded household laundry articles are detected by one or more sensors of one or more preceding autonomous devices including at least one of the autonomous folding device and at least one autonomous separating device configured to separate individual items from the plurality of household laundry articles. A controller in operable communication with the one or more preceding autonomous devices can predetermines queue locations for each one of the plurality of household laundry items based on detected quantities of each article type and size preceding the packing queue and a predicted folded article area footprint for each one of plurality of household laundry items. Each one of the predetermined queue locations can include at least a horizontal position along the length of the packing queue platform.

In examples, the queue surface is a movable conveyor in operable communication with the at least one controller and the movable conveyor is configured to convey the one or more folded laundry articles disposed thereon to an end of the movable conveyor for packing.

In examples, the packing queue platform includes at least one movable conveyor configured to move a plurality of folded laundry articles thereon toward a packing cartridge.

In examples, an area footprint of the folded laundry article includes one of a plurality of predetermined folded article area footprints.

In examples, the plurality of folded household laundry articles includes household laundry belonging to a common household.

In examples, the household laundry includes two or more article types of at least one of different sizes and different shapes. In examples, each of the two or more article types include a longest dimension of between about 4 cm to 500 cm.

In examples, the packing queue platform includes two or more vertically stacked platforms.

In examples, the packing queue platform includes two or more end abutted platforms. The gantry can include two or more end abutted gantries, one proximate each one of the two or more end abutted platforms, and two or more conveyors disposed thereon.

In examples, the system includes two or more conveyors configured to be mounted to the gantry.

DETAILED DESCRIPTION

This disclosure relates to autonomous robotic devices, systems, and methods for queuing folded residential laundry articles for packing into a container for return to a household. One or more autonomous process lines comprise a plurality of robotic devices configured to work in concert to process a dirty load of household laundry from a mass of dirty, non-uniform articles (e.g., non uniform type, size, material, fabric thickness, etc.) to individually separated, cleaned, and folded laundry articles. The plurality of robotic devices operate without human intervention to efficiently and effectively launder a customer's dirty items. This disclosure relates to autonomous robotic devices configured to autonomously retrieve and place clean, folded deformable laundry articles into an intelligently ordered packing queue for return to a residential household in as few shipping boxes as possible.

The autonomous robotic devices are configured to fold a plurality of loads of laundry each comprising a plurality of deformable article types. The laundry articles are collected from a household and delivered to the autonomous process line for cleaning and autonomous packing for return to the household. The autonomous processes are time and cost efficient, eliminate human intervention-based delays, eliminate line workers and associated introduction of human contaminants introduced by line workers, and eliminate any concerns with having private personal items handled by strangers. The laundry articles are folded to preset sizes for efficient packing and unloading into a drawer or onto a shelf by the household customer.

Figure 1:
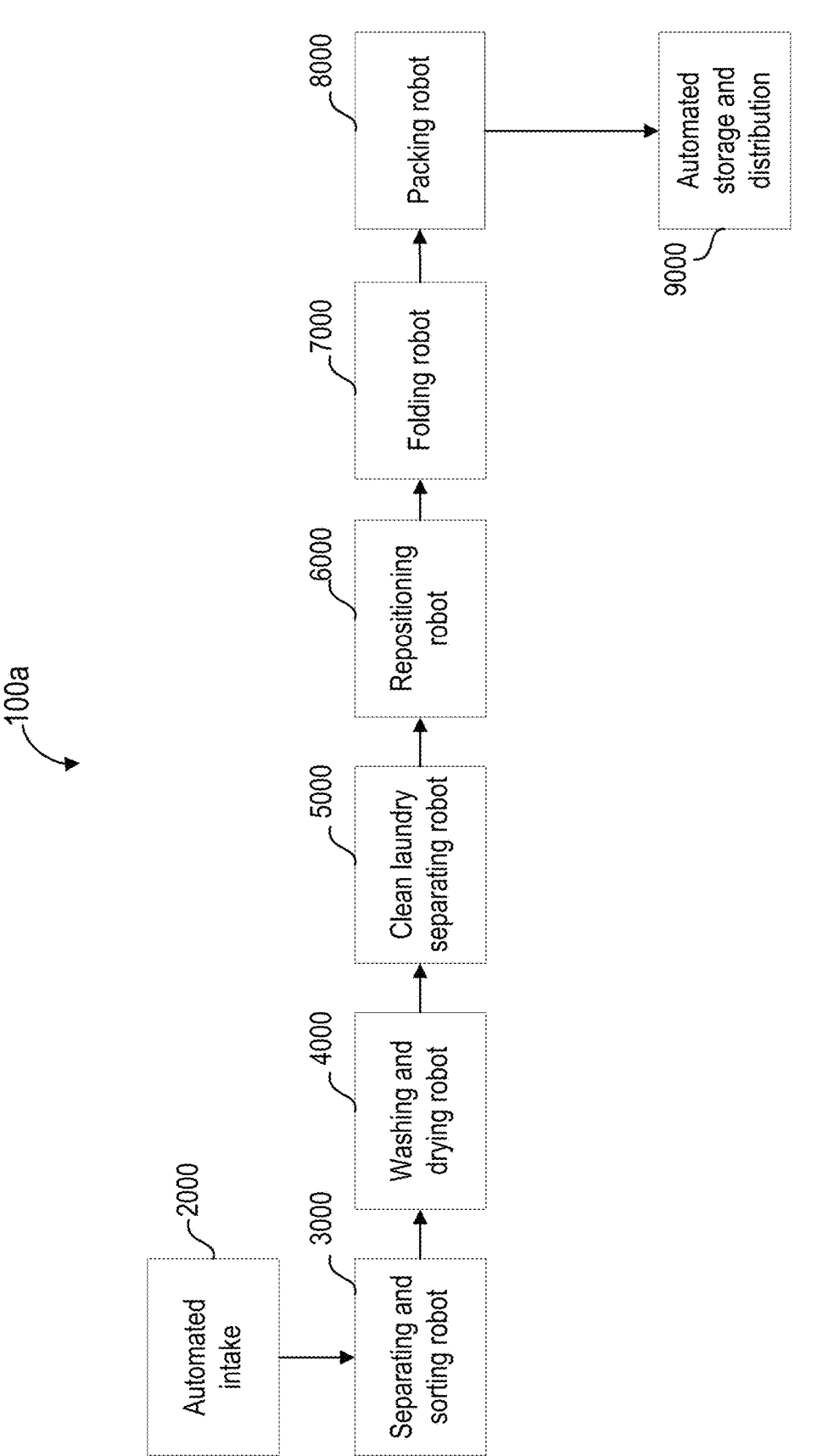
FIG. 1 depicts a schematic of an example autonomous robotic laundry process line.

As shown in FIG. 1, in implementations of the system, a process line 100 comprises a plurality of autonomous robots configured to operate in series without human intervention to process and transport dirty laundry through the cleaning process, folding and repackaging the clean laundry for return to a household. In one implementation, the process line 100 comprises an autonomous intake robot 2000 for receiving a load of dirty household laundry comprising a plurality of deformable laundry articles. The deformable laundry articles can be non-uniform in type, size, shape, color, and fabric. For example, the plurality of deformable laundry articles can include items commonly laundered in homes, such as sheets, towels, tablecloths, and adult and children's garments, for example, tee shirts, pants, socks, undergarments, dresses, dress shirts, and blouses. The autonomous intake robot 2000 is configured to introduce the plurality of deformable laundry articles to a separating and sorting robot 3000 configured to separate out each one of the deformable laundry articles of the plurality of deformable laundry articles pertaining to a single customer or household. In implementations, the separating and sorting robot 3000 is configured to autonomously sort each one of the separated deformable laundry articles into one or more related batches for washing. In implementations, the separating and sorting robot 3000 is configured to intelligently batch the separated each one of the deformable laundry articles according to a programmed sorting algorithm based, for example, on criteria including at least one of material color, material type, customer washing preference, water temperature requirements, and load size. In implementations, the separating and sorting robot 3000 is configured to identify and record the number, types, and sizes of garments in the load of laundry and provide this information to one or more robots in the process line 100.

The separating and sorting robot 3000 outputs one or more intelligently sorted batches of deformable laundry articles to one or more washing and drying robots 4000 for laundering. The one or more washing and drying robots 4000 output the clean laundry articles to a clean laundry separating robot 5000. Implementations of the clean laundry separating robot 5000 can be similar or identical to the separating and sorting robot 3000. The clean laundry separating robot 5000 is configured to separate a load of clean laundry into individual deformable laundry articles for introduction into a repositioning robot 6000. The repositioning robot 6000 receives a single deformable laundry article and manipulates and repositions it for automated introduction into a folding robot 7000, which automatically folds the laundry article for introduction to a packing robot 8000. In implementations, at least one of the clean laundry separating robot 5000 and the repositioning robot 6000 is configured to identify and record the number, types, and sizes of garments in the load of laundry and provide this information to one or more robots in the process line 100. The controllers of the one or more robots in the process line 100 can be configured to predict a final folded size of each one of the plurality of laundry articles belonging to a household. The predicted final folding size can be communicated via the network 230 to another controller of the robots in the process line 100 for determining an order in which to queue and stack folded items for packing the plurality of folded laundry articles into the least number of shipping containers for return to a household.

In implementations, the packing robot 8000 is a system comprising one or more autonomous devices working in concert and in series to automatically and intelligently queue and pack the clean load of laundry comprising the plurality of clean and folded deformable laundry articles into a shipping container for automated redistribution to the residential household customer. In implementations, the shipping container is a reusable container. In implementations, the shipping container is a disposable container. In implementations, the shipping container is a non-deformable container with an ingress protection rating that includes an intrusion protection rating of 5 or 6 and a moisture protection rating of any and all of 1 through 6 in accordance with the Ingress Protection Code, IEC standard 60529.

Implementations of the process line 100 of household laundry cleaning robots can comprise one or more of each of the robots depicted in FIG. 1. Additionally, two or more of the robots can be combined in a single module in alternate implementations. In implementations, one or more of the robots in the process line 100 are configured to communicate over wired connections or wireless communication protocols. For example, in implementations, one or more robots in the process line 100 can communicate with another one or more robots in the process line 100 over a wired BUS, LAN, WLAN, 4G, 5G, LTE, Ethernet, BLUETOOTH, or other IEEE 801.11 standard.

Figure 2:
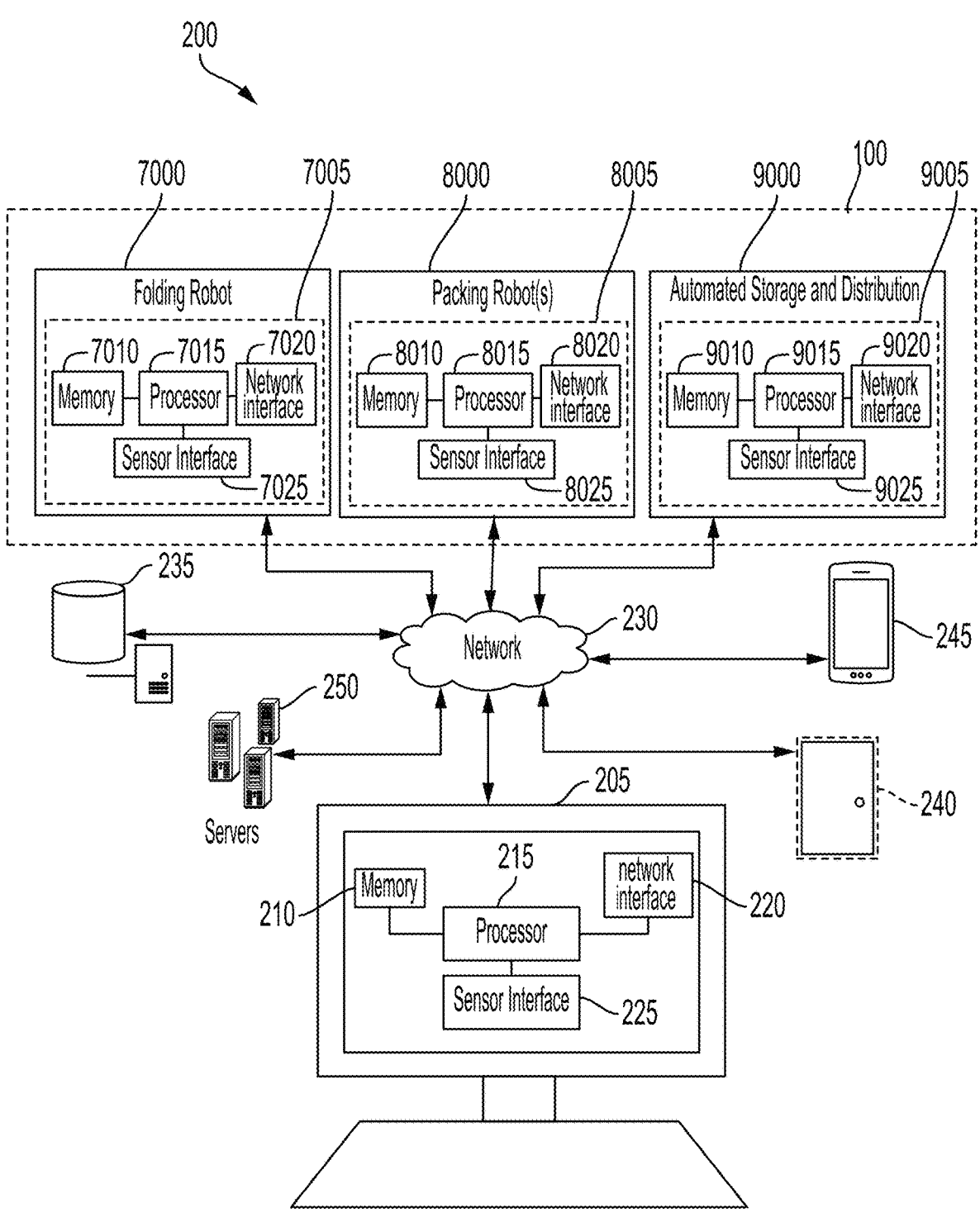
FIG. 2 depicts a schematic example of a system for controlling an autonomous robotic process line.

Referring to FIG. 2, an example of a system 200 of operatively connected autonomous robots is shown. FIG. 2 depicts a schematic implementation of a portion of an autonomous robotic process line 100 that processes the clean deformable laundry articles. A packing robot 8000 is in operative communication with a folding robot 7000 configured to output folded laundry articles from a load of household laundry to the packing robot 8000, and, in implementations, the packing robot 8000 is in communication with an automated storage and distribution system configured to receive and queue a packed one or more shipping containers (e.g., boxes) for return to the residential household customer. In implementations, each robot 7000, 8000, 9000 includes at least one controller 7005, 8005, 9005 configured to operate the associated robot.

For example, in implementations, the packing robot 8000 includes one or more controllers 8005. Each of the one or more controllers 8005 includes a processor 8015 in communication with a memory 8010, a network interface 8020, and a sensor interface 8025. The processor 8015 can be a single microprocessor, multiple microprocessors, a many-core processor, a microcontroller, and/or any other general purpose computing system that can be configured by software and/or firmware. In implementations, the memory 8010 contains any of a variety of software applications, algorithms, data structures, files and/or databases as appropriate to the requirements of repositioning non-uniform deformable laundry articles. In one implementation, the controller 8005 includes dedicated hardware, such as single-board computers, one or more GPUs, application specific integrated circuits (ASICs), and field programmable gate arrays (FPGAs).

A network interface 8020 is configured to couple the controller 8005 to a network 230. The network 230 may include both private networks, such as local area networks, and public networks, such as the Internet. It should be noted that, in some examples, the network 230 may include one or more intermediate devices involved in the routing of packets from one endpoint to another. In implementations, the network interface 8020 is coupled to the network 230 via a networking device, such as a bridge, router, or hub. In other implementations, the network 230 may involve only two endpoints that each have a network connection directly with the other. In implementations, the network interface 8020 supports a variety of standards and protocols, examples of which include USB (via, for example, a dongle to a computer), TCP/IP, Ethernet, Wireless Ethernet, BLUETOOTH, ZigBee, M-Bus, CAN-bus, IP, IPV6, UDP, DTN, HTTP, FTP, SNMP, CDMA, NMEA and GSM. To ensure data transfer is secure, in some examples, the controller 8005 can transmit data via the network interface 8020 using a variety of security measures including, for example, TLS, SSL or VPN. In implementations, the network interface 8020 includes both a physical interface configured for wireless communication and a physical interface configured for wired communication. According to various embodiments, the network interface 8020 enables communication between the controller 8005 of the packing robot and at least one of the plurality of robots 2000, 3000, 4000, 5000, 6000, 7000, 9000 of the process line 100.

Additionally or alternatively, the network interface 8020 is configured to facilitate the communication of information between the processor 8015 and one or more other devices or entities over the network 230. For example, in implementations, the network interface 8020 is configured to communicate with a remote computing device such as a computing terminal 205, database 235, server 240, smartphone 245, and server farm 250. In implementations, the network interface 8020 can include communications circuitry for at least one of receiving data from a database 235 and transmitting data to a remote server 240, 250. In some implementations, the network interface 7020 can communicate with a remote server over any of the wired protocols previously described, including a WI-FI communications link based on the IEEE 802.11 standard.

In some examples in accordance with FIG. 2, the network 230 may include one or more communication networks through which the various robots and computing devices illustrated in FIG. 2 may send, receive, and/or exchange data. In various implementations, the network 230 may include a cellular communication network and/or a computer network. In some examples, the network 230 includes and supports wireless network and/or wired connections. For instance, in these examples, the network 230 may support one or more networking standards such as GSM, CMDA, USB, BLUETOOTH®, CAN, ZigBee®, Wireless Ethernet, Ethernet, and TCP/IP, among others. In implementations, the network 230 can implement broadband cellular technology (e.g., 2.5 G, 2.75 G, 3 G, 4 G, 5 G cellular standards) and/or Long-Term Evolution (LTE) technology or GSM/EDGE and UMTS/HSPA technologies for high-speed wireless communication.

Although an embodiment of a controller 8005 of the packing robot 8000 is described herein in particular, one or more of the plurality of robots 2000, 3000, 4000, 5000, 6000, 7000, 9000 of the process line 100 includes similar components having similar functionality.

In implementations, the packing robot 8000 (also alternatively referred hereinafter as the "packing system 8000") can be a packing system comprising one or more autonomous devices working in concert (e.g., controlled as a group) to autonomously retrieve and place clean, folded deformable laundry articles into an intelligently ordered packing queue for return to a residential household in as few shipping boxes as possible. Additionally, the packing system can comprise one or more autonomous devices working in concert (e.g., controlled as a group) to pack one or more folded laundry articles into a box or container for return shipping to a residential household from which the items were retrieved for laundering.

Figure 3:
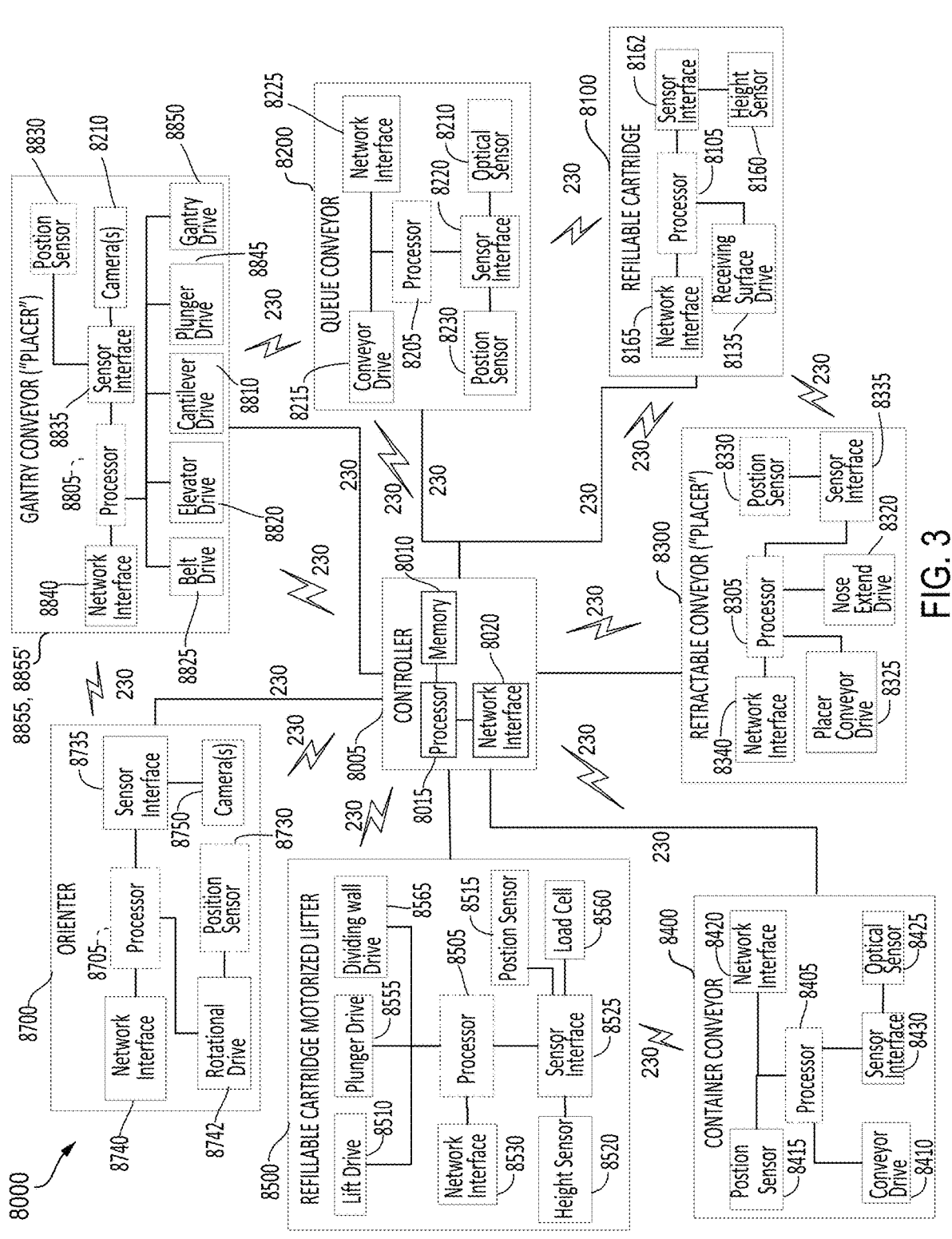
FIG. 3 depicts a schematic example of a system for queuing folded household laundry articles in a packing queue.

Turning to FIG. 3, schematic of an implementation of a packing system 8000 is shown. The packing system 8000 includes one or more of the features described with regard to the embodiments of FIGS. 1 and 2. In implementations, the packing system 300 comprises a plurality of interactive autonomous robotic devices. In implementations the packing system 8000 comprises at least one of a refillable cartridge 8100, a packing queue platform 8200 having one or more folded laundry articles and stacks of folded laundry articles disposed thereon, at least one retractable conveyor 8300 disposed between the refillable cartridge 8100 and the packing queue platform 8200 for loading the folded laundry articles into the refillable cartridge 8100, a container conveyor 8400 configured to align empty container with the refillable cartridge 8100 for filling, a driven lifter 8500 for selectively raising and lowering the refillable cartridge 8100 into and out of the container, and a controller 8005 in operative configuration with processors and drives of all of the foregoing and one or more sensors detecting a fill height of the refillable cartridge 8100.

Figure 4A:
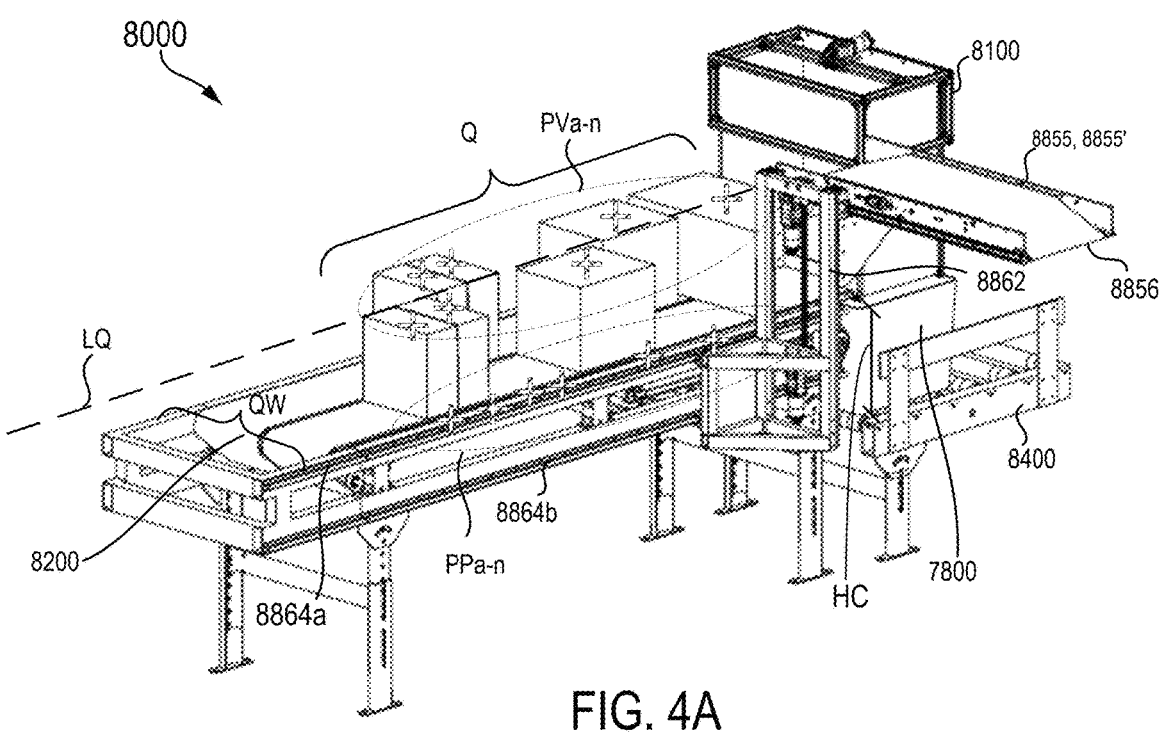
FIGS. 4A-B depict perspective views of an example of the system of FIG. 3.
Figure 4B:
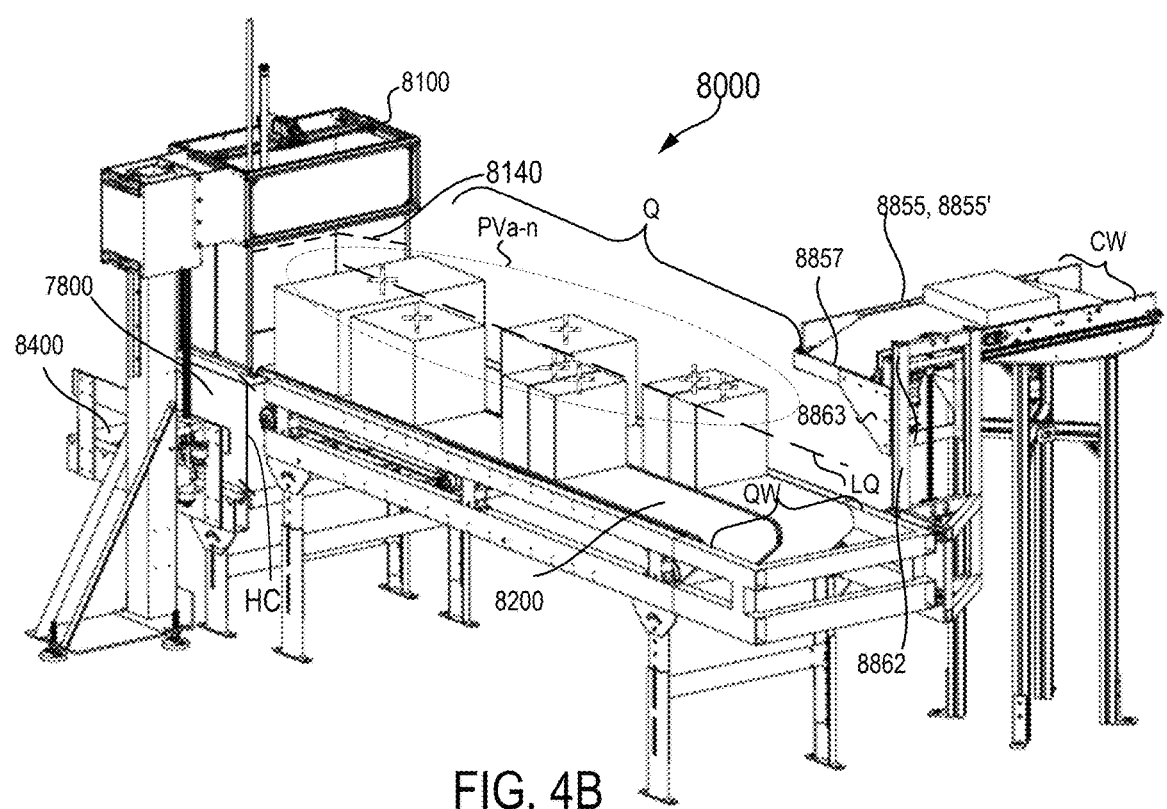
Figure 5:
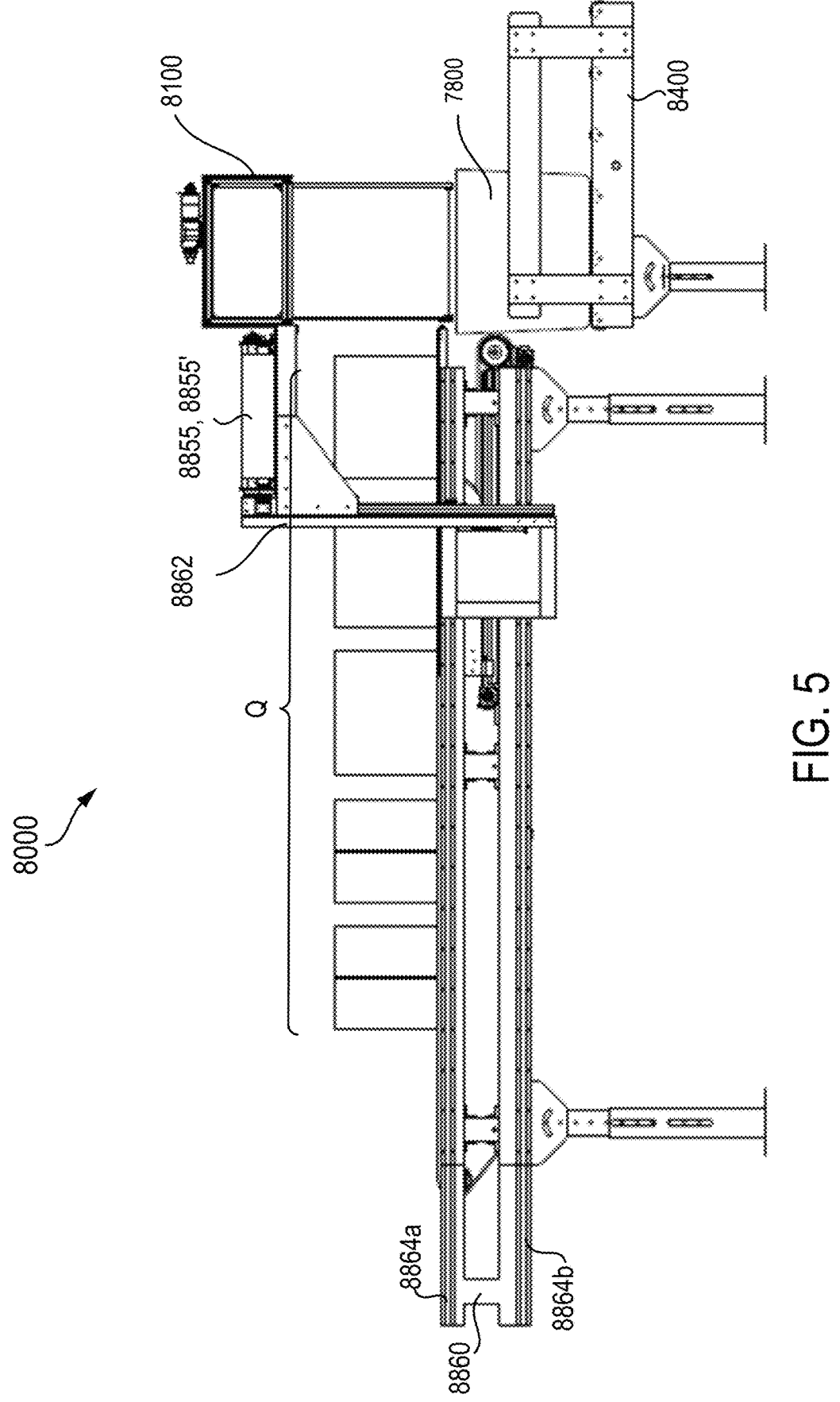
FIG. 5 depicts a side view of the example system of FIGS. 4A-B.

Taking FIGS. 3-5 together, in implementations, robotic system 8000 for autonomously arranging a plurality of folded household laundry articles 7300, 7300a-d in a packing queue Q for ordered packing comprises an orienter 8700 configured to rotate a folded laundry article of the plurality of household laundry articles for directional placement in a packing queue Q, at least one packing queue platform 8200 configured to receive the folded laundry article into the packing queue Q disposed thereon, and a double knife edge conveyor 8855. The double knife edge conveyor 8855 (hereinafter "the conveyor") includes a retrieving end 8856 and a depositing end 8857. The conveyor 8855 is configured to be moveably engaged with a gantry for cantilevering the retrieving end 8856 over the orienter 8700 for retrieving the folded laundry article and the depositing end 8857 over the packing queue platform 8200 for depositing the folded laundry article onto either a surface of the packing queue platform 8200 or another folded laundry article of the plurality of household laundry articles. Each autonomous device in the packing system will subsequently be described in detail with regard to implementations.

Figure 6:
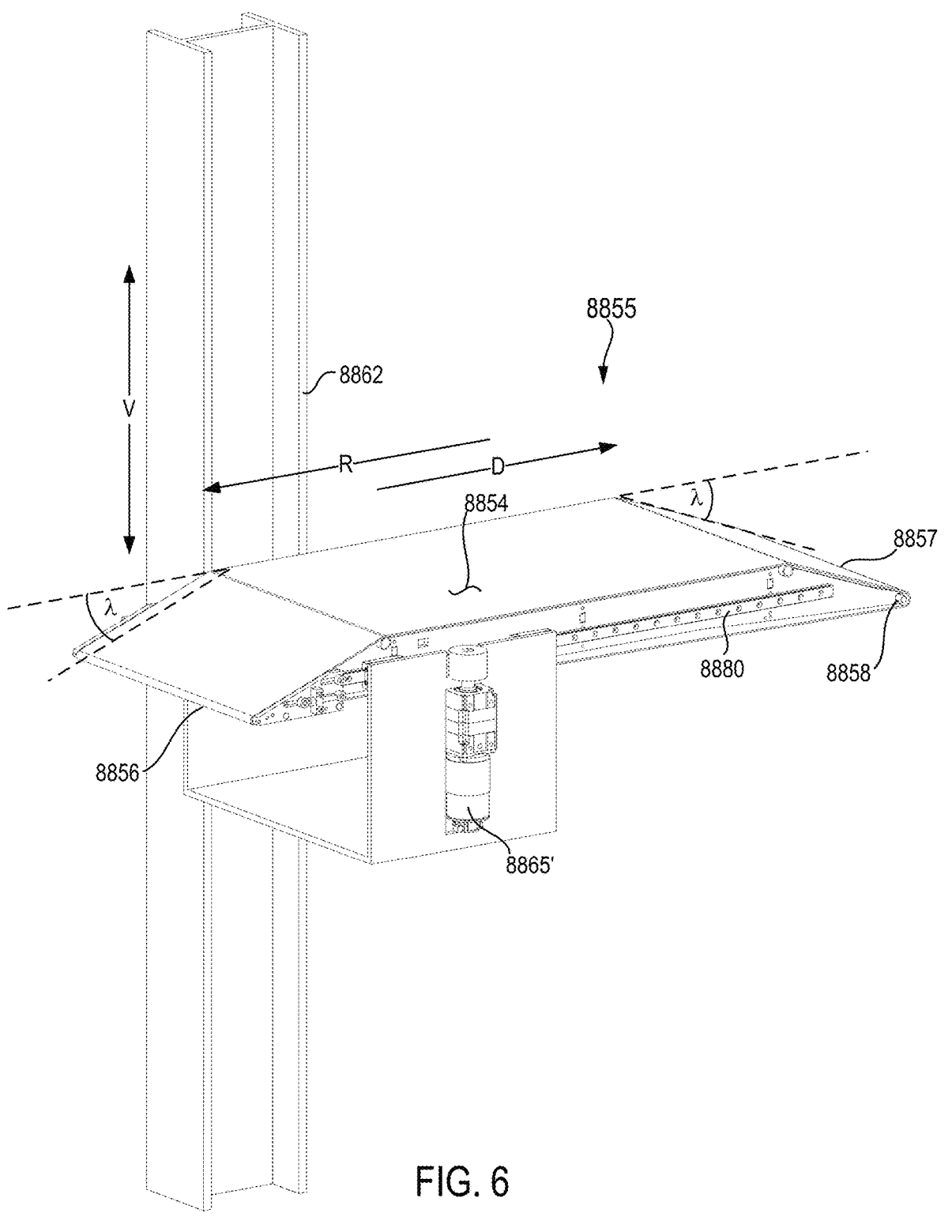
FIG. 6 depicts a perspective view of an example elevator and conveyor of the system of FIGS. 4A-B.
Figure 9A:
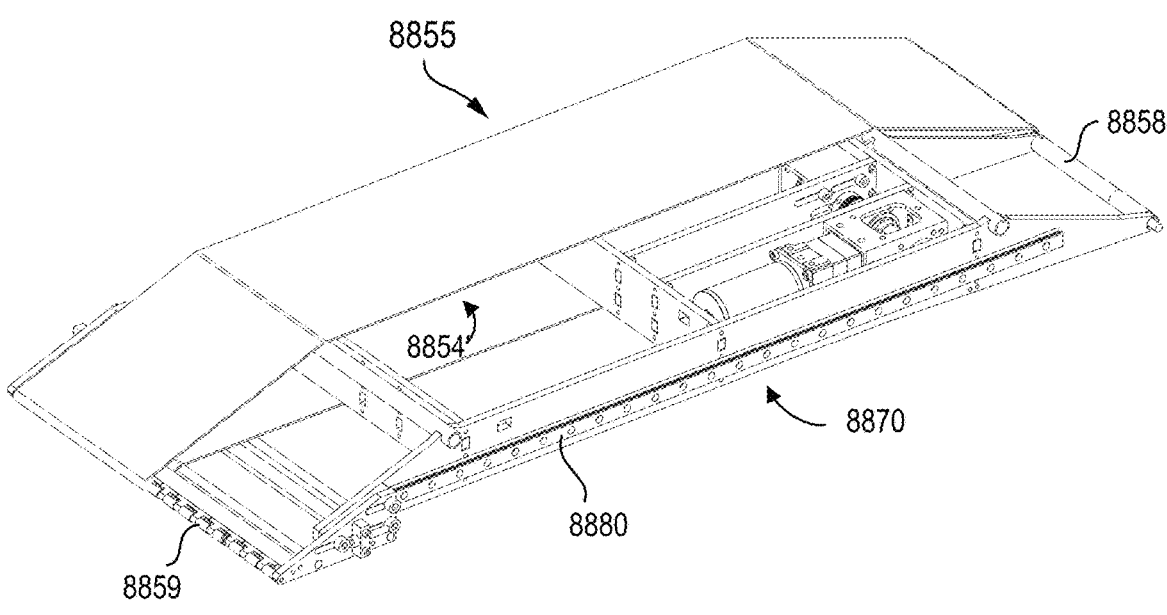
FIGS. 9A-B depict schematic perspective and top views of the conveyor of FIG. 7 with a portion of the conveyor belt removed.
Figure 9B:
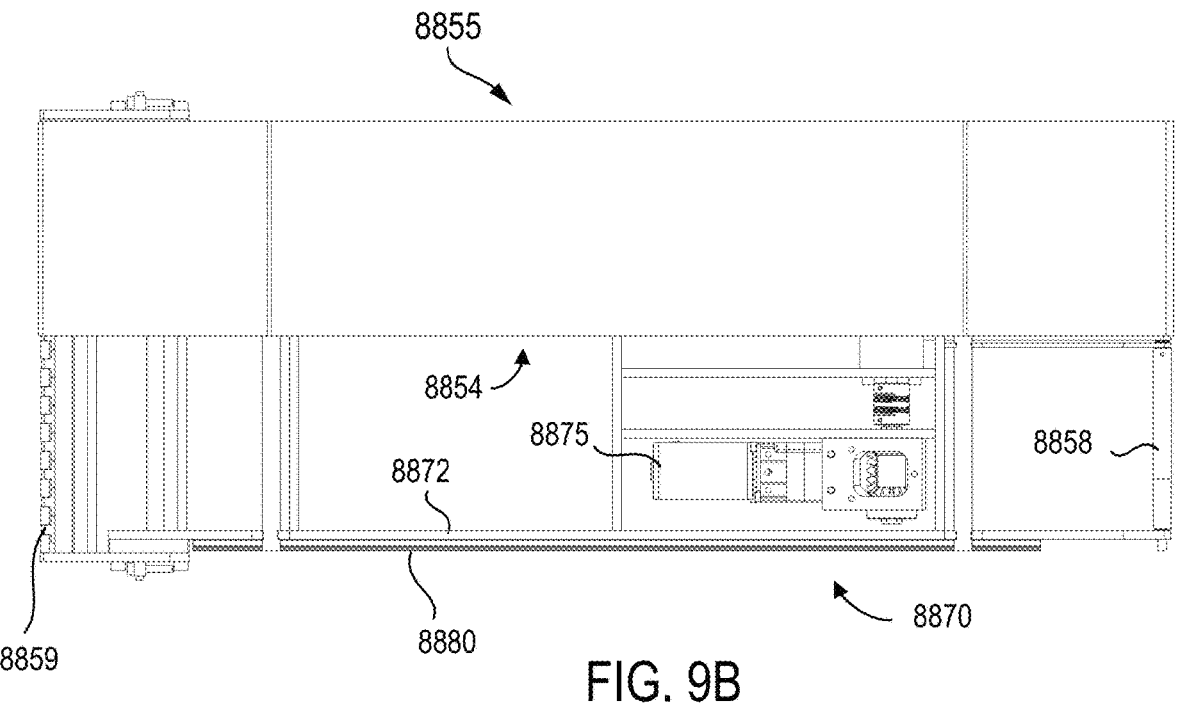
Figure 10:
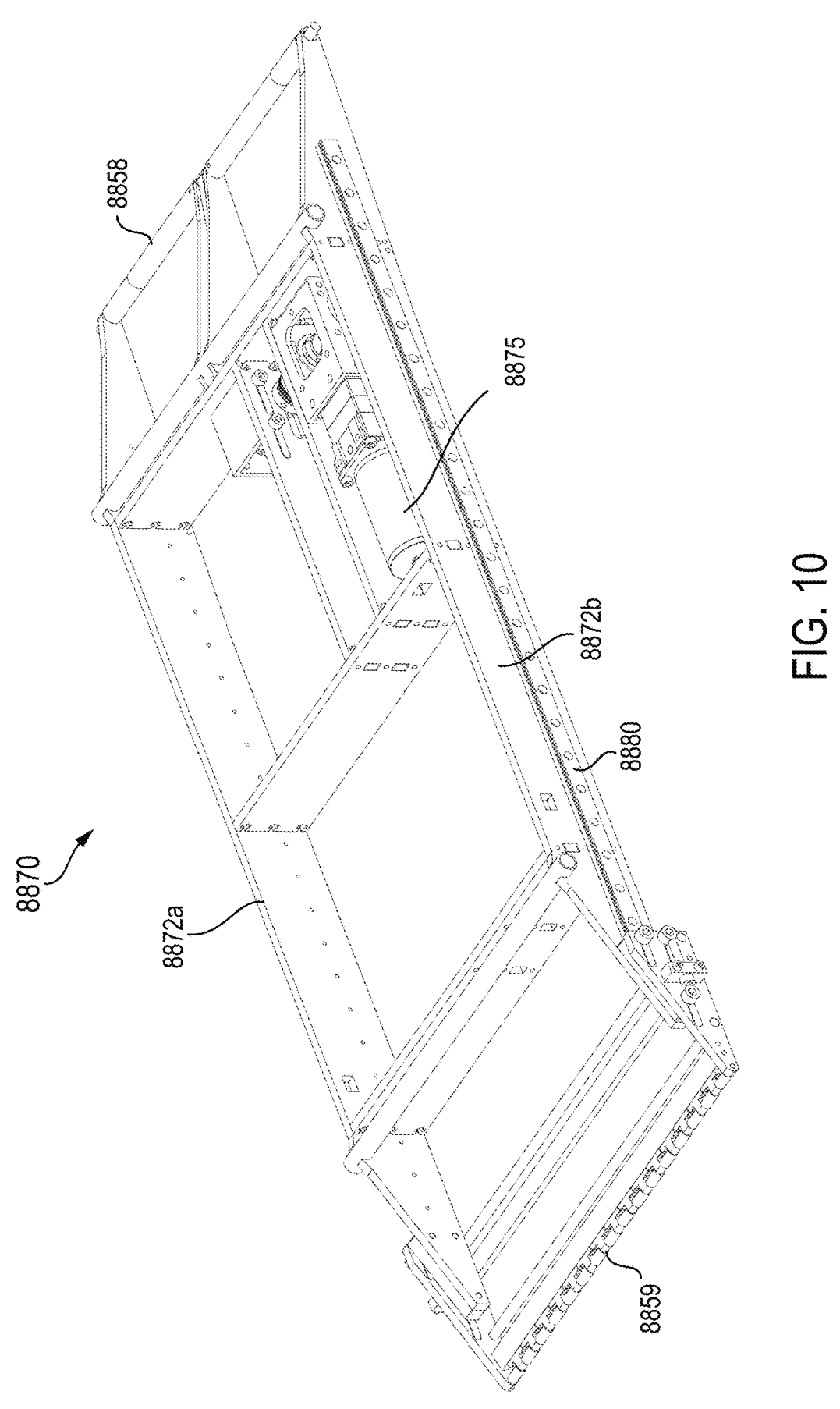
FIG. 10 depicts a perspective view of an example carriage of the conveyor of FIG. 7 with the conveyor belt removed.
Figure 14:
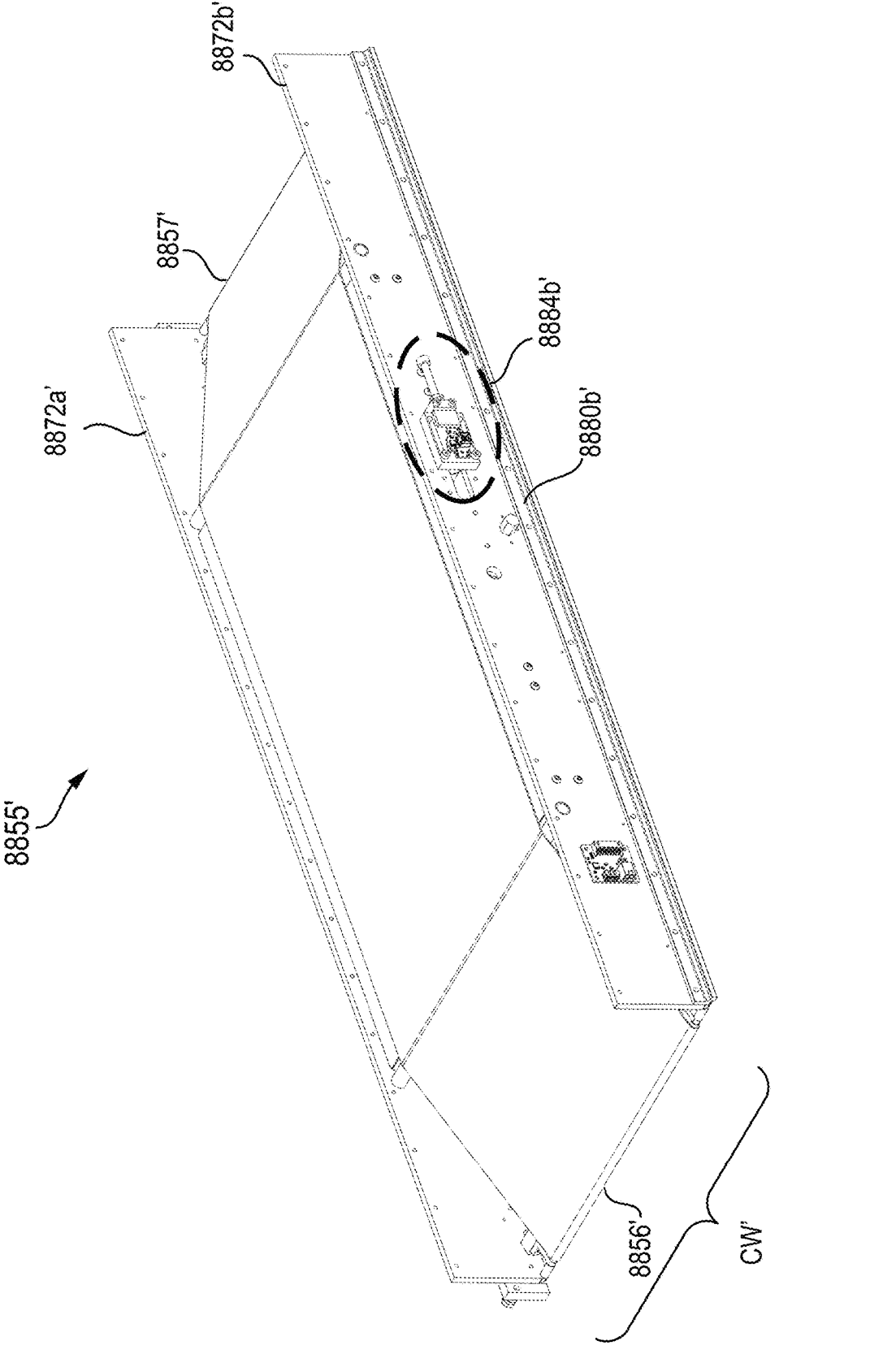
FIG. 14 is a perspective view of an example conveyor of the system of FIGS. 4A-B FIG. 15 a perspective view of an example carriage of the conveyor of FIG. 14 with the conveyor belt removed.
Figure 15:
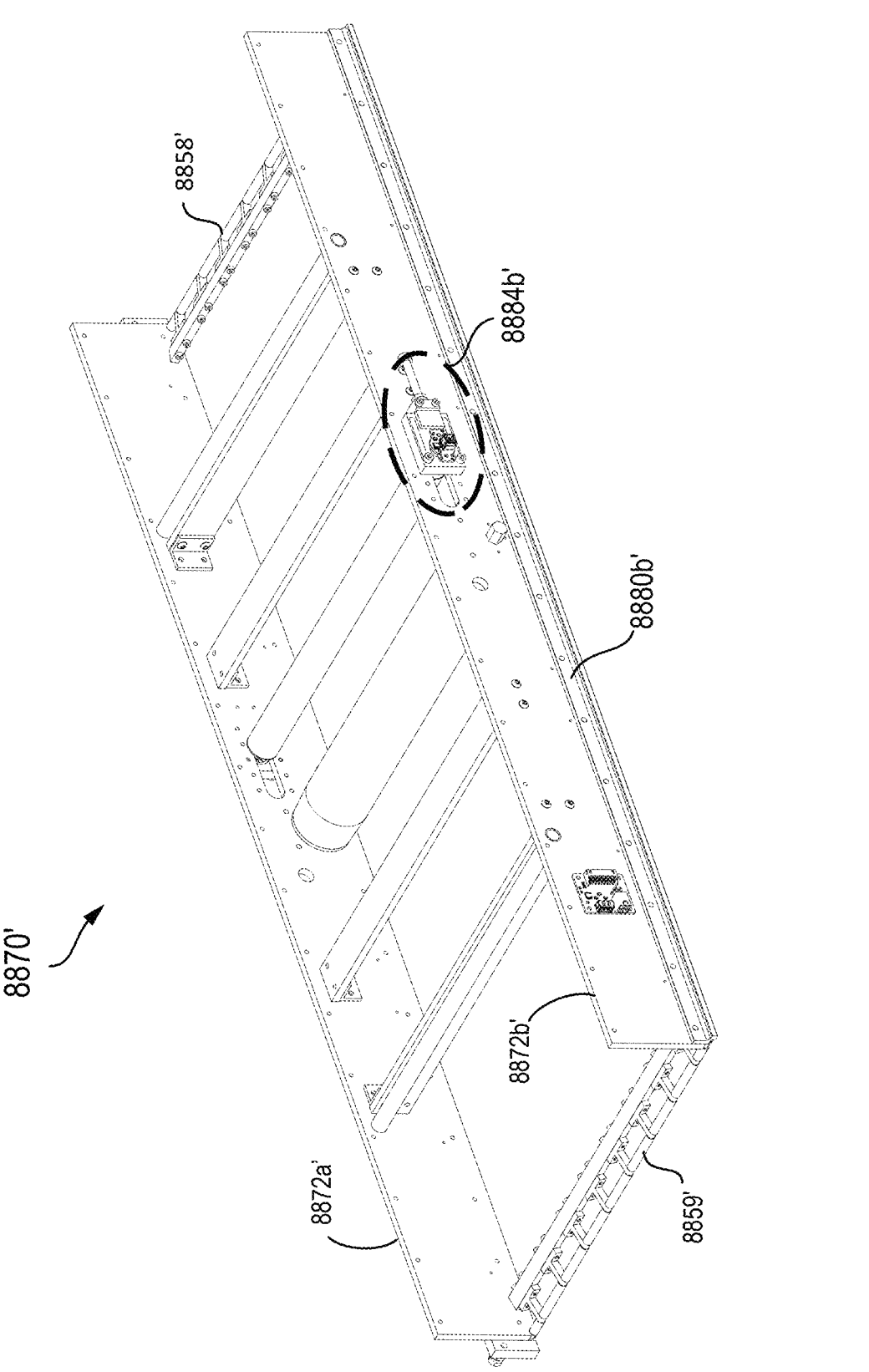

As shown in FIG. 6, in implementations, the retrieving end 8856 and depositing end 8857 of the conveyor 8855 are terminating ends of angled portions of the conveyor, the angled portions being sloped downward at an angle $\lambda$ from a top surface of the conveyor. The angle $\lambda$ comprise a range of between about 10 to 20 degrees. Angling the retrieving end 8856 and depositing end 8857 of the circulatable conveyor belt 8854 assists with retrieving a folded laundry article 7300 up onto the conveyor and depositing the laundry article in the packing queue Q without the unbound folded laundry article unfolding during an otherwise a sudden displacement. The downward sloped angle $\lambda$ enables the conveyor 8855 to have a smallest possible knife edge while still leaving volume within the conveyor for the drive motor, conveyor rollers, etc. The conveyor 8855 is able to cantilever over surfaces in both forward and reverse directions with no additional structure underneath that might contact surfaces and/or disturb one or more folded articles therebeneath. Additionally, in embodiments, rollers 8858, 8859 (FIGS. 9A-10) disposed at the retrieving end 8856 and depositing end 8857 comprise a diameter of between about 4 mm to 15 mm. In implementations such as that of FIGS. 14-15, the rollers 8858', 8859' disposed at the retrieving end 8856' and depositing end 8857' comprise a diameter of between about 5 mm to 10 mm. These small diameter knife edges (e.g., conveyor ends 8856, 8857, 8856', 8857') also assist with smooth, non-turbulent transitions of the folded laundry article onto and off the conveyor 8855, 8855'.

The unbound folded laundry article 7300 is a folded laundry article that is not wrapped, sealed, restrained, or fastened in any way. The unbound folded laundry article is folded by a folding robot 7000 and delivered to the queue platform 8200 for packing without being held in a folded state by any shrink wrapping or plastic ties wrapped around the unbound folded laundry article (hereinafter referred to interchangeably as "the folded laundry article"). Eliminating such ties and wraps reduces waste and environmental damage caused by such waste and facilitates quickly unloading the folded container contents into a dresser drawer or closet. All design considerations described herein with regard to implementations are intended to prevent unfolding, crumpling, or otherwise disturbing one or more folded and/or stacked deformable laundry articles 7300.

Figure 11:
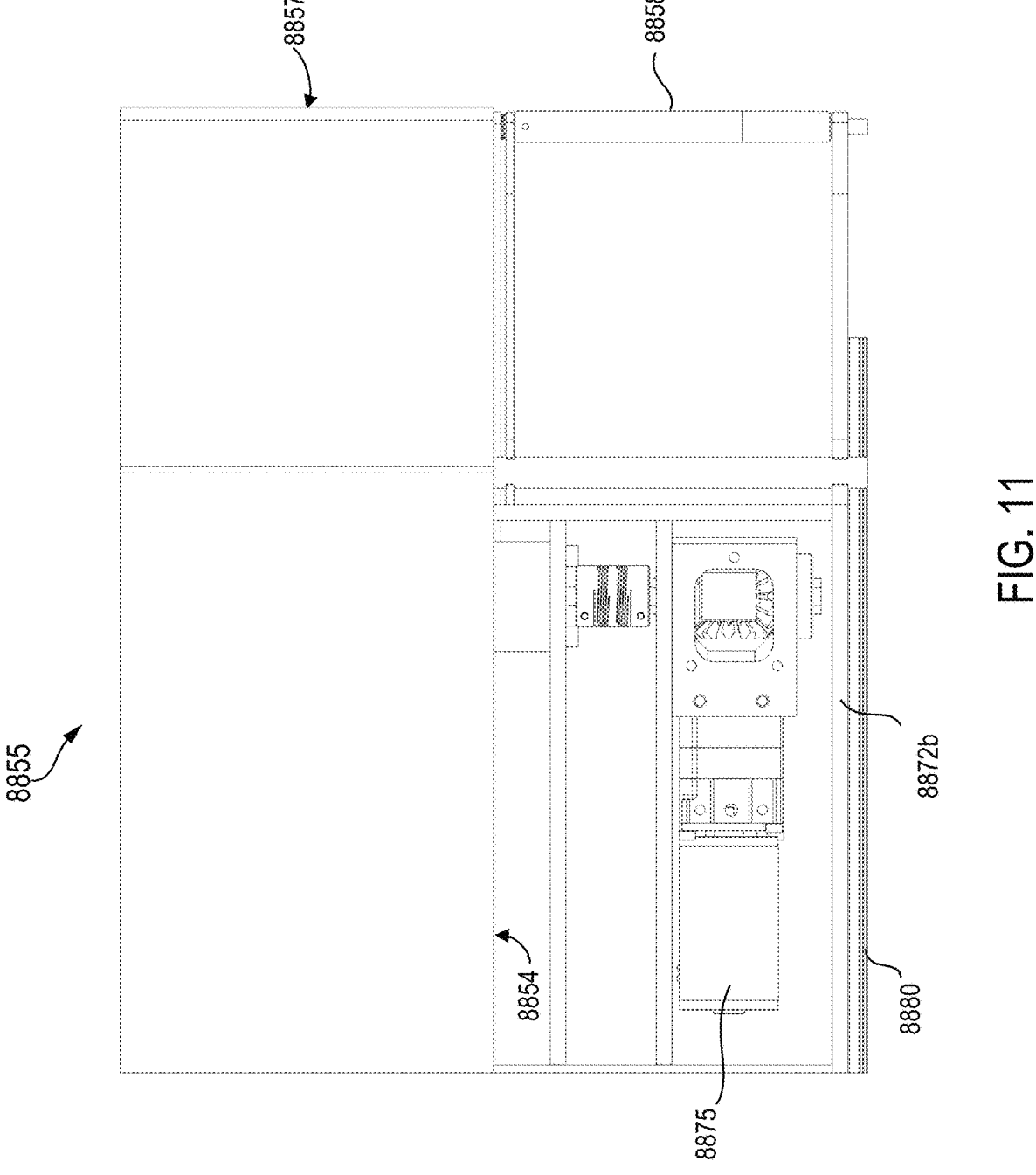
FIG. 11 depicts an enlarged top view of a portion of FIG. 10.

In implementations no part of the conveyor 8855, 8855' extends lower than the retrieving end 8856, 8856' and depositing end 8857, 8857' such that nothing interferes with a surface below the receiving end or a stack 7301 of one or more folded laundry articles 7300 below the depositing end. In implementations, such as that shown in FIGS. 7-13, a carriage 8870 (FIG. 10) and a drive motor 8875 (FIG. 11) of the conveyor 8855 are disposed entirely within the bounds of a conveyor belt 8854. Additionally, one or more side rails 8872, 8872a-b of the carriage 8870 are within the bounds of the conveyor belt 8854 and not protruding therefrom such that the conveyor 8855 maintains a zero side-clearance depositing end 8857. The zero side-clearance depositing end 8857 does not require spacing on either side of a stack 7301 of one or more folded laundry articles 7300 onto which the conveyor 8855 is placing another folded laundry article 7300. The zero side-clearance depositing end 8857 thus also could place a folded laundry article 7300 between walls of a box, container, or staging/filling cartridge.

Figure 7:
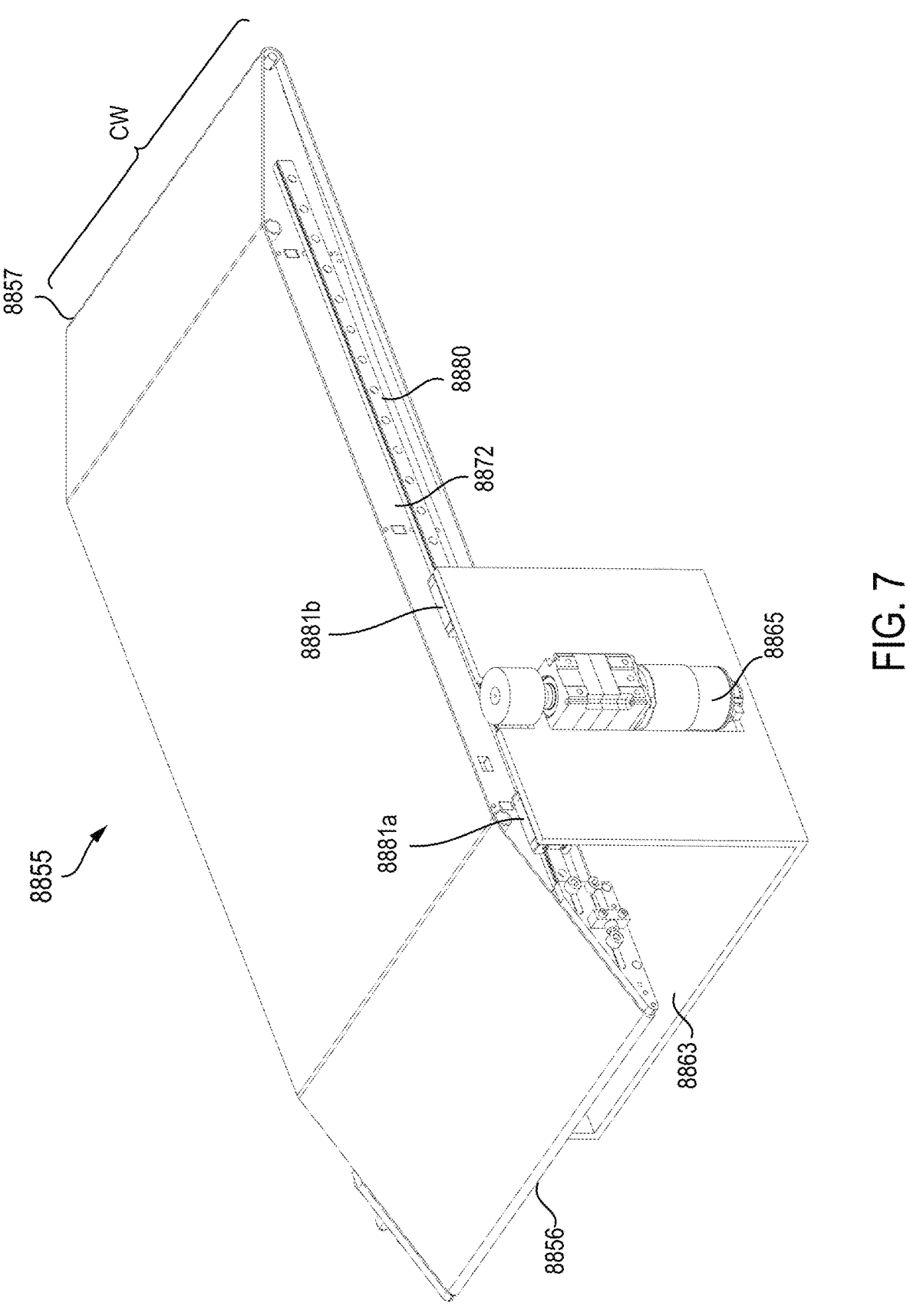
FIG. 7 depicts a perspective view of an example conveyor and elevator platform of the system of FIGS. 4A-B.
Figure 8:
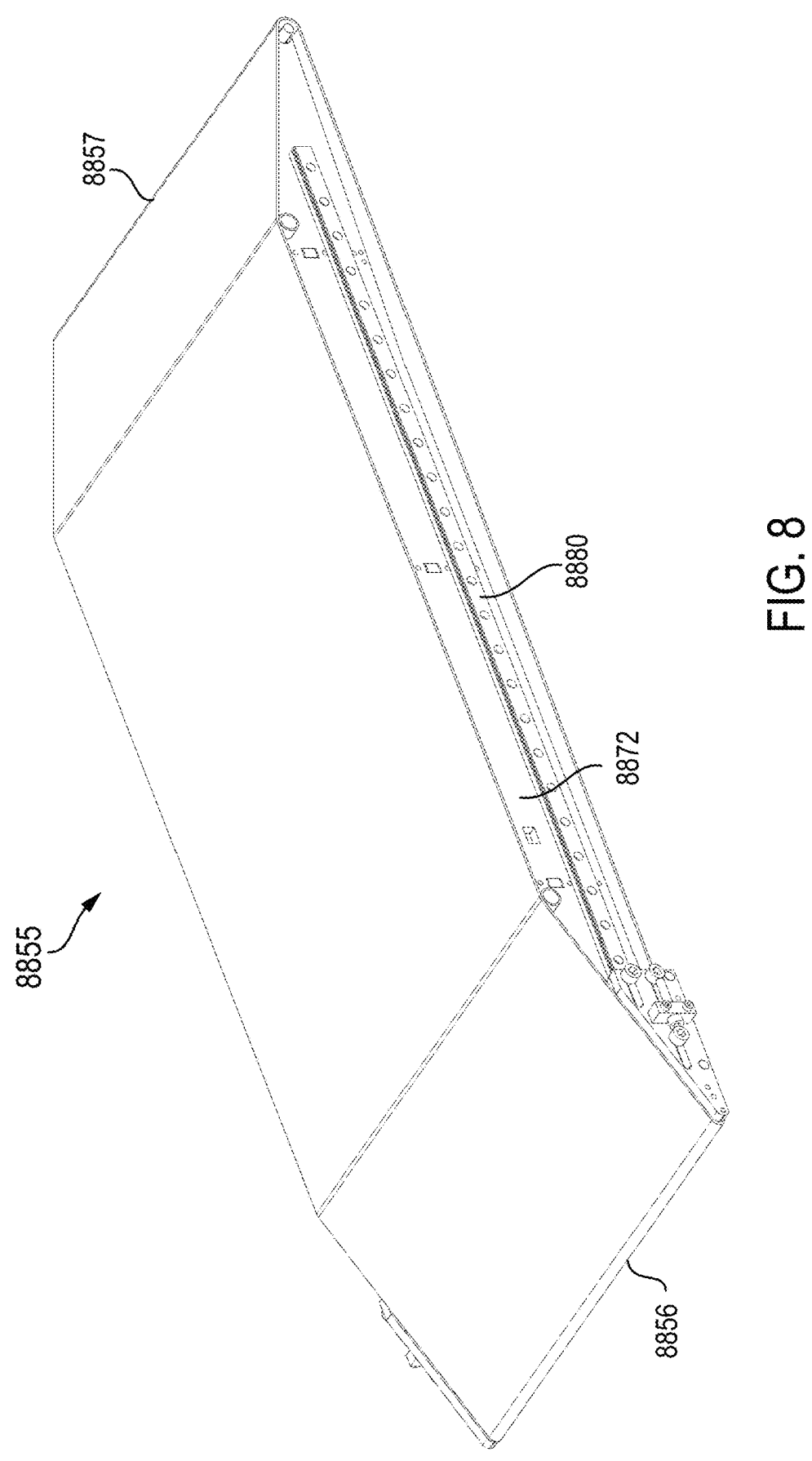
FIG. 8 depicts an example conveyor of FIG. 7.

As shown in FIG. 7, at least one of the one or more side rails 8872, 8872*a-b* is configured to engage with the cantilever motor 8865 for cantilevering the conveyor 8855 during retrieval of the folded laundry article and depositing of the folded laundry article in the packing queue Q. For example, in implementations, the one or more side rails 8872 move back and forth in stationary bearings 8881*a-b*, and the cantilever motor 8865 drives the conveyor 8855 back and forth within those bearings. In implementations, as depicted in FIG. 7, the cantilever motor 8865 is configured to engage with the one or more side rails 8872 directly to drive a linear motion. In implementations, the one or more side rails 8872 comprise a flat protruded surface 8880 that engages the bearings 8881*a-b* and the cantilever motor 8865 pushes back and forth on the surface 8880 with a friction drive wheel while the stationary bearings support the cantilevered conveyor 8855. Additionally or alternatively, in implementations, the cantilever motor 8865 is configured to engage and drive any flat surface of the carriage 8870. Additionally or alternatively, the carriage comprises a pair of side rails 8872*a-b*, one under each longitudinal edge of the belt 8854, and each side rail comprises a protruded surface 8880 configured to engage a pair of bearings.

Figure 12:
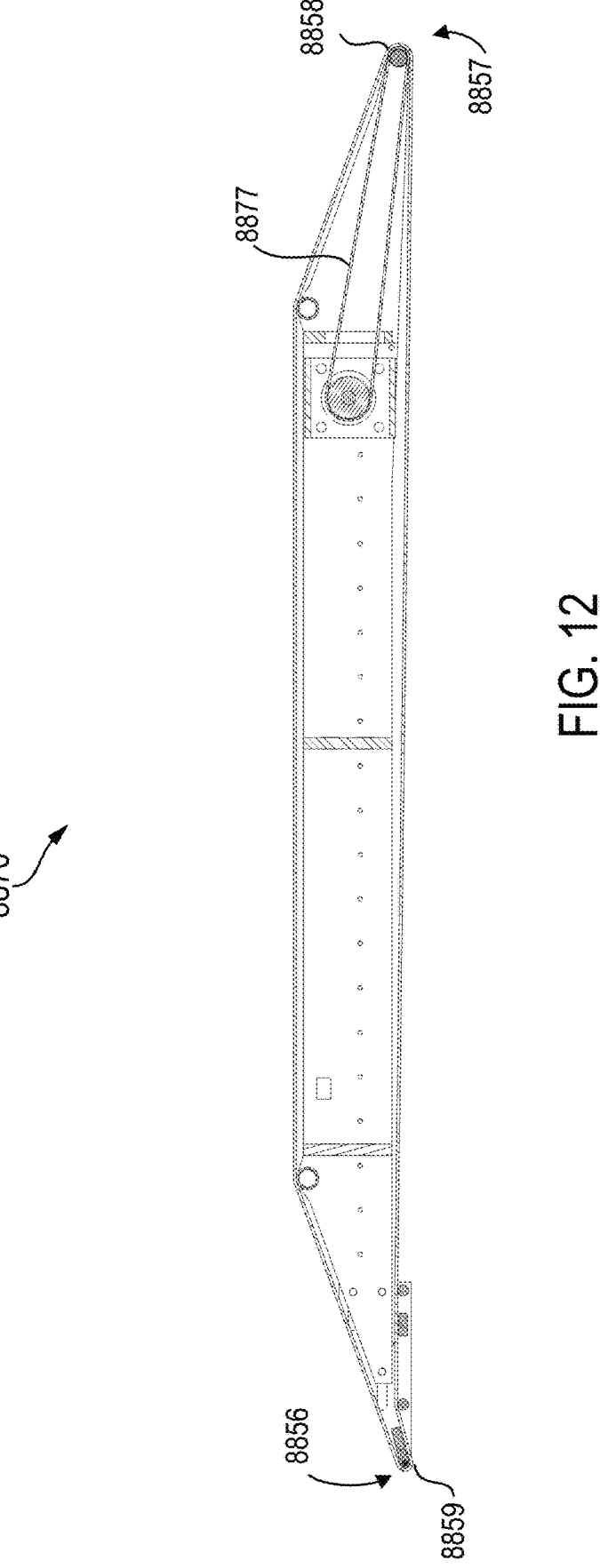
FIG. 12 depicts a lengthwise bisected side view of the conveyor of FIG. 9B.
Figure 13:
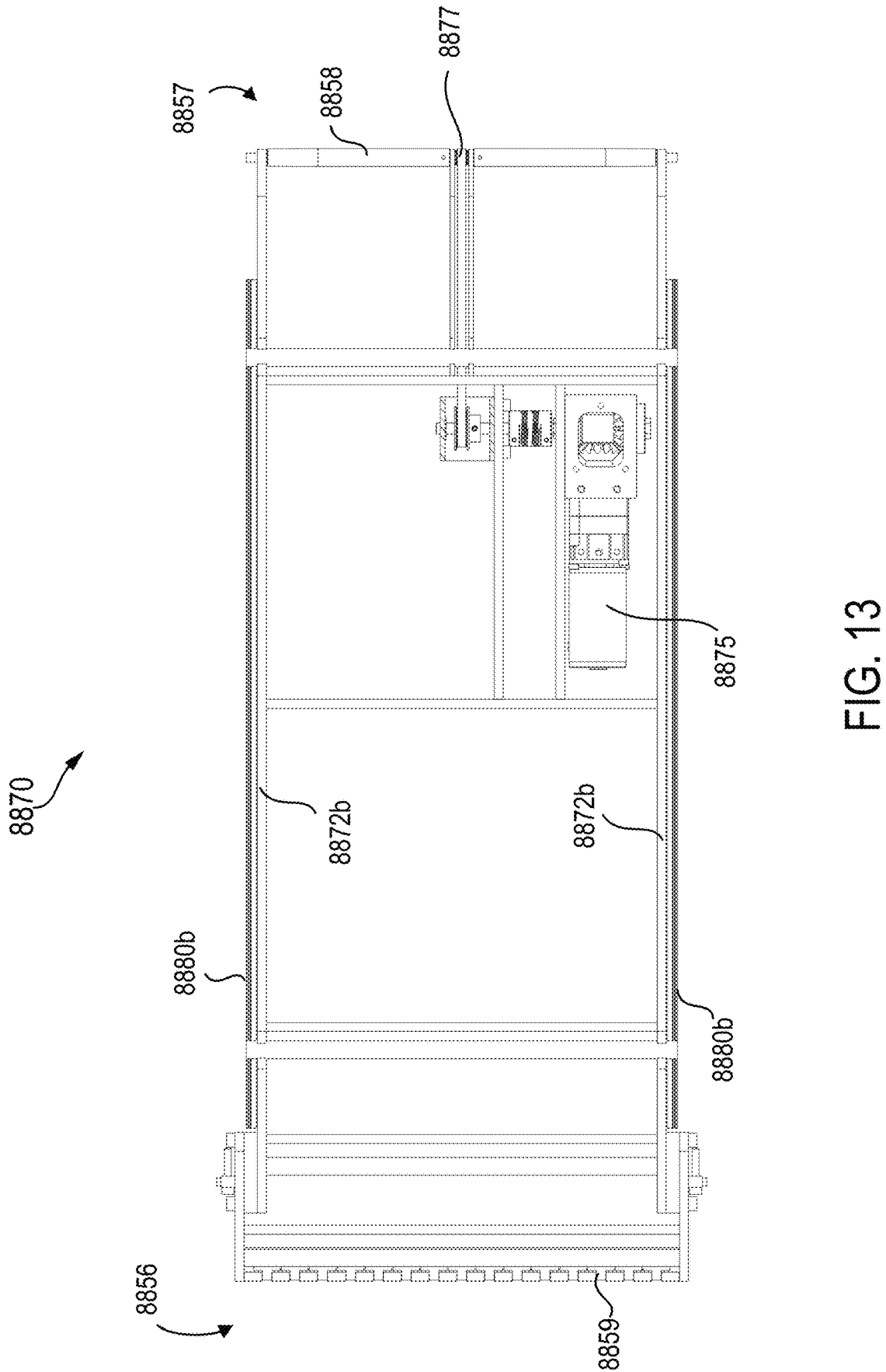
FIG. 13 depicts a top view of the example carriage of FIG. 10.

As shown in particular in FIGS. 12-13, in implementations, the conveyor 8855 further comprises a drive belt 8877 extending from the drive motor 8875 to at least one of the rollers 8858, 8859 disposed at the depositing end and the retrieving end. Alternatively, in implementations, the drive belt 8877 is configured to drive a roller 8858 at the depositing end 8857 and the retrieving end 8856 comprises small bushings on a stationary rod, that allow the belt 8854 to be pulled over the retrieving end 8856 with no or minimal friction (e.g., easily overcome with minimum drive force and no belt shuddering). Because the belt 8854 at the top of the conveyor 8855 always moves from the retrieving end 8856 to the depositing end 8857, driving the front roller (8858) pulls the top of the belt 8854 and an article 7300 thereon being carried, which is smoother and less jarring to the unbound folded laundry article on the belt 8854 rather than trying to push the belt 8854 from the tail end (e.g., the retrieving end 8856).

In implementations, the drive belt 8877 can be part of a timing pulley drive, and the driven roller 8858 at the depositing end 8857 can be crowned at both ends for tracking the conveyor belt 8854 to the center of the carriage 8870. Having a larger drive roller further back in the conveyor would require additional belt wrap and rollers (e.g., would require the belt to wrap back around additional rollers), which would not leave sufficient room inside the belt for all of the conveyor structure, and therefore the conveyor 8855 would require external structure and thus would not have zero side clearance. In implementations, the conveyor 8855 comprises a timing pulley embedded within the small front roller 8859 (made up of three pieces) that is smaller than the diameter of the front roller 8859'. this implementation allows the timing drive belt 8877 to drive the front roller 8859 just below the level of the conveyor belt 8854 (e.g., just inside but not in contact with the belt 8854). Because the drive belt 8877 is disposed just underneath the inside surface of the belt 8854, the drive belt 8877 does not push up into the belt 8854 and avoids disturbing belt tracking (e.g., avoids causing side-to-side drift) and/or avoids causing potential contact wear on the drive belt 8877.

Figures 16A, 16B:
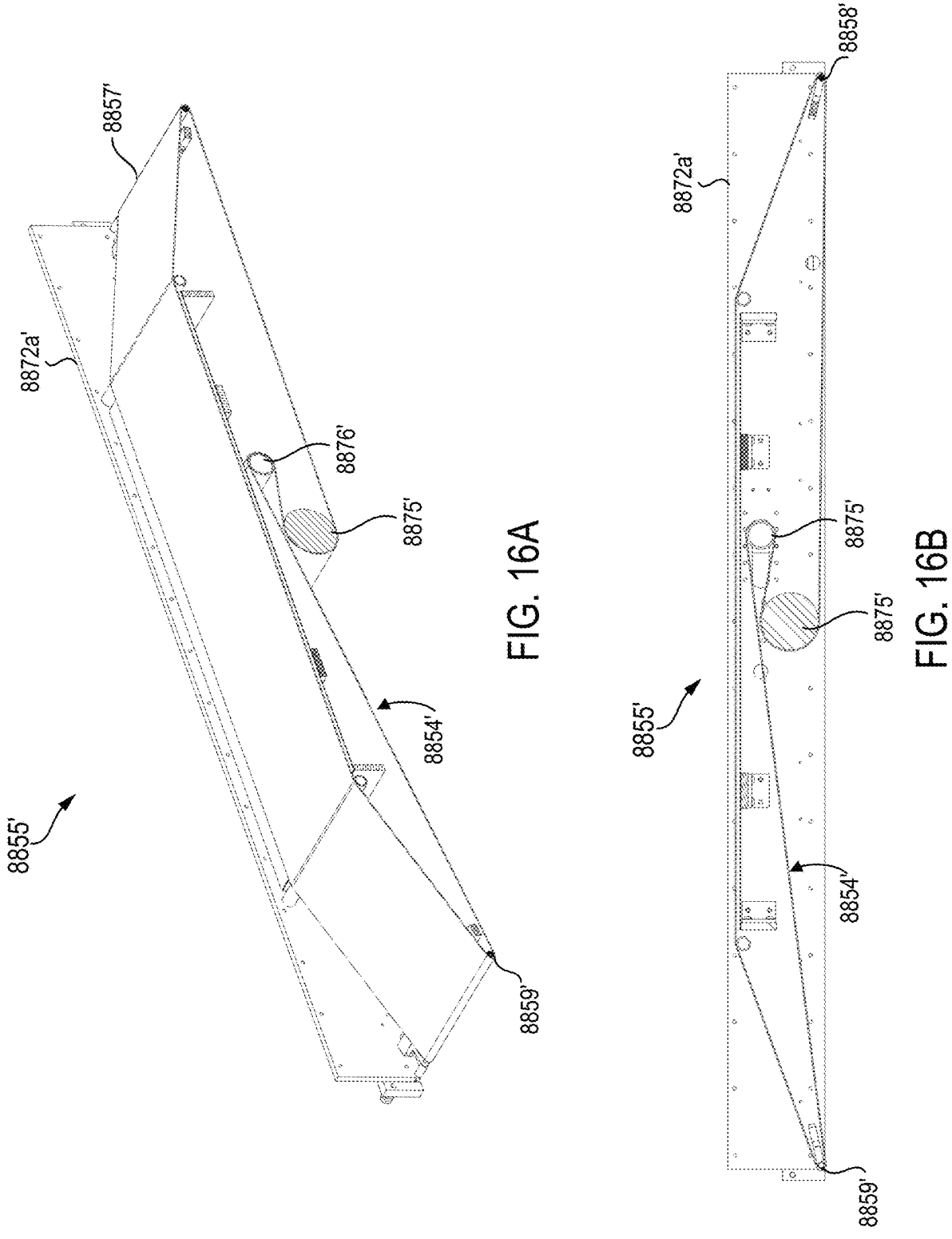
FIG. 16A depicts a perspective bisected side view of the conveyor of FIG. 14.
FIG. 16B depicts a side view of the bisected conveyor of FIG. 16A.
Figure 17A:
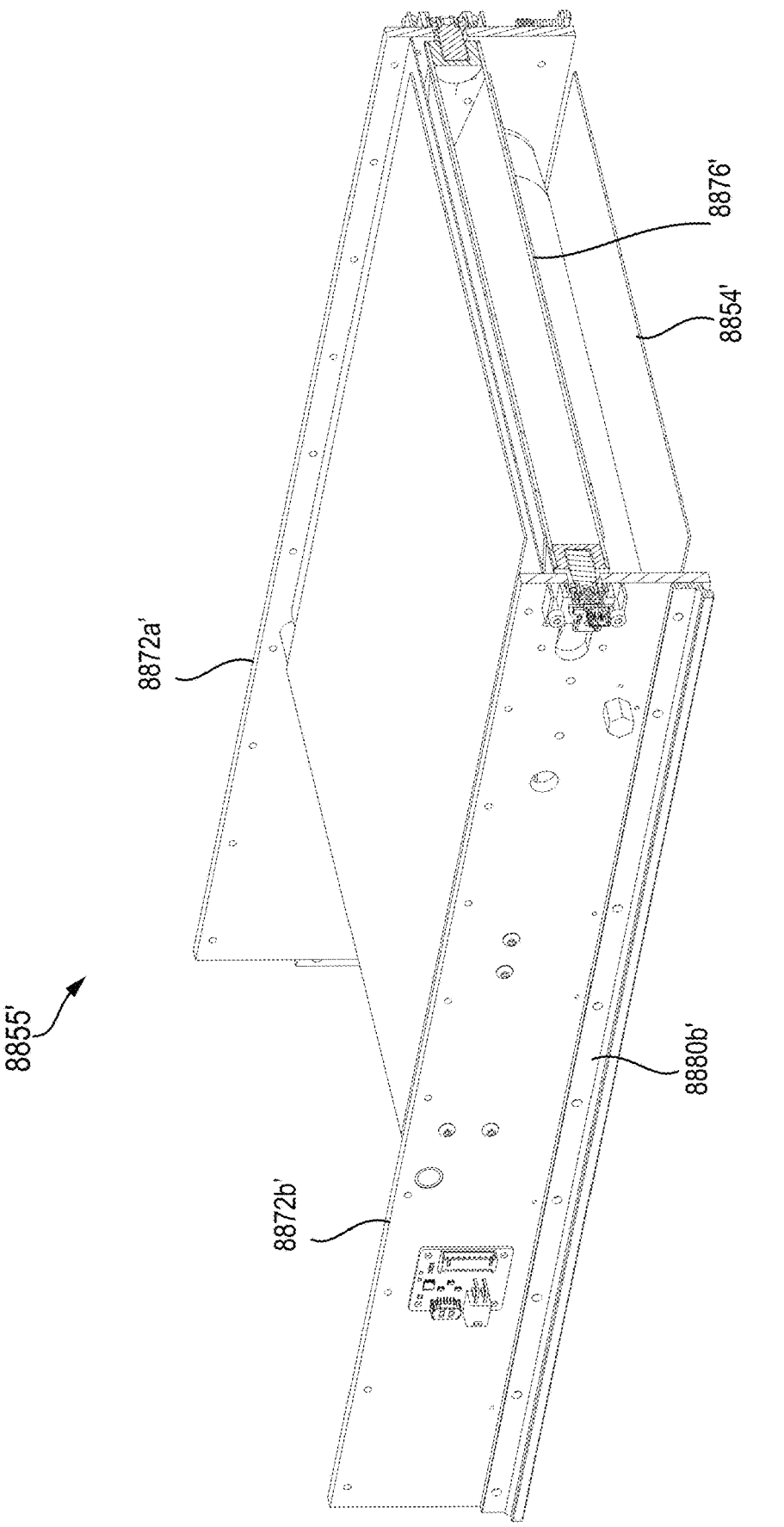
FIG. 17A depicts a perspective side view of the conveyor of FIG. 14.

In implementations, the conveyor belt 8854', 8854" (FIGS. 11, 16A-18) is elastic, which allows a slightly larger installation stretch and improves tracking. Additionally or alternatively, in this implementation and all others, roller 8858, 8858' of the depositing end 8857, 8857' has disposed thereon or thereabout one or more sleeves for preventing belt drift during circulation of the conveyor belt 8854', 8854". Additionally, in implementations, the drive pulley is also lagged (e.g., coated in a thin rubber coating) to improve friction against the belt, which also helps with tracking and prevents the belt 8854 drive without slipping. Additionally or alternatively, in implementations, a snub roller can be added just behind the drive roller 8858, 8858' to help maintain wrap and friction on the lagged drive roller 8858, 8858'. In other implementations, a conveyor sleeve (plastic or rubber) can fit over the center of the drive roller 8858, 8858' (also 8875' in the implementation of FIGS. 16A-B) to enable tracking instead of crowning the roller and lagging the pulley. Alternatively, several small tracking sleeves can be placed on either side of one or more of the rollers 8858', 8858', which can also assist tracking. Additionally or alternatively, in implementations such as that of FIG. 10, the angle of the tension roller 8859 can be slightly adjusted with tension screws to push the roller 8850 into the belt 8854, which can also help assist tracking. Alternatively, in implementations such as that of FIG. 17, tracking is achieved by tensioning roller 8876' by adjusting tension screws on either side of the roller.

As shown in FIGS. 14-21, in implementations, a carriage 8870' of the conveyor 8855' comprises a pair of externally mounted longitudinal siderails 8872*a'-b'* having protrusions 8880*a'-b'* affixed along the length thereof for engaging with stationary bearings 8881*a'-b'*, *a"-b"* (FIG. 21) that allow the carriage 8870' to extend in forward and reverse directions to cantilever in both directions. Each one of the longitudinal siderails 8872*a'-b'* extends the length of the conveyor 8855'. In implementations, each one of the longitudinal siderails 8872*a'-b'* comprises a thickness of between about 2 mm to 10 mm.

Figure 17B:
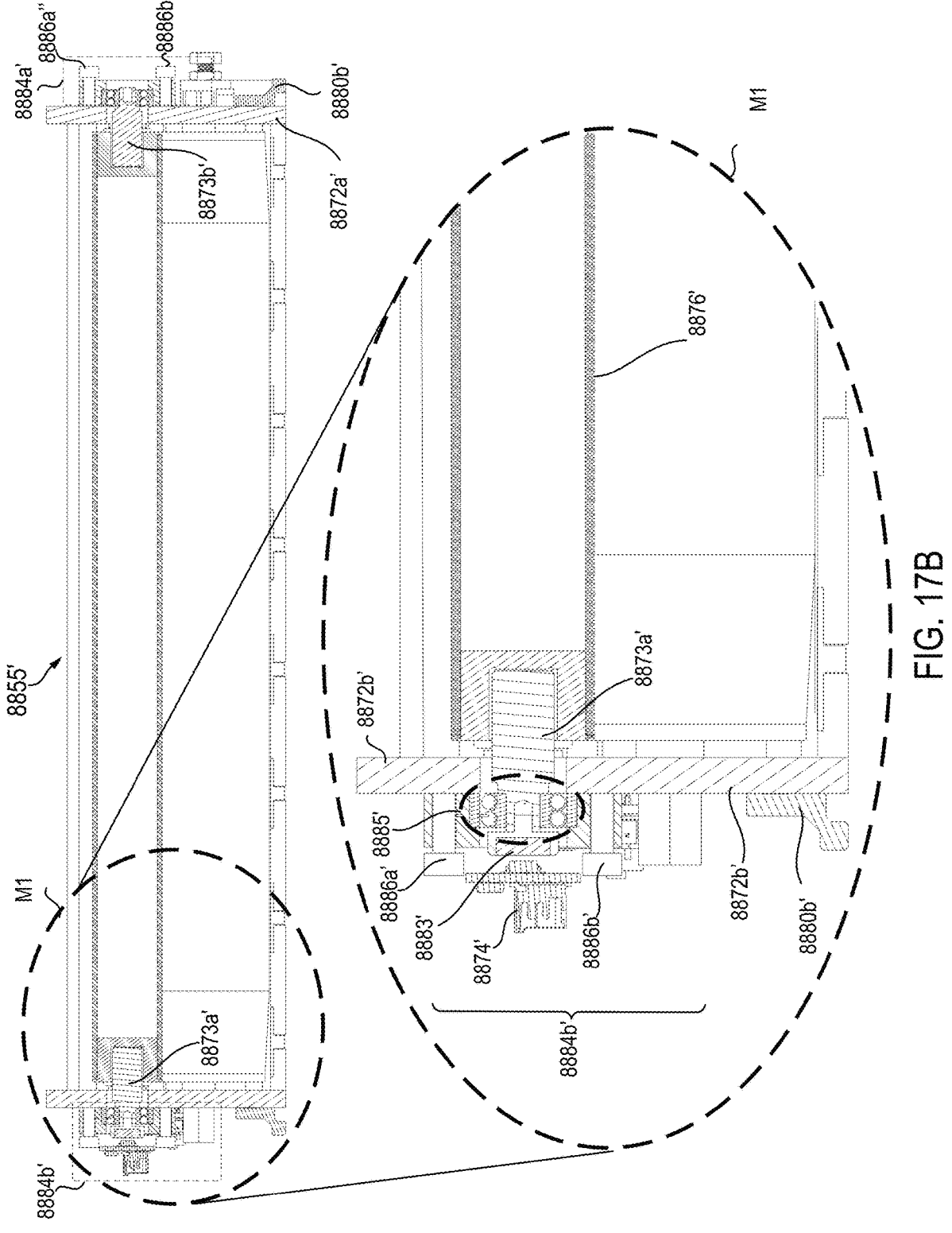
FIG. 17B depicts a cross section end view of the assembly of the conveyor of FIG. 17A with an enlarged cross section view of a tension roller assembly.
Figures 18A, 18B:
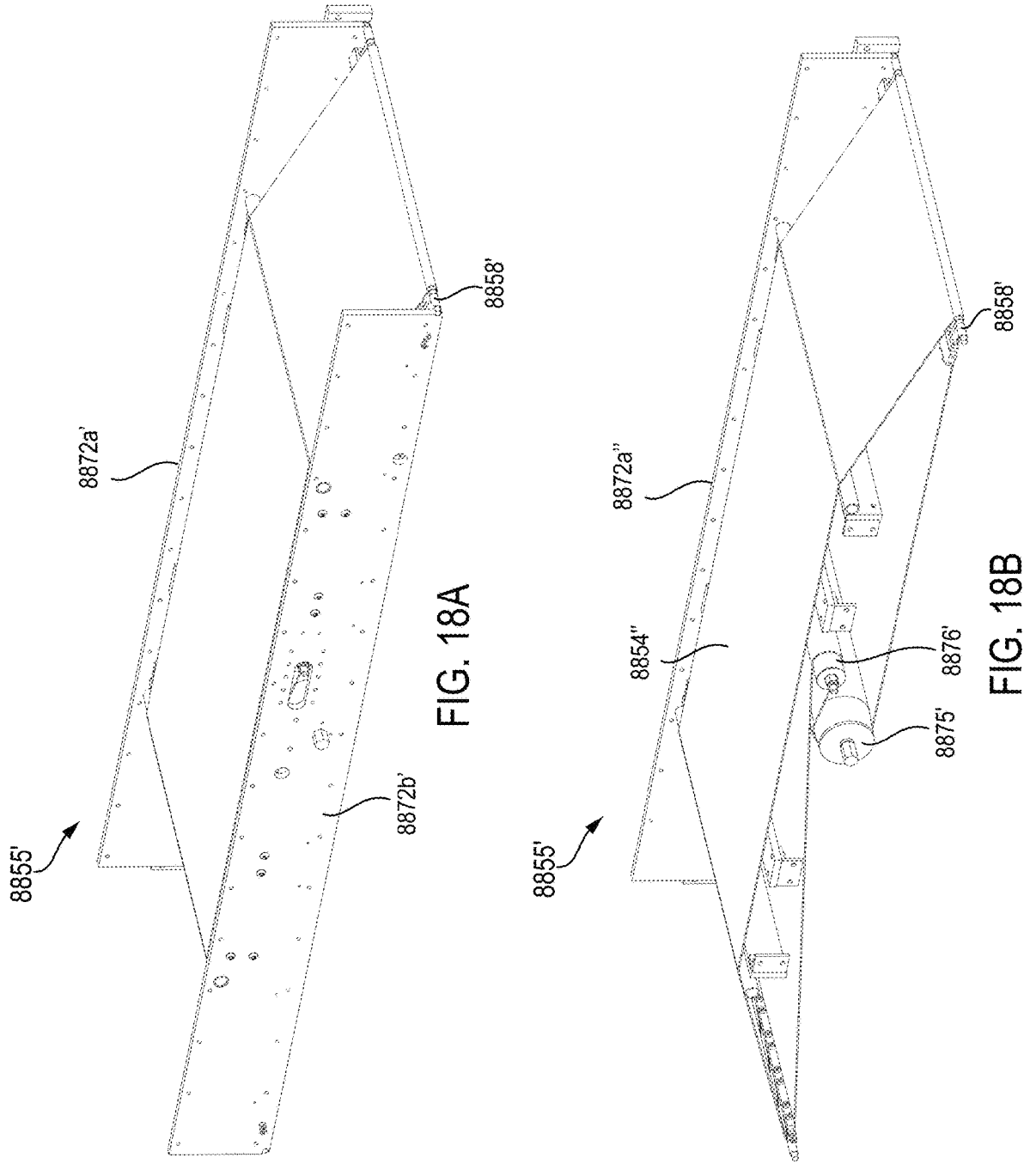
FIG. 18A depicts a perspective side view of conveyor of FIG. 14.
FIG. 18B depicts a cross sectioned view of the assembly of FIG. 18A depicting the assembled tension roller assembly of FIG. 17.

As shown in the cut away view of FIGS. 16A-17B and 18B, the carriage 8870' comprises a drive roller 8875' having a motor therewithin and a tension roller 8876' for tensioning the belt 8854' of the conveyor 8855'. The tension roller 8876' increases the wrap of the belt 8854' around the drive roller 8875', which helps prevent slipping. Additionally, as shown in FIGS. 17A-18B and in particular in the magnified view M1 of FIG. 17B, in implementations the tension roller axle 8873*a'* and magnet 8883' and encoder 8874' pairing are accessible from an exterior surface of one of the longitudinal rails 8872*b'* against which the axle 8873*a'* is affixed with a removable bolt 8886*a'-b'*, pin, or other removable fastener of a tension block 8884*b'*. The tension roller axle 8873*a'* is held in a bearing 8885' in the tensioner block 8884*b'*. An end of the axle 8873*a'* on one side has a magnet 8883' pressed into it which is paired with the magnet encoder 8874'. The axle 8873*a'* is held by the bearing 8885' in the tensioner block 8884*a'*, and the tensioner block 8884*a'* is held against the siderail 8872*b'* with the selectively removable bolts 8886*a'-b'*. This configuration enables the tension roller 8876' to rotate freely in the bearings 8885' as the belt 8854' moves. The motion of the tension roller 8876' and the magnet 8883' disposed thereon is then detected by the magnet encoder 8874'. In implementations, the axle 8873*a'* comprises a small shoulder that presses against the bearings 8885' in the tensioner block 8884b'. In implementations, as shown in FIG. 17B, the conveyor 8855' comprises two tensioner blocks 8884a'-b', one on each side of the tension roller 8876' that holds one of each of the two axles 8873a'-b' of the tension roller 8876', and the tensioner blocks 8884a'-b' are removable from the outside with removable bolts 8886a'-b', a''-b''. The axles 8873a'-b' are held in place by the tensioner block 8884a'-b' and bearings 8885', which are in turn affixed with removable fasteners, allowing the tension block, axle, and thus the tension roller and belt to be removed without disassembling anything else. This provides easy access for maintenance, removal, and/or replacement of the belt 8854', tension roller 8876', roller axle 8873a'-b', and magnet 8883' and encoder 8874' pairing without requiring disassembly of the entire carriage 8870'.

In implementations, the magnet 8883' and encoder 8874' pairing is in communication with a controller, e.g., controller 8005, for providing to the controller an output signal indicative of how fast the belt 8854' is moving so that the controller can control the speed of the drive roller 8875'. Because the tension roller 8876' rotating with the belt without slipping (because it's just rotating freely in bearings 8885'), the magnet 8883' and encoder 8874' pairing enables encoding the belt 8854' speed independent of the drive roller 8875'. This means that (even if the drive roller 8875' is slipping), the magnet 8883' and encoder 8874' pairing provides an accurate measure of how fast the belt is currently moving and the controller 8005 is better able to control it well. The magnet 8883' and encoder 8874' pairing is thus configured to enable controlling belt speed and/or motion. Additionally or alternatively, an encoder disposed on the drive roller 8875' is configured to sense belt 8854' speed and/or motion. In implementations, the encoder can be, for example, an incremental or speed encoder. In implementations, the encoder can be, for example, a hall sensor integrated into the drive roller 8875' for outputting a signal for controlling the motor, e.g., a BLDC motor.

Returning to FIGS. 4A-B, in implementations, the depositing end 8857, 8857', (together 8857) of the conveyor 8855, 8855' (together 8855) is parallel to a length LQ of the packing queue platform 8200. In implementations, the conveyor 8855 comprises a length ranging between about 0.75-1.25 m and a width CW, CW' (together CW) ranging between about 30-45 cm and the packing queue platform 8200 comprises a width (QW) of between about 50-75 cm. The width CW of the conveyor 8855 is configured to be equal to or greater than a maximum dimension of a plurality of predetermined final folding dimensions of the plurality of folded laundry articles and the width QW of the packing queue platform is configured to be equal to or greater than twice a medium predetermined dimension for accommodating two folded articles of medium size side by side along the packing queue Q. For example, the plurality of predetermined sizes can include folded length and width dimensions of 20×12 inches, 10×12 inches, 5×12 inches, 6×10 inches, and 5×6 inches for combing and orienting folded articles 7300 in even stacks 7301 in a particular order for efficiently loading into a shipping container 7800 having dimensions of approximately 14×24 inches. (In an alternative embodiment, the packing queue platform 8200 can be narrower and accommodate a single row of articles 7300 or article stack 7301, rather than two parallel queues Q$_{1-2}$. For example, the narrower queue platform 8200 can comprise a width of between about 25-35 mm and the conveyor 8855 can comprise a length of between about 0.5-0.75 m.) As will be described subsequently with regard to implementations, the system 8000 intelligently stacks the folded articles 7300 in a particular order and to a particular stack height to minimize or eliminate empty space in the shipping container 7800 and add stability to the shipped articles 7300 so that they remain folded in transit.

To effect this intelligently ordered queuing, the conveyor 8855, 8855' (collectively 8855) is disposed on an elevator 8862, 8862' (collectively 8862) configured to move horizontally along a length LQ of the packing queue platform 8200 to one of a plurality of predetermined positions PPa-PPn, and an elevator platform 8863, 8863' (collectively 8863) is configured to move the conveyor 8855 vertically on the elevator 8862 at each predetermined position PPa-PPn to deposit an article at a particular height of a stack 7301. A predetermined position PPa-PPn comprises at least a horizontal position PPa-n along the length LQ of the platform and can also include a position PVa-n at least one of within, above, and on the packing queue platform 8200 at the horizontal position. In implementations, a gantry 8860 comprises the vertically actuated elevator 8862 movably coupled to one or more horizontal rails 8864, 8864a-b extending parallel to the length LQ of the packing queue platform 8200 on which bearings of the elevator 8862 ride. In implementations, the one or more horizontal rails 8864a-b comprised an upper rail 8864a and a lower rail 8864b for stability. The rails 8864a-b can comprise, for example, SBR rail for stability in transit and the rails 8864a-b are configured to engage linear bearings 8861a-n (FIG. 31) of the elevator 8862. In implementations, the horizontal rails 8864a-b are adjacent to the platform 8200 and supported independently with support legs. Additionally or alternatively, the horizontal rails 8864a-b can be attached to the platform 8200 with one or more fasteners to ensure level alignment of a conveyor 8855 thereon with the platform 8200. Additionally or alternatively, in implementations, the conveyor 8885 could also be supported from above or below on a rail or track, attached to ceiling and/or floor or other larger structure. Such implementations enable access to multiple queue platforms stacked vertically. In implementations, the conveyor 8855 could be attached to its own cart or carriage that runs on wheels in an upper/lower track or rail.

In implementations, the carriage 8870, 8870' (collectively 8870) defines the structure of the conveyor 8855 and is configured to mount to the elevator 8862. For example, as described previously with regard to FIG. 7 linear bearings 8881 or bushings affixed to the platform 8863 of the elevator 8862 are configured to engage protrusions 8880a-b one or more side rails 8872a-b affixed to the conveyor carriage 8870 and allow the carriage 8870 to move back and forth within the bearing or bushings. For example, as shown in FIGS. 19-21 a pinion gear 8882' of the elevator platform 8863' is configured to engage one or more extend rack gears 8879' disposed along the length of at least one of the siderails 8872b' affixed to the conveyor carriage 8870', and the carriage 8870' is configured to move back and forth in the bearings 8881a'-b', a''-b'' disposed on the elevator platform 8863'.

The platform 8863' further comprises a drive motor 8865' mounted thereto and configured drive the carriage 8870' to cantilever (e.g., extend) the retrieving end 8856' of the conveyor 8855' over an orienter 8700 table configured to rotate a folded article to a particular orientation and the depositing end 8857' over the packing queue platform 8200 to deliver a folded laundry article 7300 to the packing queue Q at a particular height, either directly on the surface of the packing queue platform or atop another already queued folded laundry article 7300 or article stack 7301. In implementations, as previously described, the drive motor 8865' comprises a friction wheel. Alternatively, in implementations, as shown in FIG. 20, the siderails 8872' and drive motor 8865' engage in a rack and pinion configuration. For example, the rack gear 8879' can be mounted to a sidewall 8872b of the carriage 8870' and the pinion gear 8882' can be attached to the drive motor 8865" on the elevator platform 8863" for engaging with the rack gear to drive the carriage 8870' back and forth. In implementations, the conveyor 8855, 8855' can be extended and retracted by other linear drive assemblies including at least one of pistons, ball screws, and belt, screw, and roller guided drive assemblies configured to impart linear motion.

Figure 19:
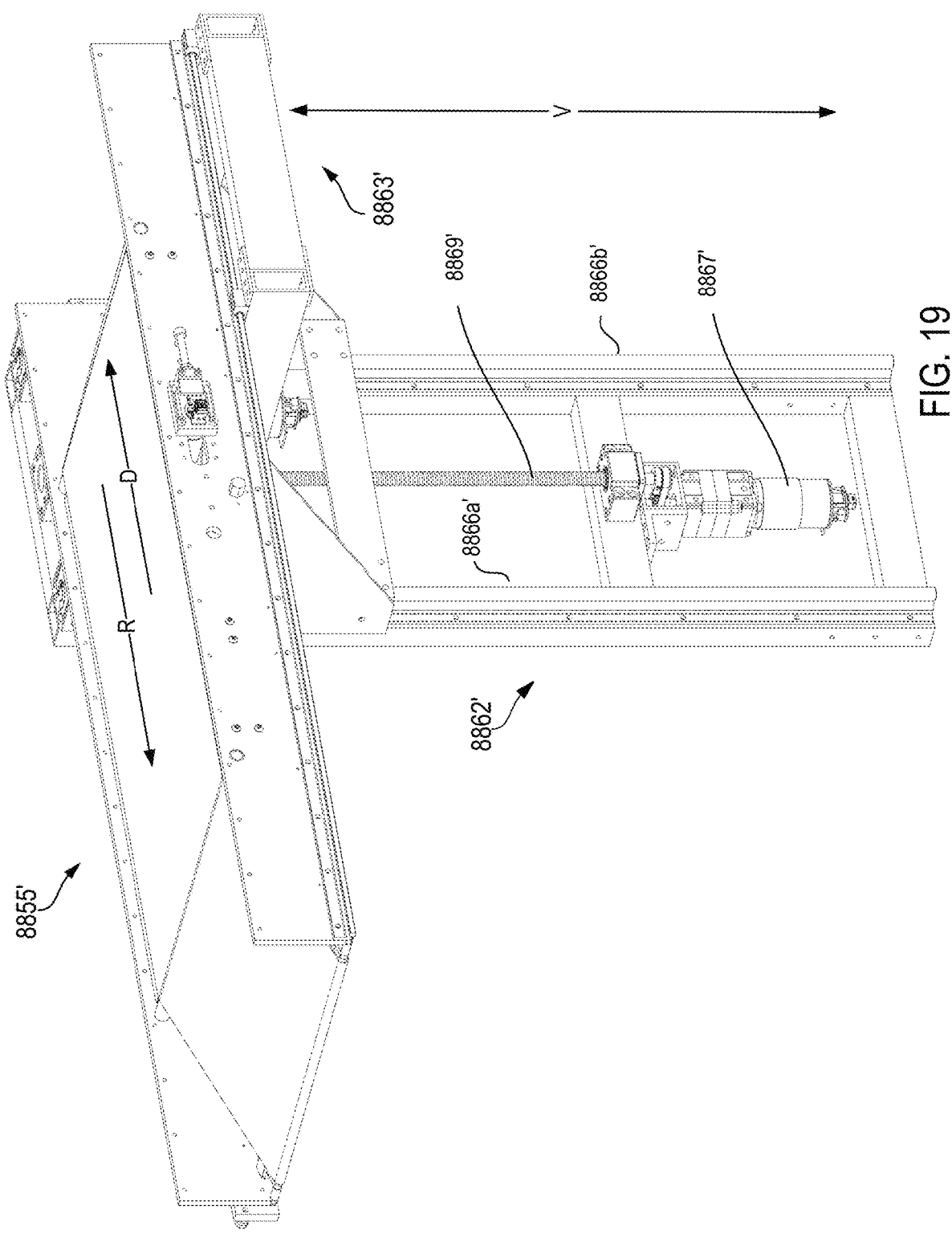
FIG. 19 depicts a perspective view of an example assembly of the conveyor of FIGS. 14-18B movably engaged with an elevator platform and elevator.
Figure 20:
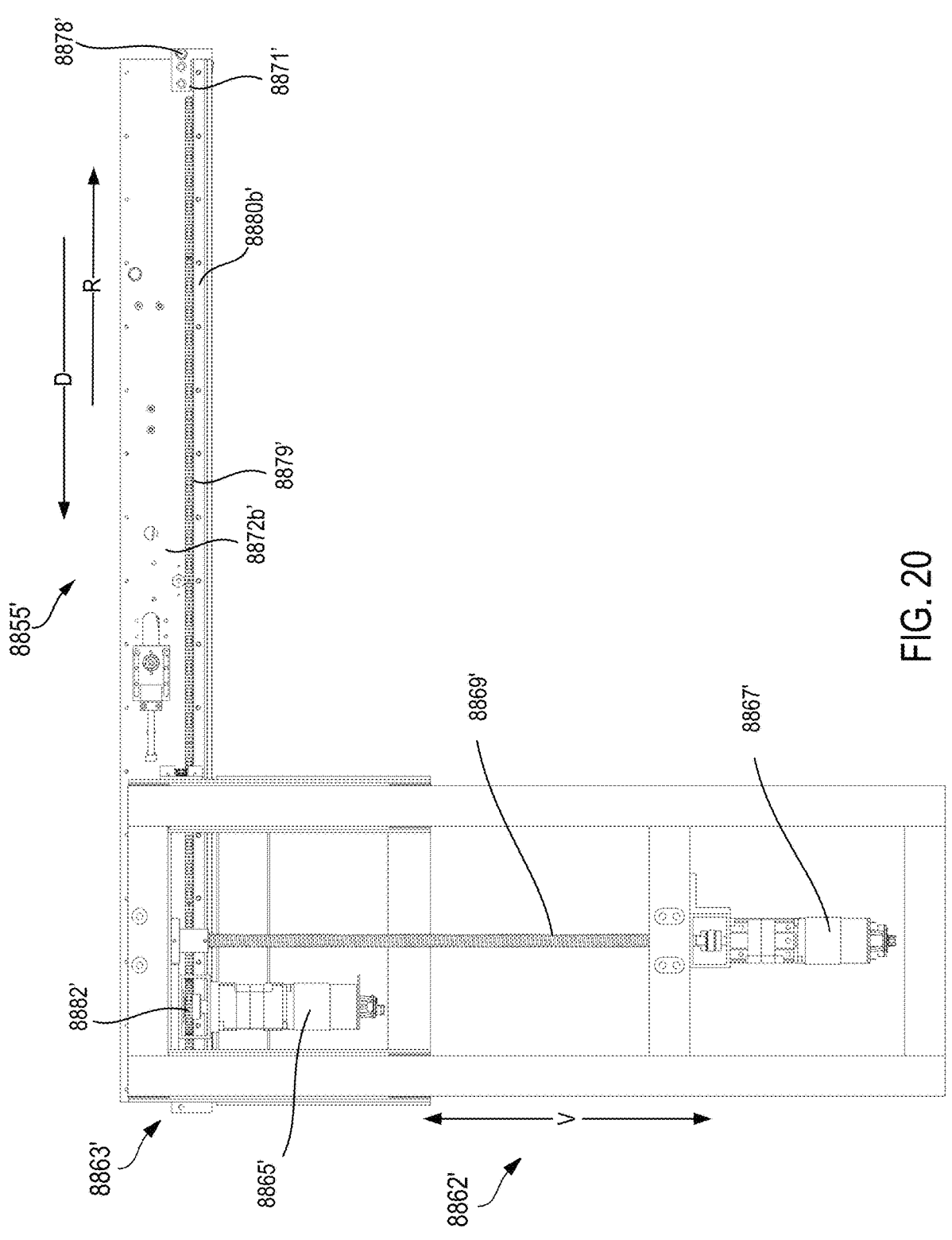
FIG. 20 depicts a rear view of the assembly of FIG. 19 including a rack and pinion conveyor extend mechanism.
Figure 21:
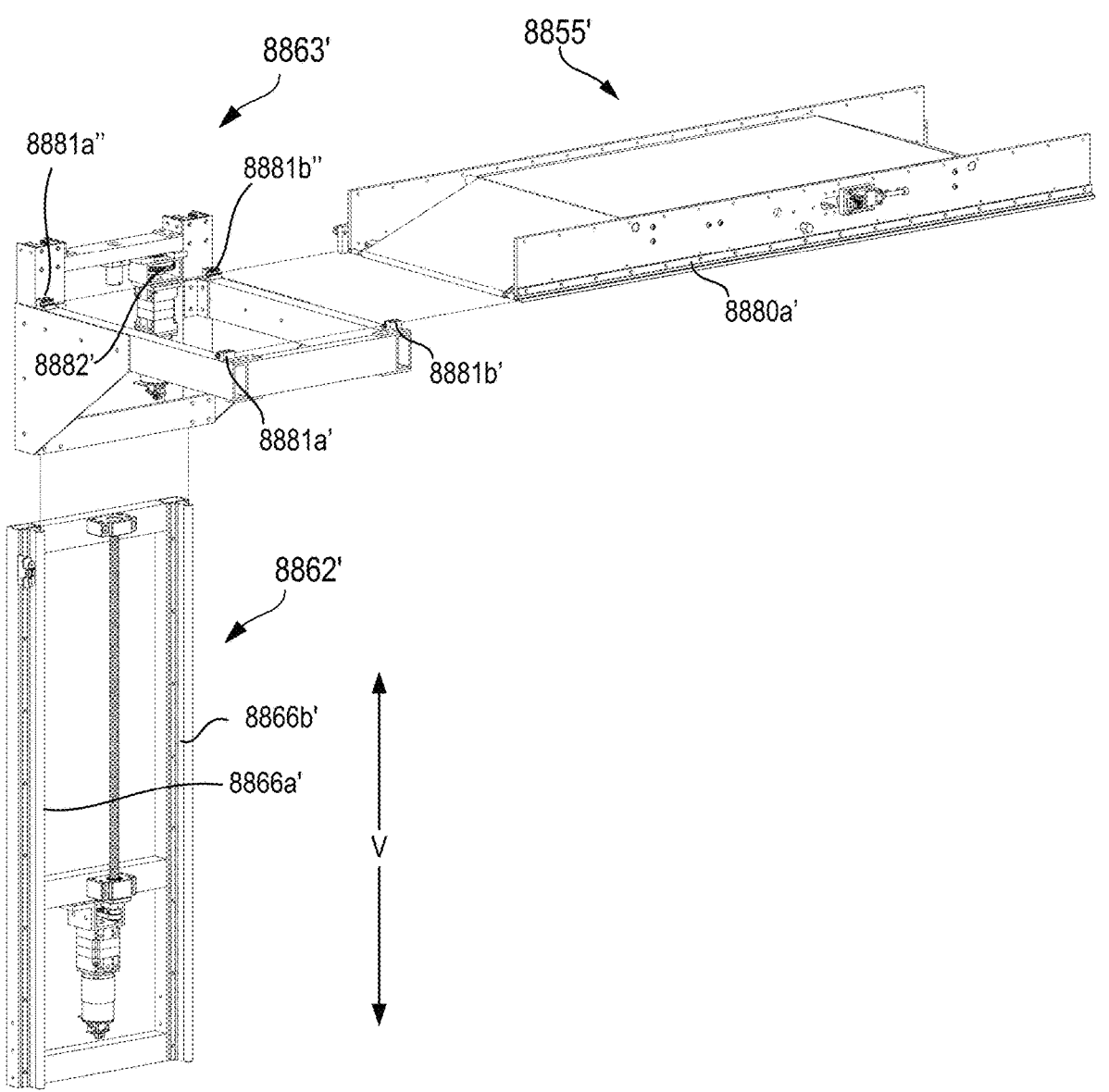
FIG. 21 depicts an exploded view of the assembly of FIGS. 19 and 20.

Additionally, as shown in FIGS. 19-21, in implementations, the platform 8863' is configured to raise and lower on the elevator 8862' in the direction of arrow V. In implementations, the platform 8863' configured to engage one or more vertical rails 8866a'-b' disposed on (e.g., affixed to or formed with the elevator), such as SBR linear rails. An elevator drive motor 8867' is configured to raise and lower the platform 8863' via a linear motion. In implementations, the drive motor 8867' is operably linked to the elevator 8863' via a ball screw and nut assembly 8869'. Additionally, in implementations, the carriage 8870 further comprises disposed thereon at one or both ends on a face of the side rails 8872a"-b" at least one of a hard stop 8871" and a limit switch 8878" configured to detect an end of travel in a full cantilevered extension in the direction of either arrow D and R.

Returning to the system schematic of FIG. 3, in implementations, the system 8000 comprises one or more drives comprising at least one of one or more belt drives 8825 configured to rotate a belt 8854 (e.g., 8854, 8854') of the conveyor 8855 (e.g., 8855, 8855'), a cantilever drive 8810 in operable communication with the cantilever drive motor 8875 (e.g., 8865, 8865'), an elevator drive 8820 in operable communication with an elevator drive motor 8867 (8867, 8867"), and a gantry drive 8850 configured to transit the conveyor along the horizontal rails 8864a-b. In implementations, a gantry drive comprises a stationary motor and a timing belt that pulls the elevator 8862 back and forth. Other implementations comprise a chain and sprocket. In other implementations, the motor could be disposed on the elevator 8862 to drive it along a chain or timing belt, cable drive, etc. In implementations, the one or more belt drives 8825 and the cantilever drive 8810 are configured to be controlled simultaneously.

Figure 25:
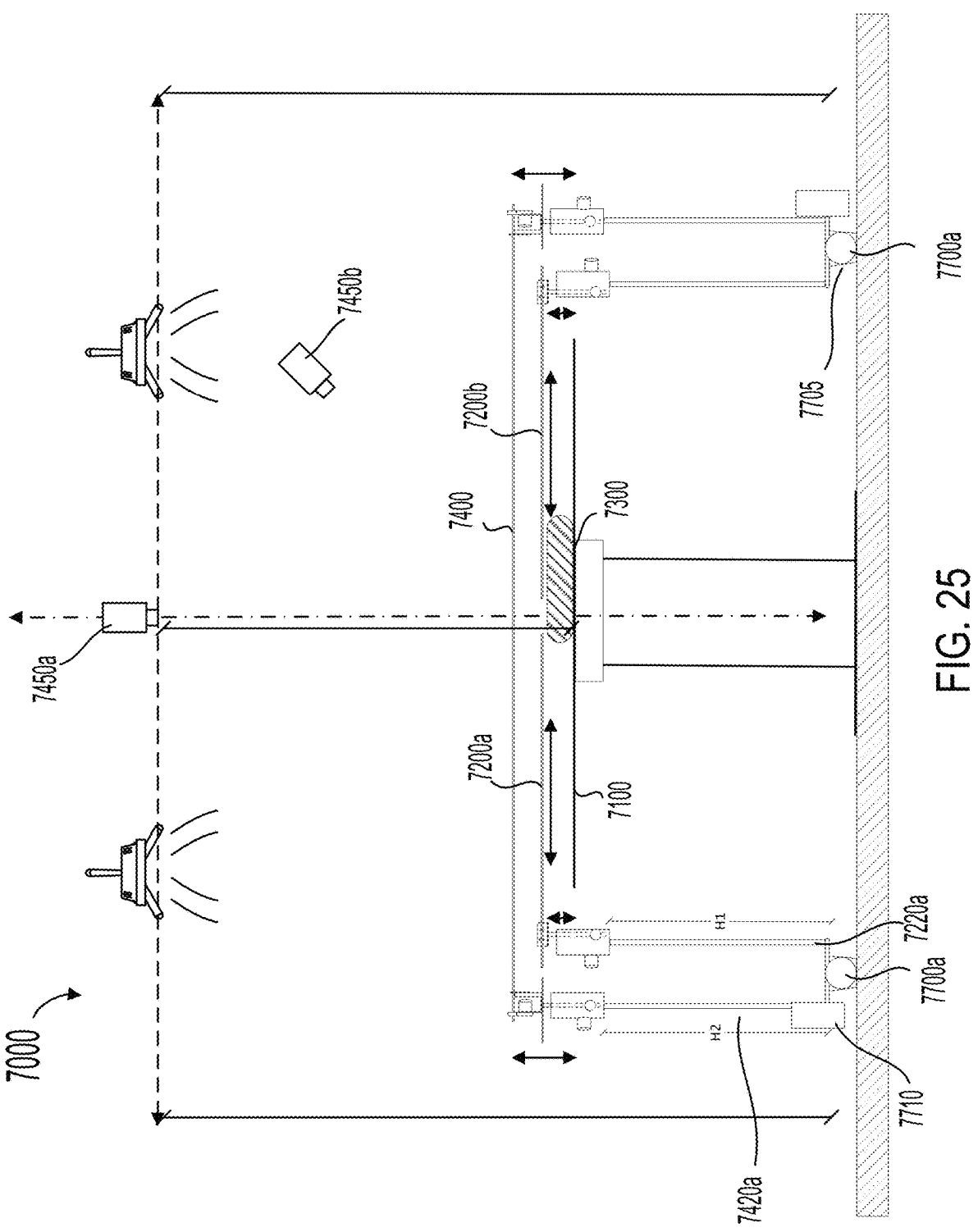
FIG. 25 depicts a schematic side view of an example autonomous folding device.

In implementations, the system further comprises at least one sensor 8750, 7450 (FIG. 25), 8210 configured to output a signal indicative of at least two of an area footprint of the folded laundry article 7300, an orientation of the area footprint relative to a longitudinal axis LQ of the packing queue Q and packing queue platform 8200, a retrieval edge of the folded laundry article 7300, a height Ha of the folded laundry article, and an article type. An area footprint is an area (Lx*Wx) occupied on the surface of the packing queue platform 8200 by each unbound folded laundry article. For example, in implementations, as will be described subsequently with regard to implementations, at least one sensor 7450 of a folding robot 7000 can provide a signal indicative of at least one of an area footprint, height, orientation, and article type of a folded article 7300. The packing controller 8005 could then use this information communicated via a network 230 to decide where to put the article on a stack 7301 on the queue conveyor 8200 or queue platform. The controller 8005 could keep track of stack heights $H_A$ after loading an article 7300 in addition to or alternatively to measuring stack heights $H_A$ with the at least one sensor 8210.

In implementations, the system 8000 comprises at least one controller 8005 in operable communication with the one or more drives 8825, 8810, 8820 and the at least one sensor 8750, 7450, 8210. The controller 8005 (or a controller 7005 of a preceding robot 7000 in wired or wireless communication with the controller 8005) is configured to determine, based on a received sensor signal, at least one detected characteristic of the folded laundry article 7300 comprising at least one of article size, article type, an area footprint, and an orientation of the area footprint relative to a longitudinal axis LQ of the packing queue Q. The controller 8005 is configured to instruct the elevator drive 8820 and the gantry drive 8850 to align the conveyor 8855 (e.g., 8855, 8855') with a selected location (e.g., position PPa-n and PVa-n) along the stationary horizontal rail 8864 based on the determined at least one characteristic. The controller 8005 is configured to instruct the cantilever drive 8810 to extend the depositing end 8857 (e.g., 8857, 8857') of the conveyor 8855 over the packing queue platform 8200 at the selected position (e.g., predetermined position PPa-n and PVa-n).

Figure 31:
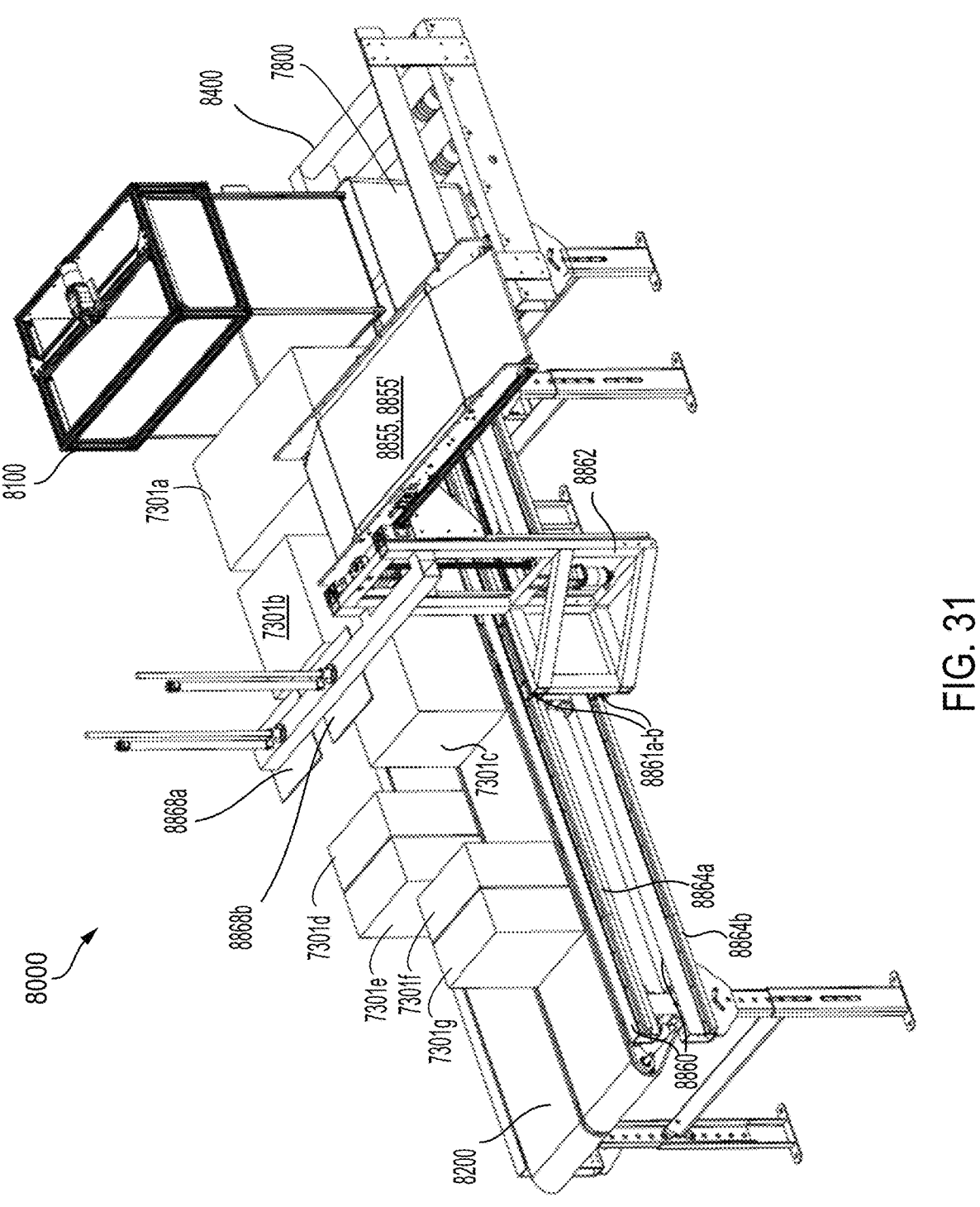
FIG. 31 depicts a schematic perspective front view of an example queueing system comprising two mechanical plungers configured to compress stacks of folded laundry articles for compact loading into a shipping container.

The controller 8005 is configured to determine alignment of the depositing end 8857 based on the at least one sensor signal, and instruct, simultaneously, the one or more belt drives 8825 to rotate the belt 8854 of the conveyor 8855 and instruct the cantilever drive 8810 to withdraw the cantilevered depositing end 8857 to deposit the folded laundry article 7300 at the selected location PPa-n and PVa-n. In implementations, the system 8000 comprises at least one position sensor 8830 disposed along at least one of the queue conveyor 8200, rails 8864a-b, elevator 8862, or a rail support 8860 (FIGS. 5 and 31). The position sensor 8830 is configured to output a signal to the controller 8005 determinative of a position of the conveyor 8855 along a length of the horizontal rails 8864a-b. For example, the position sensor can include at least one of a camera, an optical break beam, a hall sensor, a proximity sensor, and an IR sensor. In implementations, the position sensor 8830 can comprise a rotational encoder disposed on a gantry drive motor for transiting the elevator along the rails 8864a-b. The encoder is configured to output a signal to the controller 8005 indicative of an absolute position of the conveyor 8855 along the rail 8864. In implementations, the encoder is re-zeroed and/or re-calibrated with a limit switch at least one end of the gantry rail 8864.

As will be described subsequently with regard to FIG. 33, the packing queue platform 8200 is configured to receive each one of the plurality of folded laundry articles 7300 at a selected position along a length LQ of the packing queue platform 8200. In implementations, the plurality of folded laundry articles 7300 comprises at least one of two or more types of laundry articles and two or more sizes of laundry articles.

As indicated in the schematic implementation of FIG. 3, the output signal of the at least one sensor 8750, 7450, 8210 is configured to be communicated via a wired and/or wireless communication network 230. Turning now to FIGS. 22-27, the at least one sensor 8750, 7450, is disposed proximate at least one of an autonomous folding device 7000 configured to folded the folded laundry article and the orienter 8700. Additionally or alternatively, the at least one sensor comprises one or more sensors 8210 disposed on the gantry 8860. In all implementations, the one or more sensors 8750, 7450, 8210 comprises one or more depth-detecting sensors. The one or more sensors can include at least one of a 3-D camera, an IR sensor, a 2-D camera, LIDAR, LADAR, a sonar proximity sensor, an ultrasonic ranging sensor, a radar sensor, and a pair of stereo depth cameras. In implementations the one or more sensors comprises a REALSENSE camera, positioned above and aimed at a surface of at least one of the orienter 8700, the packing queue platform 8200 and the folding device 7000. In implementations, the surface(s) is non-speculative. In implementations, the surface is a single color, such as white or grey, for providing readily detected contrast to most household laundry articles 7300.

Figure 22:
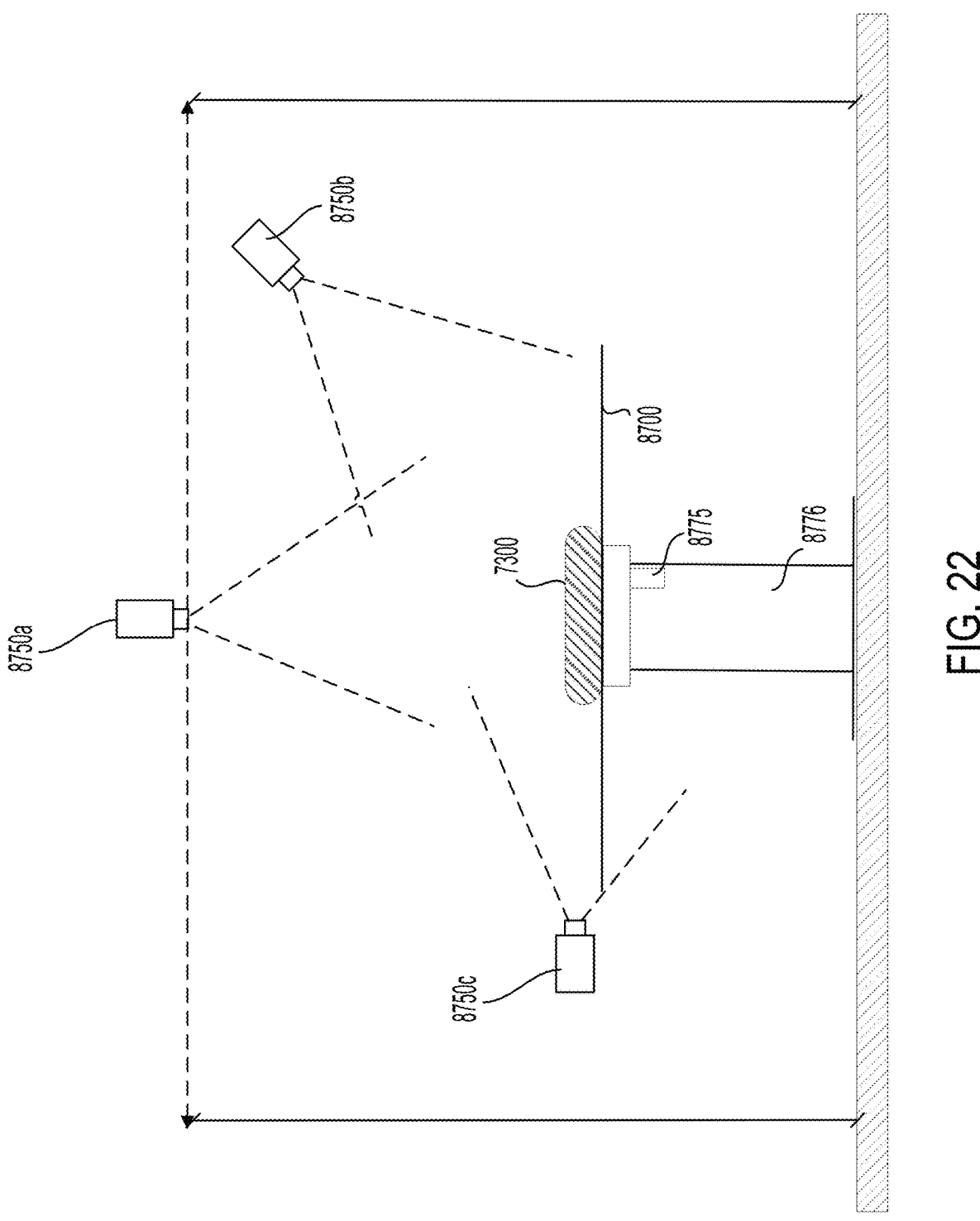
FIG. 22 depicts a schematic side view of an orienter (e.g., rotating platform) of the system.
Figures 23A, 23B, 23C:
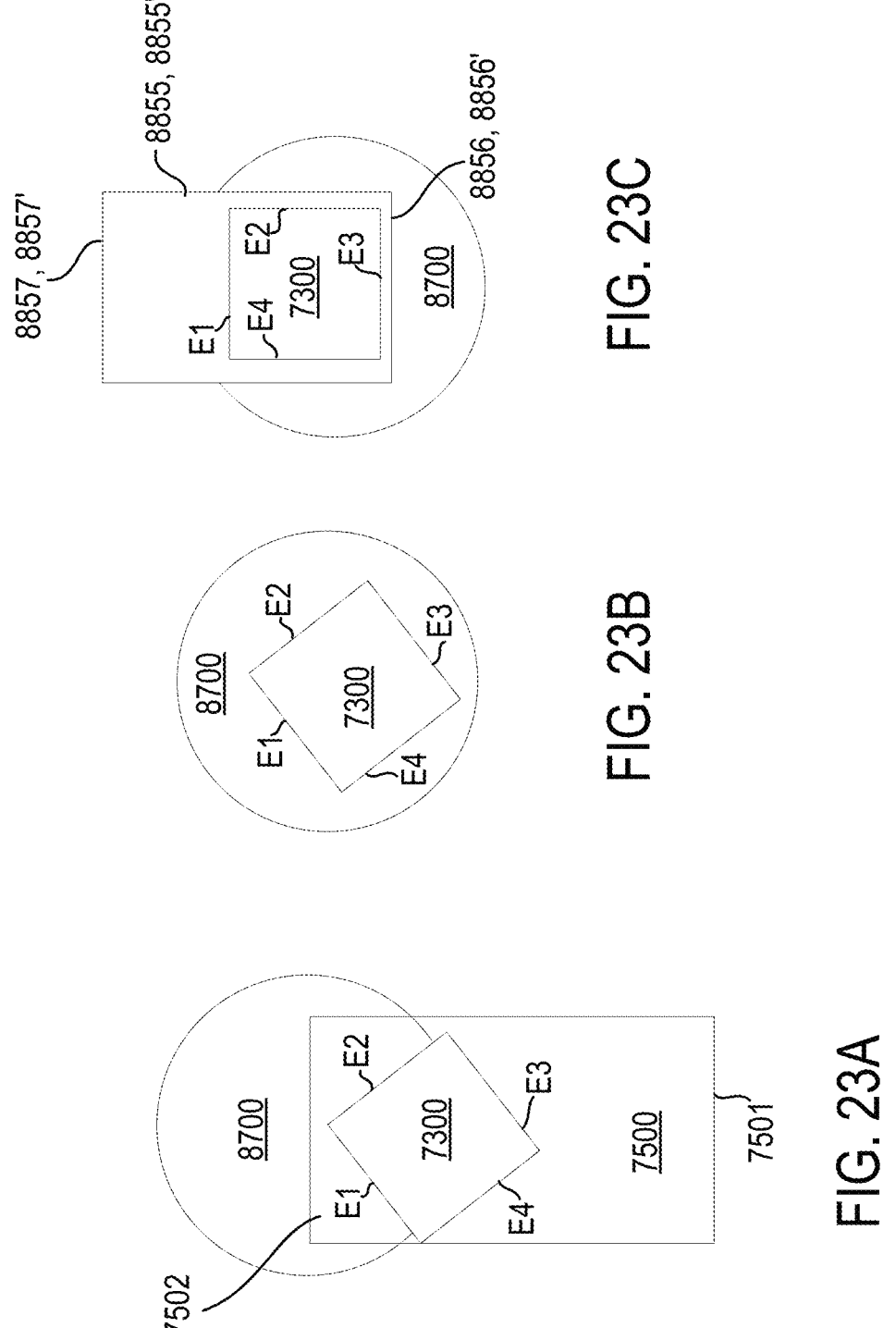
FIGS. 23A-C depict schematic sequential views of an orienter receiving and rotating a folded laundry article for retrieval and queueing.

As shown in FIGS. 22-23C, the orienter 8700 is configured to receive (FIG. 23A) the folded laundry article 7300 from an autonomous folding device and rotate (FIG. 23B) the folded laundry article 7300 such that an edge E1 detected by at least one sensor 8750*a-c* is oriented substantially parallel to the retrieving end 8856 of the conveyor 8855 for retrieval (FIG. 23C). In implementations, detecting the edge E1 of the folded laundry article comprises detecting with the at least one sensor 8750*a-c* a position and location of the edge E1 relative to a known and/or optically detected retrieving end 8856 orientation and location. As shown in FIG. 22, in implementations, the orienter 8700 comprises a rotatable platform and a drive motor 8775 in operable configuration with the at least one controller 8005. The drive motor 8775 is configured to rotate the platform (FIG. 23B) about a stationary pedestal 8876 and therefore rotate the folded laundry article 7300 thereon into alignment with at least one of one or more articles or stacks 7301 of the packing queue Q and the longitudinal axis LQ and width QW of the queue platform 8200. In implementations, the stationary pedestal 8776 is secured to the floor or platform therebeneath with fasteners such as bolts, screws, rivets, clamps and any other fastener that ensures the rotatable platform remains level. In implementations, the folding device 7000 is also the orienter 8700 and orients the folded article for alignment with the conveyor 8855 through one or more rotations and lifts with one or more folding and clamping rods and blades.

Figures 24A, 24B, 24C:
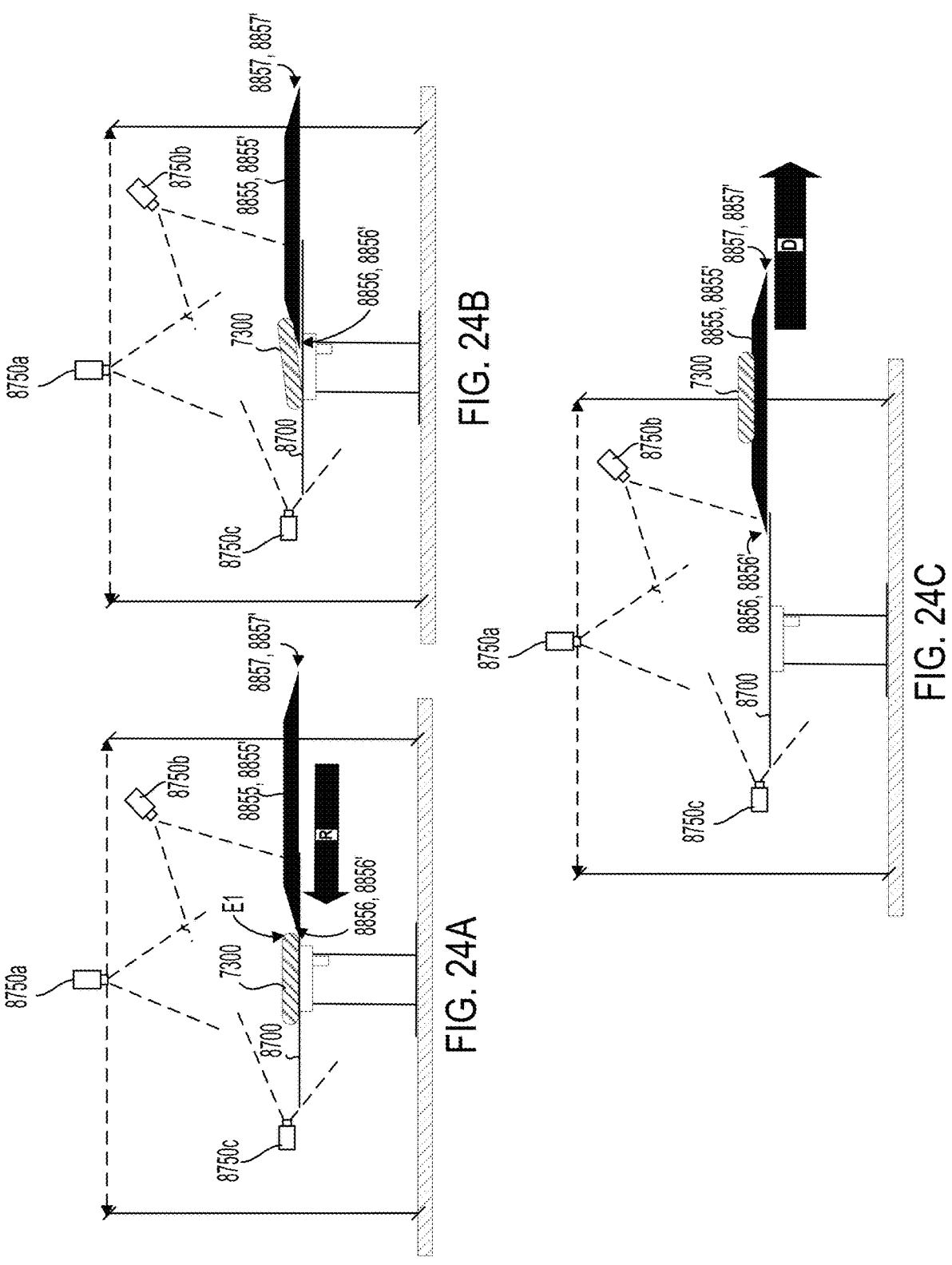
FIG. 24A depicts a schematic side view of a conveyor cantilevered over an orienter to retrieve a folded laundry article.
FIG. 24B depicts a schematic side view of the conveyor of FIG. 24A drawing the folded laundry article up onto the conveyor.
FIG. 24C depicts a schematic side view of the conveyor of FIG. 24B cantilevering away from the orienter for queuing the folded laundry article in an ordered packing queue.

In implementations, the at least one controller 8005 is configured to select the edge E1 from four edges E1-E4 of the folded laundry article 7300 based on the detected area footprint (e.g., area bounded by the four edges E1-E4) and a predetermined orientation of the detected area footprint to the longitudinal axis LQ of the packing queue Q and packing queue platform 8200. As shown in FIGS. 24A-C the at least one controller 8005 is further configured to position (FIG. 24A) the retrieving end 8856 of a conveyor 8855 cantilevered over the orienter 8700 in contact with the selected and forward oriented edge E1 of the folded laundry article 7300. Because a deformable laundry article 7300 may not fold into an exact rectangle, in implementations, the folded laundry article area footprint comprises a best-fit bounding rectangle (e.g., W2B×L2B of FIGS. 29A and 29C), and the edge E1 is an edge of the best-fit bounding rectangle rather than an edge of the folded laundry article (which likely would not be perfectly linear given the supple and/or thick fabric nature of deformable laundry articles). In implementations, the "best-fit bounding rectangle" is a target folded rectangle size selected by the folding device 7000. One or more of the controller 8005 and the folding controller 7005 determines a projection of the target rectangle on the folded article so that the target rectangle is maximally filled. For example, if the target rectangle is 10×12 inches and the folded article is not exactly of these dimensions, one or more of the controller 8005 and the folding controller 7005 identifies a 10×12 rectangle position imposed on the folded article 7300 that has the largest portion of a 10×12 rectangle boundary filled by the article. Alignment of the article 7300 within the best-fit bounding rectangle therefore can be influenced by the target rectangle size thus applied to the actual area of the folded article 7300.

Once a retrieval edge of the article is identified (preferably along a fold line so that the article 7300 is more stable and less likely to unfold during retrieval), the at least one controller 8005 is configured to instruct at least one of the elevator drive 8820 and the cantilever drive 8810 to position the retrieving end 8856 at a height in a range of between about 0.10 mm to 7 mm above a top surface of the orienter 8700 (or folding surface 7105 of the autonomous folding device 7000 (FIG. 25)). The at least one controller 8005 is configured to instruct the belt drive 8825 to circulate the conveyor belt 8854 while driving the retrieving end 8856 under the folded laundry article 7300 (FIG. 24B) such that the conveyor 8855 is moved underneath the article 7300 and the circulating belt brings the article 7300 onto the top surface of the conveyor 8855.

The circulating conveyor belt 8854 pulls the folded article 7300 up onto the conveyor 8855 at the same time that the cantilever drive motor 8865 pushes the conveyor 8855 receiving end 8856 under the folded laundry article 7300 such that the folded laundry article remains stationary as the conveyor 8855 retrieves it. The conveyor 8855 thus rotates its belt while sliding under the edge of the folded laundry article to pull the folded laundry article up onto the conveyor therefore avoiding unfolding the bottom folded layers, which would occur by pulling the folded laundry article in place without a rotating belt surface to assist with grabbing the folded article up onto the conveyor. Once the conveyor 8855 is fully underneath the folded laundry article 7300, the folded laundry article 7300 moves toward the depositing end 8857 of the conveyor 8855 on the rotating belt. As shown in FIG. 24C, as the folded laundry article 7300 moves toward the depositing end 8857 of the conveyor 8855 on the rotating conveyor belt 8854, the controller 8005 simultaneously instructs the cantilever drive 8810 to extend the depositing end 8857 over the packing queue platform 8200 by slidably moving the carriage 8870 in the direction of arrow D, away from the orienter 8700. Alternatively, in implementations, the conveyor 8855 can rotate the article to the depositing end 8857 prior or following the conveyor 8855 cantilevering over the packing queue conveyor 8200 or platform.

Figure 26:
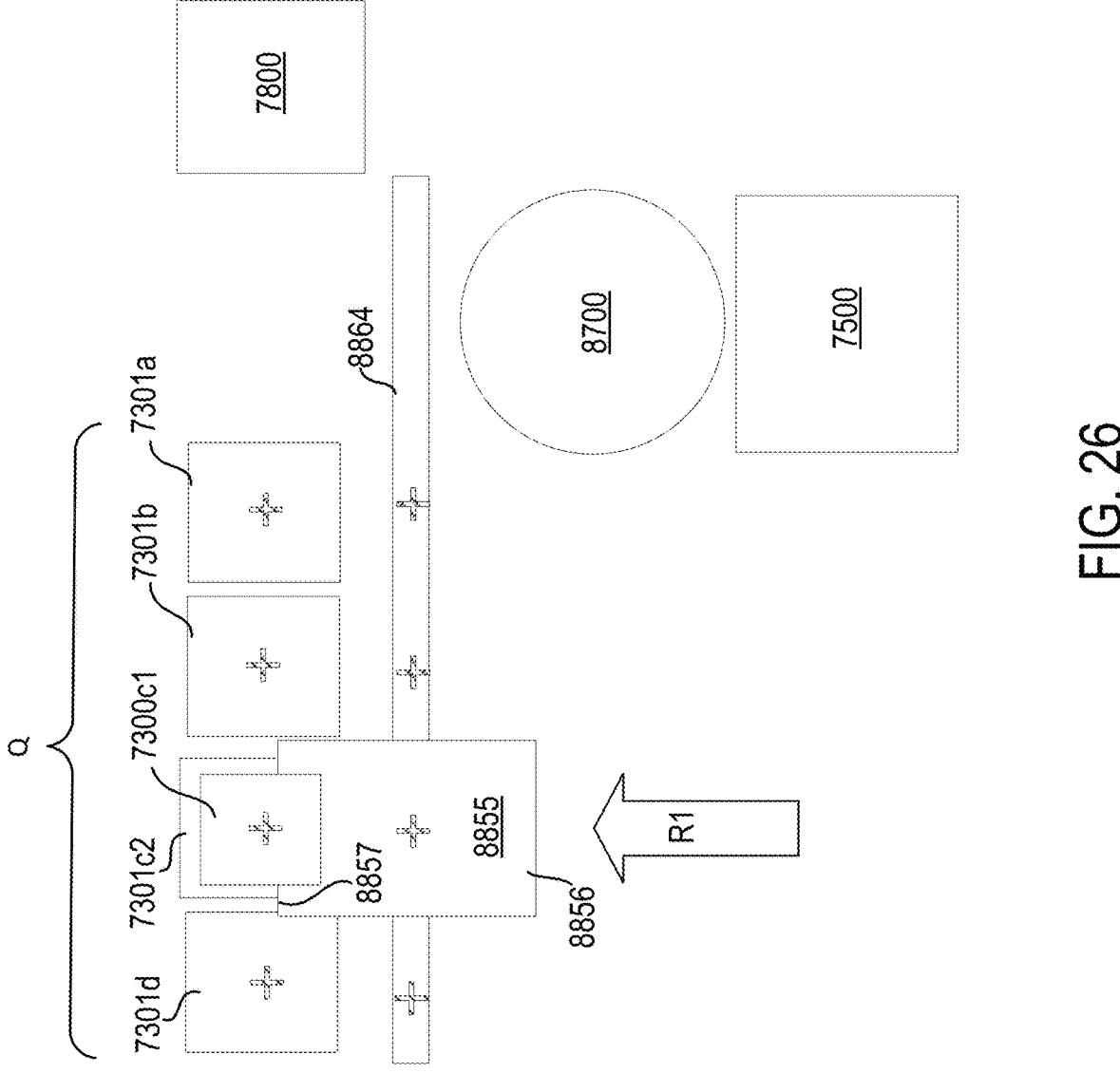
FIG. 26 depicts a schematic top view of the example system of FIG. 3 depicting a conveyor depositing a folded laundry article into a packing queue at a selected position.
Figure 27:
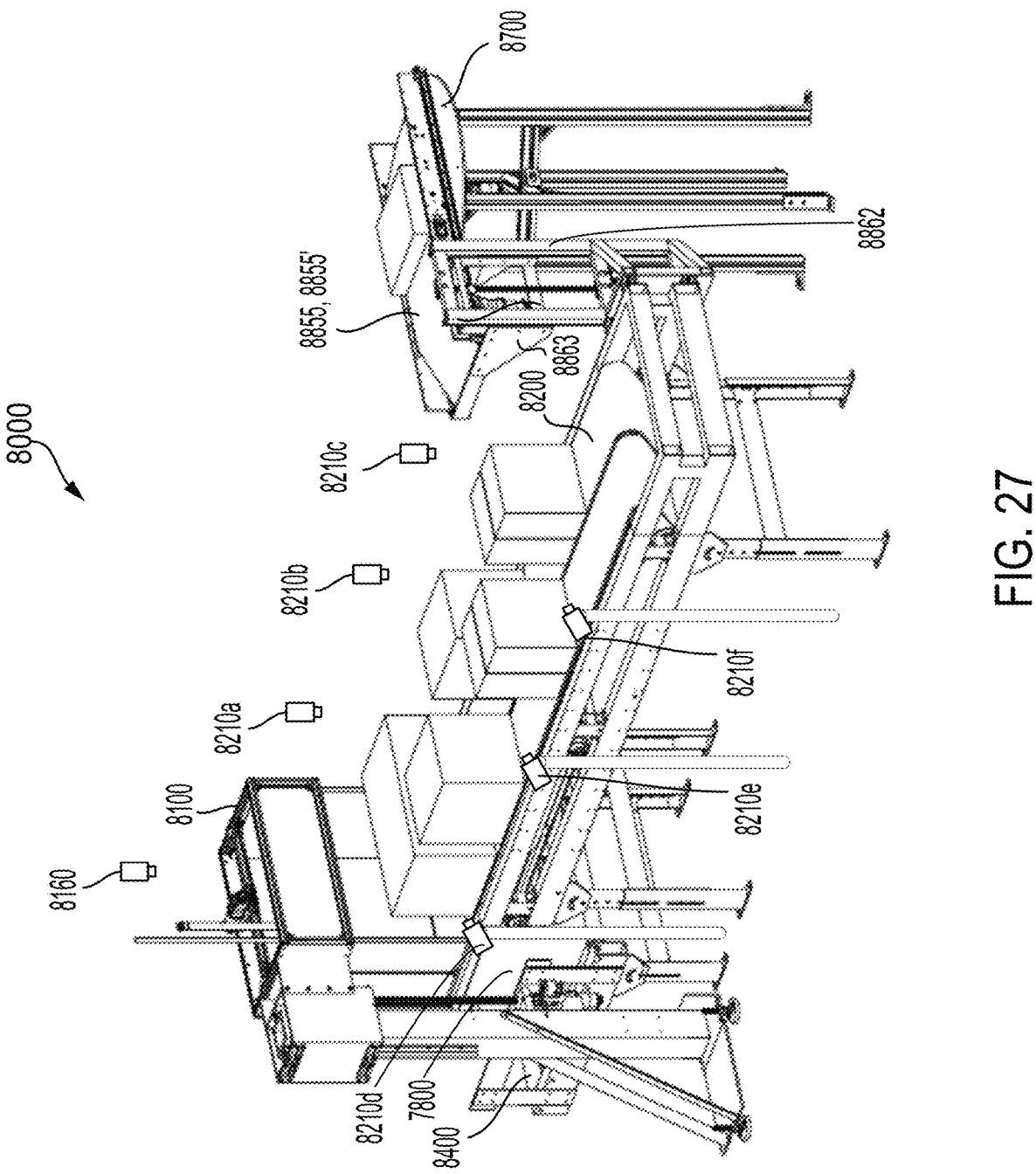
FIG. 27 depicts an example of a system for queuing folded laundry articles and stacks of folded laundry articles disposed on a packing queue platform.

FIG. 26 depicts an implementation of the conveyor 8855 depositing a folded laundry article 7300*c*1 in a packing queue. In implementations, prior to instructing the cantilever drive 8810 to withdraw the cantilevered depositing end 8857, the at least one controller 8005 is configured to receive a sensor signal indicative of the folded laundry article 7300, 7300*c*1 being proximate the depositing end 8857. In implementations, for example that shown in FIG. 27, the sensor signal comprises an output of one or more sensors 8210*a-f* disposed at least one of on the elevator 8862 and on or adjacent the gantry support rail 8860 (FIG. 4A) and proximate the packing queue platform 8200. As previously described with regard to implementations, the one or more sensors comprises one or more depth sensors, including optical sensors. The one or more sensors 8210*a-f* includes at least one of a 3-D camera, an IR sensor, a 2-D camera, LIDAR, LADAR, a sonar proximity sensor, an ultrasonic ranging sensor, a radar sensor, and a pair of stereo depth cameras. In implementations the one or more sensors 8210*a-f* comprises a REALSENSE camera, positioned above and aimed at a surface of at least one of the packing queue platform 8200 for detecting proper alignment of the depositing end 8857 of the conveyor 8855 with a selected horizontal position PPa-n and vertical position PVa-n in the packing queue Q. Additionally or alternatively to sensing a position with at least one sensor 8210, in implementations, a position of the rectangle center is known as described above with regard to implementation, and the conveyor 8855 moves a distance required to align that center point above the center point of a target stack 7301.

As shown in the depositing sequence of FIGS. 28A-D, in implementations, the at least one controller 8005 instructs at least one of the elevator drive 8820 and the cantilever drive 8810 to position the depositing end 8857 at a height G in a range of between about 5 mm to 75 mm above a surface of either the packing queue platform 8200 or another one of the plurality of folded household laundry articles 7300c2-c4 disposed on the packing queue platform 8200. Additionally or alternatively, aligning the conveyor 8855 with the selected position (e.g., horizontal position PPa-n and vertical position PVa-n) further comprises positioning the depositing end 8857 above a top surface of the at least one other of the plurality of folded household laundry articles 7300c2-c4 in a stack 7301, 7301a-n. In implementations, the controller 8805 is configured to instruct the conveyor 8855 to align the depositing end 8857 such that a forward edge E1 of the folded laundry article aligns with a far edge ES of a stack of folded laundry articles therebeneath. In implementations, the at least one controller is further configured to detect, based on the received sensor signal, a height of a stack Hs comprising the folded laundry article 7300c1 and at least one other of the plurality of folded household laundry articles 7300c2-c4.

Figures 28A, 28B, 28C, 28D:
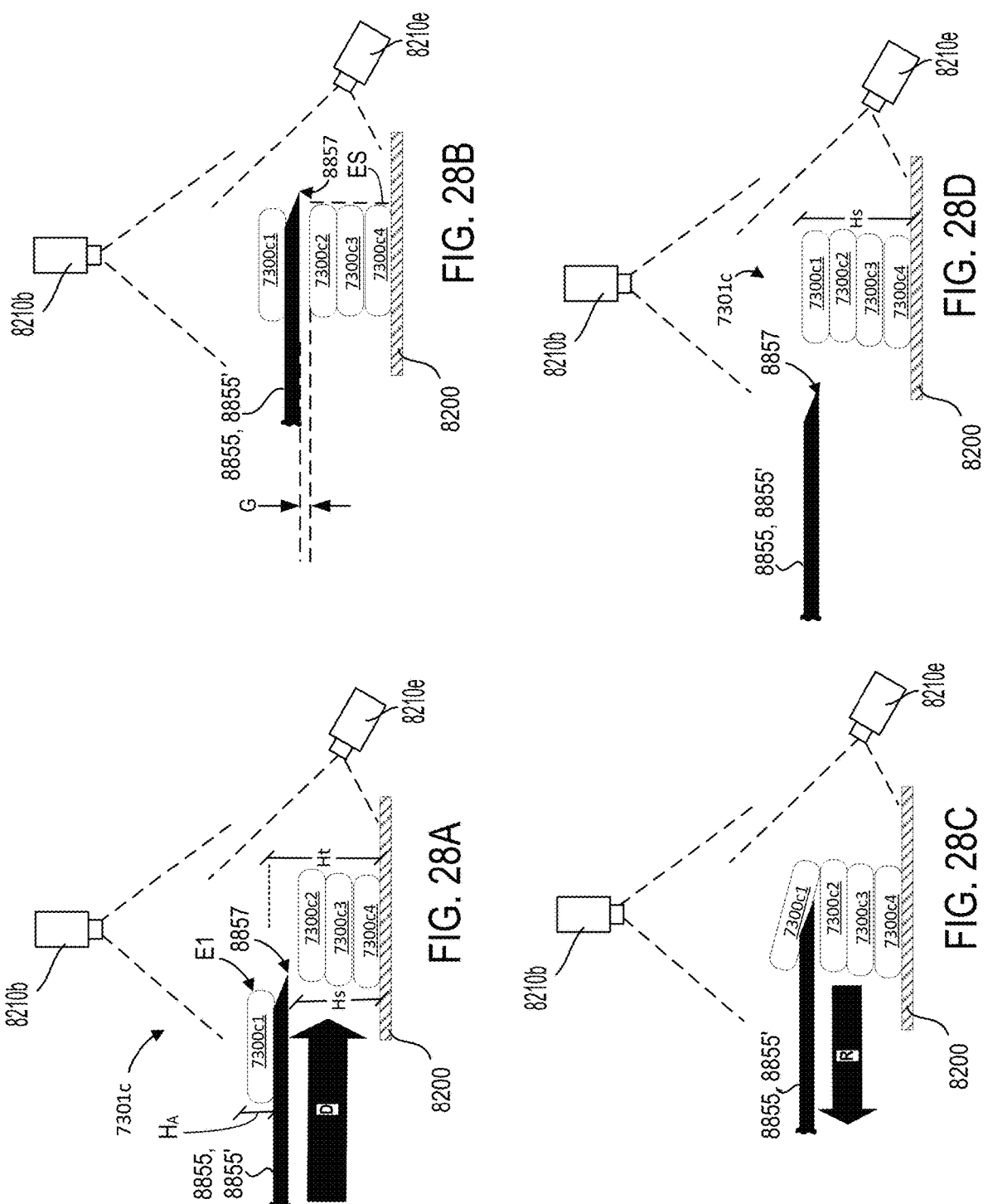
FIG. 28A depicts a schematic side view of a conveyor approaching a packing queue platform for depositing a folded laundry article on a stack of folded laundry articles in an ordered packing queue.
FIG. 28B depicts the side view of FIG. 28A with the conveyor cantilevered over the packing queue platform for depositing the folded laundry article on the stack of folded laundry articles in an ordered packing queue.
FIG. 28C depicts the side view of a FIG. 28B with the conveyor retracting and depositing the folded laundry article on the stack of folded laundry articles in an ordered packing queue.
FIG. 28D depicts the side view of a FIG. 28C with the conveyor retracted and the folded laundry article deposited on the stack of folded laundry articles in an ordered packing queue.

In implementations, as shown in FIG. 28A, the at least one controller 8005 is configured to receive a sensor signal indicative of a detected height HA of the folded laundry article 7300c1 and determine based on a threshold height Ht whether a plurality of laundry articles 7300c2-c4 in a stack 7301c is short enough to receive the folded laundry article 7300c1 from the conveyor 8855 without exceeding the threshold height Ht. Additionally or alternatively, the controller 8005 can determine whether the height $H_A$ of the folded laundry article 7300c1 on the conveyor 8855 exceeds the threshold height by less than a buffer height (e.g., 5 cm, 10 cm, 15 cm) such that compressing the stack 7301c of compliant, unbound folded laundry articles 7300c2-c4 with a mechanical plunger would reduce the height $H_A$ of the stack 7301c to at or below the threshold height Ht.

As shown in FIG. 28B, in implementations, prior to instructing the cantilever drive 8810 to withdraw the cantilevered depositing end 8857, the at least one controller 8005 receives a sensor signal indicative of the folded laundry article 7300c1 being proximate the depositing end 8857. Once the folded laundry article 7300c1 disposed on the conveyor 8855 cantilevered over the packing queue platform 8200 is aligned with the selected position (e.g., horizontal position PPa-n and vertical position PVa-n), the conveyor instructs the cantilever drive 8810 to retract the conveyor 8855 in the direction of arrow R as shown in FIG. 28C. The conveyor 8855 retracts while the belt 8854 circulates such that the unbound folded laundry article 7300c1 is deposited atop the stack 7301c of unbound folded laundry articles 7300c2-c4 as shown in FIG. 28D. In all implementations described herein, the belt 8854 always circulates in the same direction, on both retrieving and depositing the articles 7300 so that the top surface of the belt 8854 is always moving toward the queue conveyor 8200.

Figures 29A, 29B, 29C, 29D:
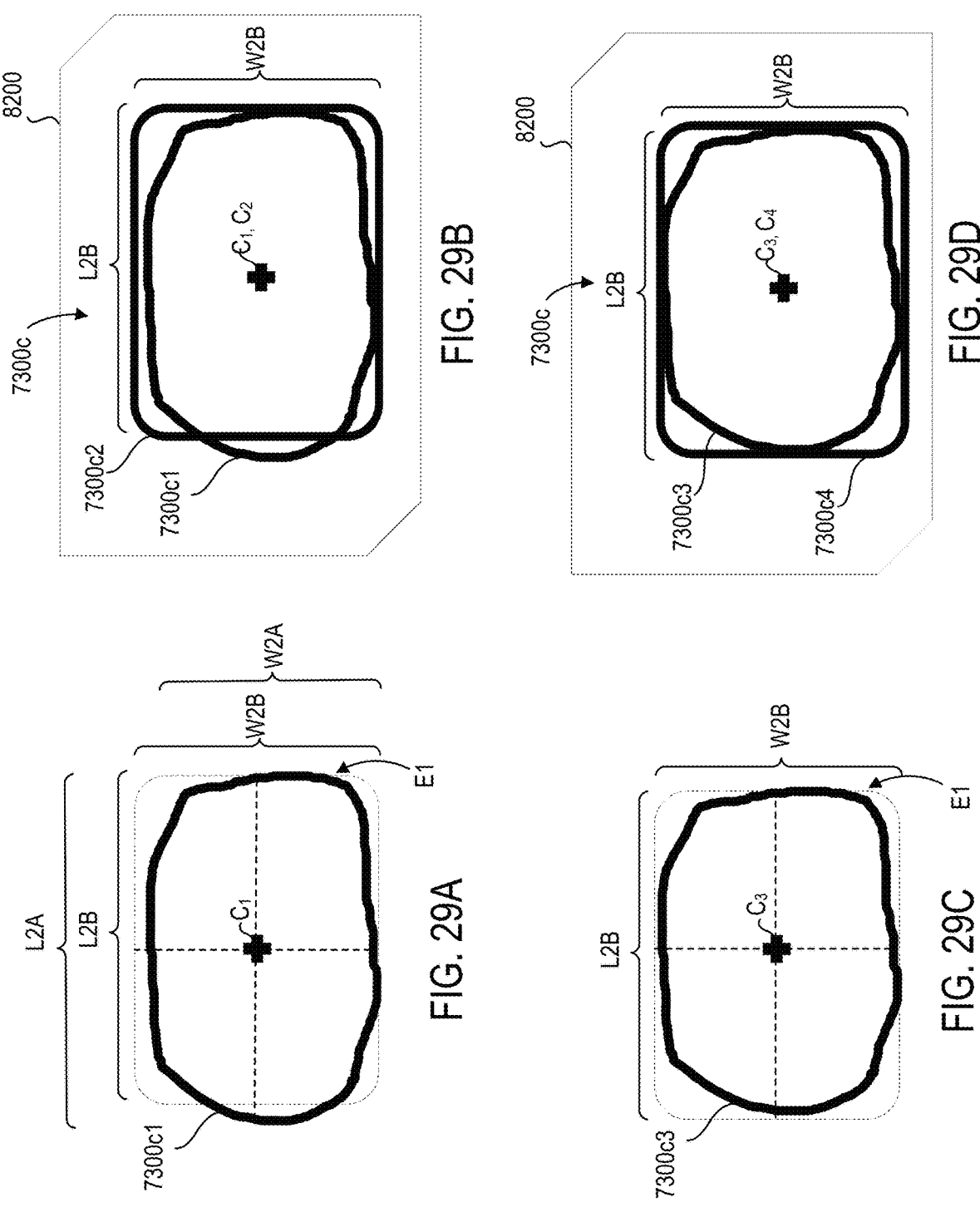
FIGS. 29A-D depict example schematic views of aligning a folded laundry article atop another folded laundry article in a packing queue stack.

In implementations, the controller 8005 processes output signals from the one or more sensors 8210a-f to determine alignment of a folded laundry article 7300c1 with another folded laundry article 7300c2 or a stack 7301 of folded laundry articles at a target position PPa-n. For example, as shown in FIGS. 29A and 29C, the controller 8005 is configured to identify, based on the received sensor signal, at least one of a bounding box of an area footprint (L2A\*W2A) and a centroid $C_1$, $C_3$ of the folded laundry article 7300c1,c3 on the conveyor 8855 and at least one of a bounding box of an area footprint (L2B\*W2B) and a centroid $C_2$, $C_4$ of another one of the plurality of folded laundry articles 7300c2,c4 (or a stack 7301 of folded laundry articles) already disposed on the packing queue platform 8200. In implementations, the controller 8005 is configured to determine, based on the received sensor signal, a centroid $C_1$, $C_3$ of the folded laundry article 7300c1,c3 and deposit the at least one folded laundry article 7300c1,c3 atop the another one of the plurality of folded laundry articles 7300c2,c4 such that the centroids align as shown in FIGS. 29B and 29D. Additionally or alternatively, the centroid $C_1$, $C_3$ of the stacked articles comprises a set target position, so each new article being delivered is aligned to the set target position rather than, or in addition to, re-sensing the existing stack centroid position and aligning to that.

Additionally or alternatively, the controller 8005 is configured to deposit the folded laundry article 7300c1,c3 atop another one of the plurality of folded laundry articles 7300c2,c4 (or a stack 7301 of folded laundry articles) such that the area footprint (L2A\*W2A) of the folded laundry article 7300c1,c3 substantially aligns with the area footprint (L2B\*W2B) of the at least one other of the plurality of folded laundry articles 7300c2,c4 (or a stack 7301 of folded laundry articles). In implementations, the area footprint of the folded laundry article 7300c1,c3 disposed on the conveyor can be slightly irregular, extending beyond a perfect square or rectangle, as shown in FIG. 29A, and being smaller than a square or rectangle in FIG. 29C. The controller 8005 can be configured to determine whether more than 10-15 percent of the area footprint (L2A\*W2A) extends beyond the target area footprint (L2B\*W2B) and select an alternate position for queuing the folded laundry article in the packing queue Q. Alternatively, the controller can be determined to determine whether the area footprint (L2A\*W2A) of the folded laundry article is more than 10-15 percent smaller than the target area footprint (L2B\*W2B) and select an alternate position for queuing the folded laundry article in the packing queue Q for optimum stability of a stack 7301. The controller 8005 is therefore able to prevent a stack 7301 of unbound folded laundry articles from losing stability because of disparate folded articles sizes in a stack 7301 and potentially toppling, causing the folded laundry article to unfold. Additionally or alternatively, as described above with regard to aligning a folded article 7300 to a best fit rectangle, in implementations the conveyor 8855 can deliver slightly out-of-size articles in the target stack 7301 and position them based on the best-fit target rectangle being in alignment with the target stack 7301. In implementations, slightly out-of-size can mean the folded article has a greatest offset distance of no more than 5-10% of a dimension length, the offset distance being measured from an edge of the bounding rectangle to an edge of the folded article.

The unbound folded laundry articles are not wrapped, sealed, restrained, or fastened in any way. The unbound folded laundry articles are folded by a folding robot 7000 and delivered to the queue conveyor for packing without being held in a folded state by any shrink wrapping or plastic ties wrapped around each one of the unbound folded laundry articles. Eliminating such ties and wraps reduces waste and environmental damage caused by such waste and facilitates quickly unloading the folded container contents into a dresser drawer or closet.

Figures 30A, 30B:
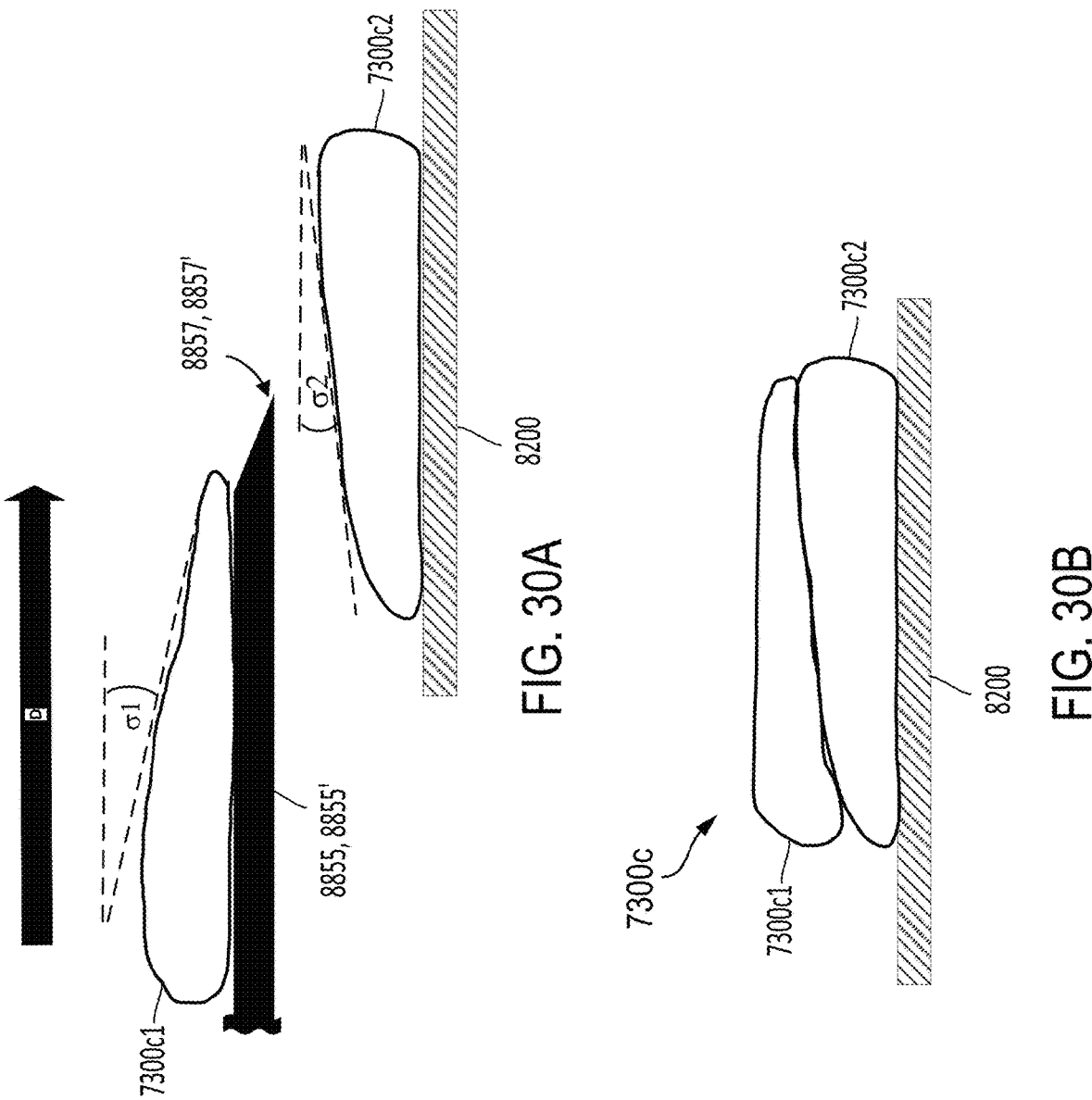
FIG. 30A depicts a schematic side view of a conveyor aligning a folded article with a sloped top surface with a folded laundry article in the packing queue having a complementary sloped top surface to create a stable, non-tilted stack of folded laundry articles.
FIG. 30B depicts the schematic side view of FIG. 30A with the folded article deposited on the stack to create a stable, non-tilted stack of folded laundry articles.

Additionally, as shown in sequence FIGS. 30A-B, the controller 8005 can assist with building a stable stack 7301 of folded laundry articles 7300a-n by matching the surface topography (e.g., uneven height) of a queued laundry article 7300c2 with an incoming folded laundry article 7300c1 comprising a complementary surface topography. For example, the controller 8005 can determine, based on the received sensor signal, a sloped receiving surface of the queued one of the plurality of folded laundry articles 7300c2 and deposit thereon a folded laundry article 7300c1 comprising an oppositely sloped top surface. For example, as shown in FIG. 30A, the folded laundry article 7300c1 is oriented with a downward slope σ1 and the another one of the plurality of folded laundry articles 7300c2 is oriented with an upward facing slope σ2, and σ1 and σ2 are identical or within +/−5 degrees of one another such that the deformable folded laundry articles will conform to one another and avoid creating tilting a stack 7301c of folded laundry, as shown in FIG. 30B.

Additionally or alternatively, measuring surface tilt comprises measuring the tilt of the incoming folded article 7300. Because an article 7300 may have to go on a particular target stack 7301 regardless of tilt to meet other sorting criteria, the controller 8005 can prompt the orienter 8700 and/or the folding device 7000 rotate the article 7300 to one of two positions 180 degrees apart to best match the tilt of its target receiving stack 7301. The article 7300 therefore will be delivered to the target stack 7301 based on at least one of size and sorting category (e.g., article type) while tilt is minimized by orienting the article so that the tilts between the article 7300 and the target stack 7301 are complementary. This evens out the overall tilt of the layers of articles 7300a-n in a stack 7301 over the course of their stacking rather than letting a tilt worsen over time with each addition of a folded article.

Figure 32:
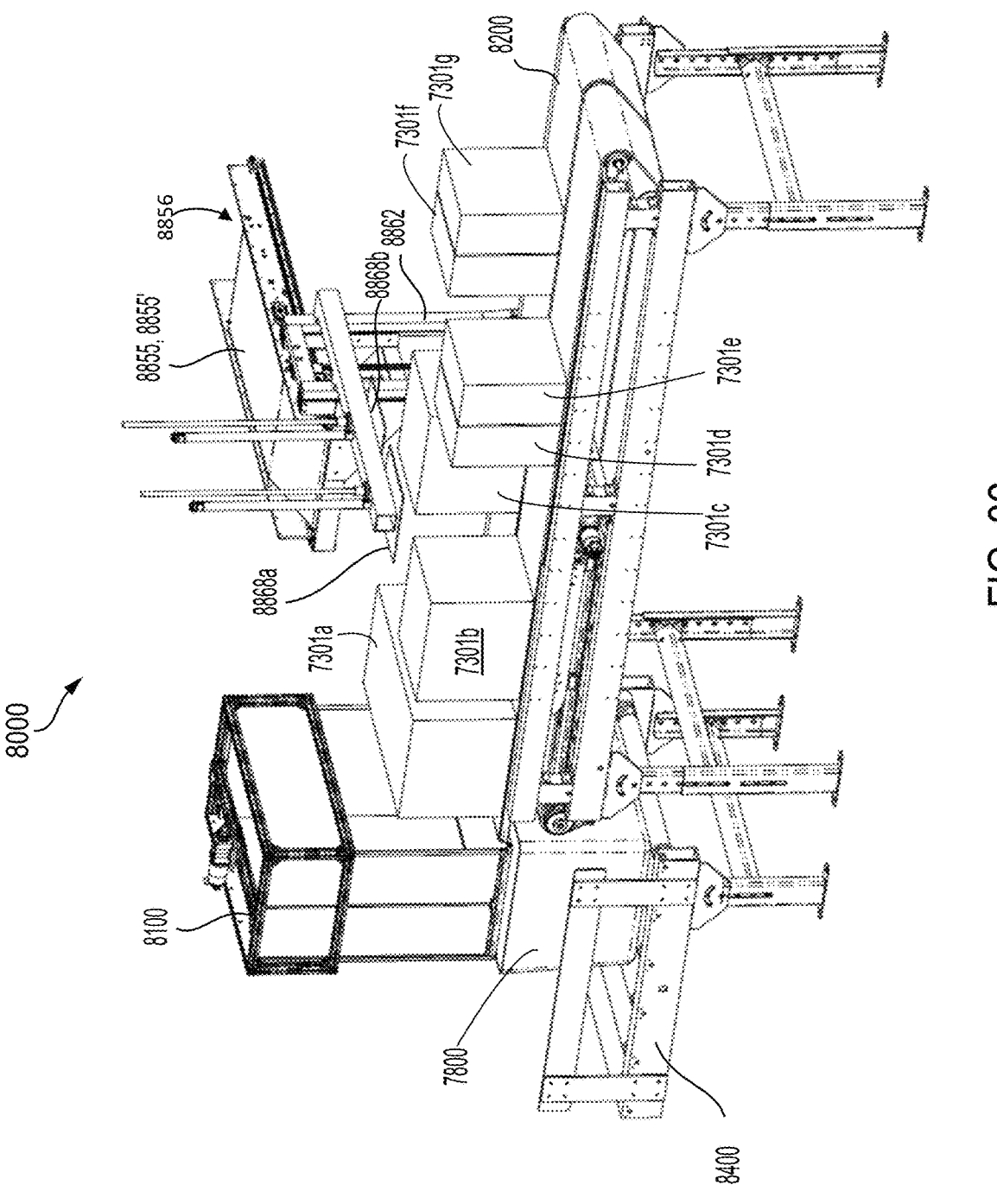
FIG. 32 depicts a schematic perspective back view of the example queuing system and mechanical plungers of FIG. 31.

Additionally, as described previously with regard to implementations, the system 8000, as shown in FIGS. 31-32 can comprise one or more compression plungers 8868a-b disposed on at least one of the elevator 8862 and the support rail 8860. The one or more compression plungers 8868a-b are mechanically actuated to compress the one or more stacks 7301 of folded laundry articles 7300 in the packing queue Q. The controller 8005 is further configured to calculate a final stack height $H_A$ based on the received sensor signal and compare the final stack height to a threshold stack height Ht. In implementations, the threshold stack height Ht comprises a range of between about 25 cm to 65 cm. By keeping the stacks relatively short, they remain stable and folded while being queued and added to and while being transferred to a loading position for packing. Additionally, the one or more compression plungers 8868a-b are configured to flatten out the one or more stacks 7301, 7301a-n of folded laundry articles 7300 in the packing queue Q. This assists with stacking one or more articles 7300a-n and/or stacks 7301a-n together by providing a flat, non-leaning surface on which to layer additional folded laundry articles 7300.

Additionally or alternatively, in implementations, each one of the one or more compression plungers 8868a-b disposed on at least one of the elevator 8862 and the support rail 8860 can comprise a plunger drive 8845 in operative communication with the one or more compression plungers 8868a-b and at least one position sensor disposed on or proximate the one or more compression plungers 8868a-b. The at least one position sensor is configured to sense a height Hs of the stack 7301 of unbound folded laundry articles 7300 queued on the packing queue platform 8200 and output a signal indicative of the height HA to at least one of the conveyor processor 8805 and the controller 8005. In implementations, the at least one position sensor comprises the one or more sensors 8210a-f disposed about the packing queue platform 8200, such as point could sensors and other cameras configured to detect a depth. Additionally or alternatively, in implementations, the at least one position sensor comprises an encoder on a drive motor of the one or more compression plungers 8868a-b and/or a distance sensor measuring the height of at least one of the one or more compression plungers 8868a-b from some fixed point. Alternatively, the one or more compression plungers 8868a-b are actuated with at least one pneumatic cylinder. The compressive force of the one or more compression plungers 8868a-b is set by the size of the cylinder (e.g., the air pressure). This eliminates a need for load sensing such that the one or more compression plungers 8868a-b would always press down on the stack 7301a-n of folded laundry articles 7300a-n with a constant force. A distance sensor (e.g., one or more optical sensors 8210a-c) mounted above the one or more compression plungers 8868a-b then measures the height of the plungers 8868a-b and/or the height of the stack 7301a-n of folded laundry articles 7300a-n.

Additionally or alternatively, in implementations, the conveyor 8855, 8855' can operate as a plunger, pressing down on one or more stacks by cantilevering over the queue conveyor 8200 and lowering along the elevator 8862 to press a bottom surface of the conveyor, such as a stationary plate, against the top surface of one or more stacks 7301a-n.

Figure 33:
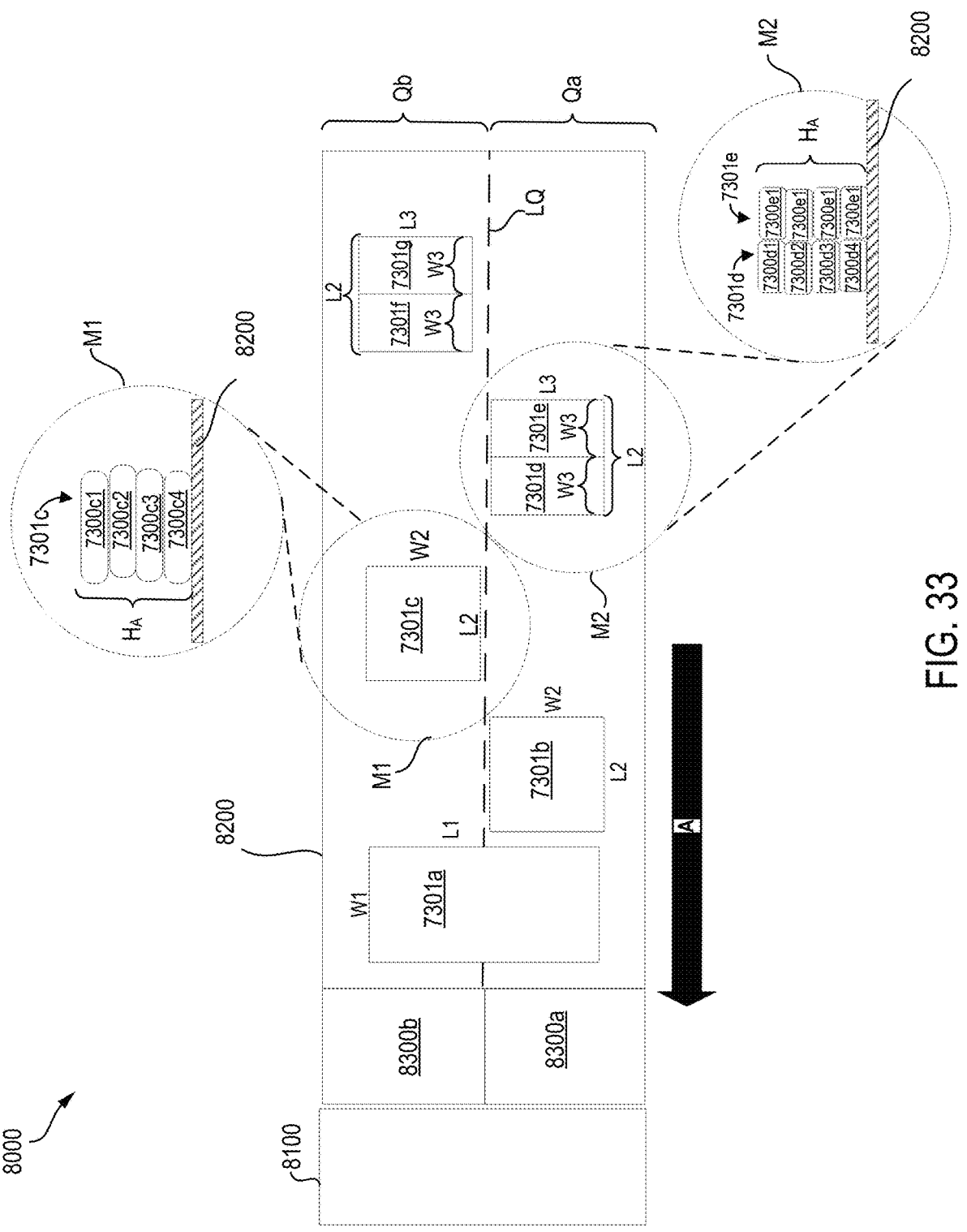
FIG. 33 depicts a schematic plan view of an example ordered packing queue and packing queue platform of a queueing system.

In implementations, the packing queue Q comprises a plurality of unbound folded laundry article stacks 7301a-g disposed sequentially and spaced apart on the queue platform 8200 as depicted in the planar schematic view of FIG. 33. Each stack 7301a-g comprises one or more of a plurality of unbound folded laundry articles 7300a-n. In implementations, the plurality of unbound folded laundry articles 7300a-n comprises household laundry belonging to a single household, and the folded laundry articles are packaged to return to the household from which they came. In implementations, the household laundry comprises two or more article types of at least one of different sizes and different shapes. In implementations, each of the two or more article types comprises a longest dimension of between about 4 cm to 500 cm.

For example, the unbound folded laundry articles 7300a-n comprise a plurality of laundry articles comprising a single load of household laundry. Household laundry can comprise many types of bodily worn garments and cloth articles requiring washing (e.g., sheets, tablecloths, curtains, bath rugs). These garments and articles are deformable meaning they do not hold their shape. Because garments and other cloth articles are supple, they deform when manipulated. Different items of the plurality of laundry articles may have different thickness and stiffness values depending on the material and style of the item. For example, a woven bathmat will be stiffer than a silk blouse. The plurality of laundry articles 7300a-n (where is a maximum number of articles) in a single load of household laundry also can comprise many different laundry articles each having a different weight. Additionally, the size of each deformable article 7300 of the plurality of laundry articles 7300a-n can vary greatly within a single load of laundry, such that folding each deformable article 7300 requires folding maneuvers particular to each article as determined by at least one of article type (e.g., shirt, pants, sock, bathrobe, zippered top, hooded sweatshirt, blouse, button front shirt, sweater, baby clothes, coats, blankets, coats, curtains, bed sheets, and towels), article size, and article material thickness. Because of these variations, size of the area footprint (e.g., area (Lx*Wx) occupied on the surface of the queue conveyor) of each unbound folded article 7300 will vary.

As shown in the magnified, rotated views M1, M2 of FIG. 33, in implementations, one or more of a of stacks 7301$a$-$g$ comprise one or more of plurality of unbound folded laundry articles 7300$a$-$n$. For example, a stack 7301$c$ shown in magnified view M1 comprises four folded laundry articles 7300$c$1-$c$4. (The magnified views M1, M2 of portions of the top down plan view of the plurality of unbound folded laundry article stacks 7301$a$-$g$ are rotated out of the plane to depict a side view of a stack 7301$c$-$e$ of folded laundry articles 7300 disposed on the surface of the queue conveyor 8200.) In implementations, a height H$_A$ of the at least one stack 7301$c$ of folded laundry articles 7300$c$ is less than or equal to a height Hc of the container 7800 (FIGS. 4A-B) configured to receive the stack 7301$c$ for return to a customer. Additionally, a combined height of at least one of articles 7300 and stacks 7301 loaded into the refillable cartridge should be less than or equal to the height of the container Hc. In implementations, the refillable cartridge 8100 comprises a height H$_R$ greater than the height Hc of the container 7800 and a threshold height 8140 (FIG. 4) to which the one or more articles 7300 and/or stacks 7301 are collectively loaded. The threshold height 8140 can be equal to or less than the height of the container Hc.

In implementations, a height H$_A$ of the at least one stack 7301 of one more folded laundry article 7300 comprises a range of between about 1 to 65 cm and a height Hc of the container 7800 comprises a range of between about 65 mm to 75 cm. In implementations, the threshold height 8140 of the refillable cartridge is equal to or less than the height Hc of the container 7800 such that by not exceeding the threshold height with received one or more unbound folded laundry articles 7300, the one or more unbound folded laundry articles 7300 delivered by the refillable cartridge to the container 7800 will not overflow the container 7800. Alternatively, as described above with regard to implementations, the loaded laundry articles 7300 could overfill the container by a small buffer height a buffer height (e.g., 5 cm, 10 cm, 15 cm, 20 cm, 25 cm) compressed by plunging such that the container can be securely covered or closed.

In implementations, as shown in the magnified, rotated views M1, M2 of FIG. 33, the at least one stack 7301$c$-$e$ comprises a plurality of folded laundry articles 7300$c$1-$c$4, 7300$d$1-$d$4, 7300$e$1-$e$4. In implementations, each unbounded folded laundry article 7300$c$1-$c$4, 7300$d$1-$d$4, 7300$e$1-$e$4 of the at least one stack 7301$c$-$e$ of folded laundry articles comprises at least one of a common article type and common area footprint. For example, the plurality of folded laundry articles 7300$c$1-$c$4, 7300$d$1-$d$4, 7300$e$1-$e$4 can be stacked according to common article type (e.g., a stack of pants, a stack of towels, a stack of button front shirts, etc.). Additionally or alternatively, the plurality of folded laundry articles 7300$c$1-$c$4, 7300$d$1-$d$4, 7300$e$1-$e$4 can be stacked according to an area footprint. In implementations, the at least one stack 7301$c$, 7301$d$, 7301$e$ of unbound folded laundry articles comprises an area footprint (Lx*Wx, where "X" is a numeral indicative of a measured length or width) less than or equal to an area footprint of the container 7800.

In implementations, two or more stacks 7301$b$-$g$ of folded laundry articles 7300$a$-$n$ are disposed adjacent the refillable cartridge 8100 in at least one queue "Q". In implementations the at least one queue comprises two parallel queues Q$_{a-b}$, each one of the two parallel queues Q$_{a-b}$ being disposed on a bilateral half of the packing queue platform 8200 as divided along its length LQ and each aligned with one half of a volume of the refillable cartridge 8100. In implementations, the platform 8200 comprises two parallel queue conveyors, and each one of the two parallel queues Q$_{a-b}$ is disposed on one of two parallel queue conveyors. In implementations, the two parallel queues Q$_{a-b}$ are laterally spaced, and stacks 7301$a$-$n$ are staggered between near and far ones of the two parallel queues Q$_{a-b}$. Additionally, in implementations, each pairing of staggered stacks 7301 (e.g., 7301$b$ and 7301$c$) comprises substantially even stack heights. Alternatively, a pair of staggered stacks 7301 need not have to have even stack heights HA as long as the sum height of all the stacks 7301 on one side is even to the sum height of all stacks on the other side. In implementations, pairs of staggered stacks comprise doubled-up categories so that an article type (e.g., pair of pants) of that paired category (e.g., pants) could be added to either stacked in either queue to help balance out the total sum of a particular queue Qa-b and keep the two halves of articles loaded into the refillable cartridge 8100 and then the container 7800 at relatively even height. This adds stability to the folded articles within the container during shipping and transport so that the articles remain folded for delivery to a customer.

The plurality of stacks 7301$a$-$n$ can be laterally spaced between adjacent predetermined locations PPa-n such that the conveyor 8855 cantilevered above the packing queue platform 8200 avoids contacting one or more adjacent stacks. In implementations, the lateral spacing between queued stacks is in a range of between about 10 to 50 mm. In implementations, the lateral spacing is at least 8 mm.

In implementations, a queue surface of the packing queue platform 8200 comprises at least one movable conveyor in operable communication with the controller 8005. The at least one movable conveyor is configured to convey the one or more folded laundry articles and/or stacks of folded laundry 7300$b$-$g$ disposed thereon to an end of the movable conveyor for packing. In implementations, the two parallel queues Q$_{a-b}$ are disposed on at least one movable queue conveyor platform 8200 in operable communication with the at least one controller 8005 for moving in the direction of arrow A during loading of the refillable cartridge 8100. By staggering the folded laundry articles 7300$b$-$g$ in two parallel queues Q$_{a-b}$ along the queue conveyor length LQ, rotating the queue conveyor platform 8200 advances one stack of folded laundry articles 7300$b$-$g$ at a time onto one or the other of parallel loading conveyors 8300$a$-$b$ configured to load the refillable cartridge 8100. This alternating pattern allows the parallel loading conveyors 8300$a$-$b$ to load first one side and then the other side of the refillable cartridge 8100, keeping the unbound folded laundry articles 7300$a$-$n$ and/or stacks 7301 received side-by-side therein as even in height as possible and therefore as stable as possible to preventing shifting, toppling, and/or unfolding during loading and transport. Additionally or alternatively, in implementations, each half of the queue conveyor platform 8200 comprises a loading conveyor in a single conveyor length. In such implementations the loading "conveyor" can be a pull nose extendable and retractable loading end of the queue conveyor platform 8200. The two halves of the queue conveyor platform 8200 can each comprise a dedicated pull nose end for simultaneously or alternatingly extending and retracting into the refillable cartridge.

Additionally or alternatively, In implementations, because some stacks 7301a-n of folded laundry articles 7300a-n can be queued on the parallel loading conveyors 8300a-b or queue conveyor platforms 8200a-b, the parallel loading conveyors 8300a-b or queue conveyor platforms 8200a-b could load several smaller stacks from one of the two parallel queues $Q_{a-b}$ at a time to help keep the loaded stacks even in the refillable cartridge 8100. Additionally or alternatively, as previously described, the queue conveyor platform 8200 can comprise two side by side, separately actuated conveyors. The parallel conveyors need not alternate to achieve a final loaded height in the refillable cartridge 8100 that is even across the tops of two or more loaded stacks. For example, two stacks of folded laundry articles could be loaded from one queue of two parallel queues $Q_{a-b}$ before one stack was loaded from the other. Additionally or alternatively, in implementations, sorting categories can be duplicated in each one of the two parallel queues $Q_{a-b}$ such that folded laundry articles 7300 can be placed in either queue $Q_{a-b}$ regardless category. The controller 8005 therefore can be configured to sort the folded laundry articles on the queue conveyor 8200 solely based on a cumulative height of each queue from the refillable cartridge loading end to the opposite end of the queue.

As depicted in the schematic embodiment of FIG. 3, the queue conveyor 8200 can comprise at least one processor 8205 configured to operate a conveyor drive 8215 and configured to communicate wired or wirelessly with the controller 8005 via the communication network 230. In implementations, the two or more stacks 7300b-g of the two parallel queues $Q_{a-b}$ are disposed on the queue conveyor 8200 in order of size. For example, at least one of the at least one unbound folded laundry article 7300a and the two or more stacks of folded laundry articles 7300b-g comprising a largest folded area footprint is disposed closest to the refillable cartridge 8100. In implementations, when a full container height Hc of articles has been queued in the two queues $Q_{a-b}$, the two or more stacks of folded laundry articles 7300b-g are then loaded into the refillable cartridge 8100, from largest size (e.g., area footprint) to smallest size (e.g., area footprint). By stacking the largest articles at the bottom of the refillable cartridge 8100, the unbound folded laundry articles loaded into the container 7800 are more stable during loading and transport and less likely to topple or unfold. Additionally, stacking the largest articles at the bottom of the refillable cartridge 8100 enables maximum filling of the container. By placing "full box size" articles on the bottom of the container, a flat loading surface atop that article is provided to smaller folded articles. If smaller articles are loaded first, the "full box size" articles may not have a flat receiving surface because the smaller stacks may not be flat across their collective top surfaces. Loading articles from large-to-small area footprint sizes ensures that smaller articles have a flat fully-filled rectangular area to be placed on without having to do carefully pick and choose locations and volumes within the cartridge to piece together different-sized stacks in a stable, compactly loaded bundle.

For example, as depicted in the schematic layout of FIG. 33, from closest to furthest from the refillable cartridge 8100, the area footprint (W1×L1) of the at least one unbound folded laundry article 7301a can be approximately 12"×20", the area footprints (W2×L2) of two or more stacks 7301b, 7301c of folded laundry articles adjacent the unbound folded laundry article 7301a nearest the refillable cartridge 8100 can be 10"×12", and the area footprints (W3×L3) of two or more combined, smallest side-by-side stacks 7301d-e, 7301f-g furthest from the unbound folded laundry article 7301a nearest the refillable cartridge 8100 can be 6"×10" or 5×6 such that all of these area footprints alone or in combination fit within a container having area footprint dimensions of about 14"×24" (e.g., 35 cm×60 cm) as they advance in order into the refillable cartridge 8100. In implementations, the chosen area footprints fill the target box size minus some buffer space for loading (e.g., the largest size fits just into the box, the next size is half the largest size, etc.) For example, in implementations, the smaller sizes (e.g., 6"×10" and 5"×6") combine to make 10"×12" sets of stacks. In other words, in implementations, smaller rectangle sizes (e.g., smaller area footprints) are chosen as fractions of the full area footprint, such that they can be queued together, side-by-side as a single "full-stack". This aids in filling a container 7800 because stack layers within the refillable cartridge 8100 can be filled across the width of the container to provide stability and prevent folded articles from toppling and unfolding during transport.

The at least one placing conveyor 8300a-b or extendable queue conveyor platforms 8200a-b can place full-rectangle stacks of folded laundry articles, even if comprised of two or more combined side-by-side stacks of smaller sizes. In implementations, as shown in FIG. 33, smaller stacks 7301d-g can be oriented with their longest dimension perpendicular to the queue length LQ for added stability during depositing by the conveyor 8855 because the folded articles 7300 are supported for longer by the conveyor 8855 without toppling off the angled delivering end. Alternatively, in implementations, the smaller sized stacks 7301d-e, f-g can be oriented on the packing queue platform 8200 with their longest dimension parallel to the queue length LQ for added stability when the queue conveyor 8200 rotates its belt to move the stacks of folded laundry articles toward the refillable cartridge 8100. Having the stacks with smaller area footprints be fractions of a full stack area footprint and queued adjacent other equally-sized stacks to form half-size or full-size stacks simplifies determining when stacks will combine to fill a container 7800 because only the heights of the stacks of folded laundry articles need to be added to compare against the known height Hc of the container. The controller 8005 does not need to determine a more complicated stacking order of folded laundry articles having non-uniform area footprints.

Additionally, in implementations, as shown in FIGS. 4A-B, the selected location (e.g., PPa-n and PVa-n) for depositing each folded laundry article of a plurality of folded laundry articles 7300a-n is one of a plurality of predetermined locations along the packing queue platform 8200 at which to deposit the folded laundry article. Additionally, in implementation, one containers-worth of stacks 7301a-n are queued at a single time. Alternatively, in implementations, an ordered packing queue Q can be determined based on information about article sizes provided by a previous robot in the process line, such as the dirty laundry separating and sorting robot 3000, and the controller 8005 can predetermine locations of area footprints of folded articles on one or more packing queue platforms 8200 or vertically stacked queue platforms 8200a and platforms 8200b (FIG. 34) so as to fill a smallest number of packing containers 7800 (e.g., packing boxes or bags) as fully as possible and reduce physical labor of delivery personnel and delivery vehicle wear and tear. In implementations, each one of the predetermined queue locations comprises at least a horizontal position (e.g., PPa-n) along the length LQ of the packing queue platform. In implementations, the plurality of predetermined locations can be designated in advance of queuing a plurality of folded laundry articles 7300a-n such that designated areas of the packing queue platform 8200 are designated for receiving articles of at least one of one or more particularly sized area footprints and one or more article types or other sorting categories.

Alternatively, the at least one controller 8005 can be configured to execute a predictive modelling routine (e.g., algorithm running on a processor 8015) that maps out the queue location of each one of the laundry articles in a plurality of household laundry articles 7300*a-n* that has been folded or will be folded. For example, the one or more article types and one or more article sizes of the plurality of folded household laundry articles are detected by one or more sensors of one or more preceding autonomous devices. The one or more preceding autonomous devices comprise at least one of the autonomous folding device 7000 and at least one autonomous separating device 3000, 5000 configured to separate individual items from the plurality of household laundry articles. The at least one controller 8005 is in operable communication with the one or more preceding autonomous devices and predetermines queue locations (e.g., PPa-n and PVa-n) for each one of the plurality of household laundry items based on the known (e.g., detected) quantities of each article type and size preceding the packing queue and a predicted folded article area footprint for each one of plurality of household laundry items.

Figure 34:
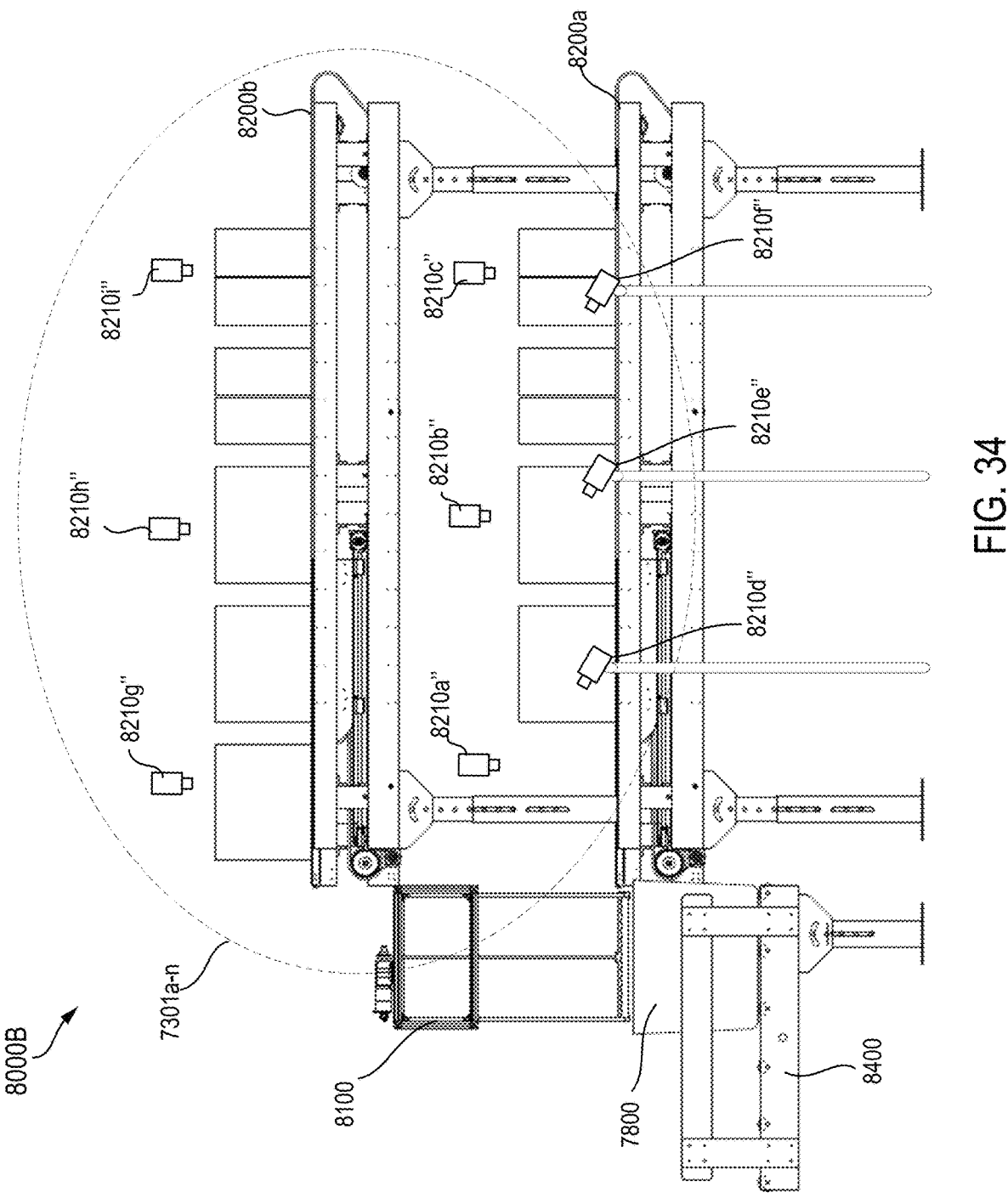
FIG. 34 depicts an example of a system for queuing folded laundry articles disposed on two or more stacked queue surfaces.

Additionally or alternatively, in implementations, as depicted in FIG. 34 the packing queue platform comprises two or more vertically stacked platforms 8200*a-b*, which can be conveyors or static holding shelves or a combination of one or more static holding shelves positioned above a packing queue conveyor. The cantilevered conveyor 8855 can distribute folded laundry articles 7300*a-n* belonging to a single household among the two or more vertically stacked platforms 8200*a-b* and store in a database at least one of the area footprint, height, and article type of each of the stacks of folded laundry articles. The cantilevered conveyor 8855 can then redistribute folded laundry articles and/or stacks of folded laundry articles from the upper shelf 8200*b* or shelves onto the packing queue conveyor 8200*a* for combining articles 7300*a-n* and stacks 7301*a-n* in order for fully loading the containers while producing a smallest number of partially filled containers 7800 to return to a customer household. This reduces the amount of space occupied in a delivery truck, the amount of effort for a delivery driver to return the containers, and reduces the risk of folded items toppling within a partially filled container 7800.

In implementations, such as that of FIG. 34, the vertically stacked platforms are two or more queue conveyors 8200*a-n* and the refillable cartridge 8100 is configured to be actuated vertically at the height of each conveyor to accept stacks from any of the stacked queue conveyors 8200*a-n*. In this system 8000B predetermined sorting locations are based on at least one of stack size and article type and folded articles 7300*a-n* and stacks 7301*a-n* of one or more folded articles are loaded sequentially into the cartridge 8100 for loading one or more containers 7800, but there's much more room for more predetermined sorting categories than along a single queue conveyor. This is important in the sorting algorithm because each possible sorting category has its own predetermined location, allowing the conveyor 8855 to sort and queue new folded articles 7300 as they arrive without needing to know in advance what is in the load of laundry (e.g., plurality of deformable articles 7330*a-n*). For example, if the controller 8005 does not know a large article of dimensions 12×20" (e.g., a towel) is arriving for queuing and several stacks of smaller articles are queued, the conveyor 8855 can place the article with the larger area footprint further back in the queue $Q_{a-b}$ on one of the queue conveyors 8200*a-b* to leave space for each category in advance. In this way, the conveyor can always add articles in a preferred order for loading by spacing them out along and among two or more queue conveyors.

Figures 35A, 35B:
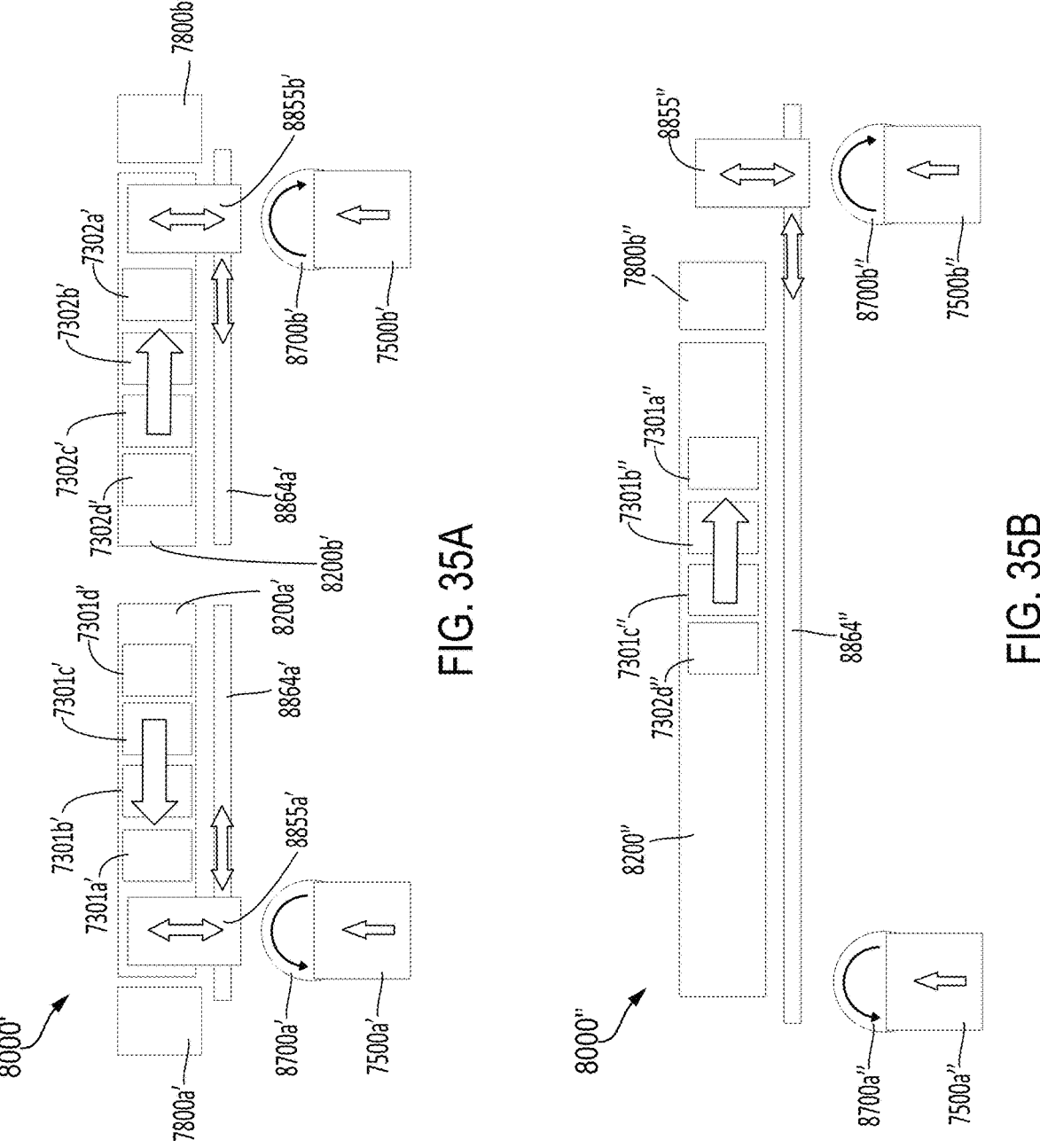
FIG. 35A depicts a schematic example alternate layout of the system of FIG. 3 comprising two end to end stacking and packing queues.
FIG. 35B depicts a schematic example alternate layout of the system of FIG. 3 comprising on packing queue serviced by two orienters.

Additionally or alternatively, in implementations, as depicted in FIG. 35A the packing queue platform comprises two or more end abutted platforms 8200*a'-b'* and the gantry comprises two or end abutted sets of gantry rails 8864*a'-b'*, one proximate each one of the two or more end abutted platforms, and two or more placer conveyors 8855*a'-b'*. Additionally or alternatively, in implementations, two or more conveyors 8855*a'-b'* can be mounted to a single, shared gantry rail for servicing both of the two or more conveyors 8855*a'-b'*.

Alternatively, in implementations, as shown in FIG. 35B, two orienters 8700*a"-b"* service a single placer conveyor 8855" and double long packing queue platform 8200". The gantry rail 8864 services both orienters 8700*a-b*, with a single packing station disposed at one end or the other of the platform 8200". The speed of travel of the conveyor 8855" along the gantry rail 8864" matches the speed at which folded laundry articles are deposited on the two orienters 8700*a"-b"*.

Figure 36A:
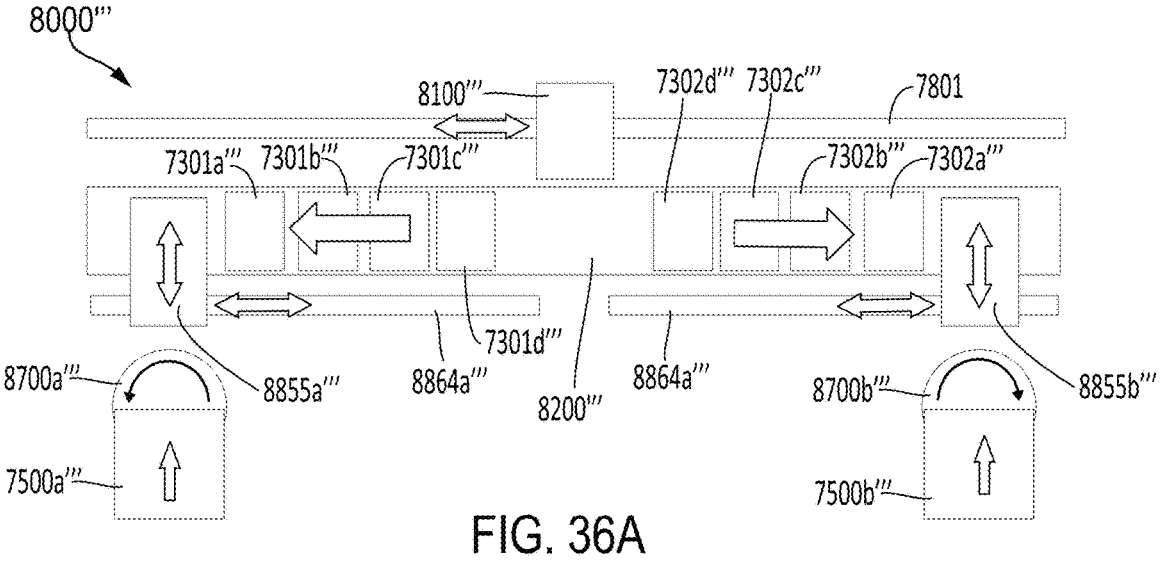
FIG. 36A depicts a schematic example alternate layout of the system of FIG. 3 comprising a double ended stacking and packing queue serviced by two orienters and two conveyor placer and elevator assemblies with respective access to the two orienters and a movable packing cartridge configured to service the double ended queue.

Alternatively, in implementations, as shown in FIG. 36A, the system 8000''' comprises one packing queue platform 8200''', two conveyors 8855*a'''-b'''* and one mobile container loader 8100''' movably mounted to a rail 7801 running parallel to the packing queue platform 8200'''. Each end of the packing queue platform 8200''' is serviced by a dedicated placer conveyor 8855*a'''-b'''*. This minimizes time to stack folded laundry articles in the packing queues and minimizes distance traveled by each conveyor 8855*a'''-b'''*. After stacks 7301*a'''-d'''*, 7302*a'''-d'''* of folded laundry articles are queued on each side of the packing queue platform 8200''', a container loader (including at least one of the container 7800''' and a refillable cartridge 8100''') can travel back and forth and pick up/load the appropriate stacks of folded laundry articles from either end of the packing queue platform 8200'''. This has the benefit of not requiring predetermined stack locations; the mobile container loader 8100''' (e.g., refillable cartridge) can skip around and pick an appropriately sized stack 73011 instead. In implementations, the stacks 7301, 7302 need not be queued in any order because a distance that completed stacks need to move to be placed in the mobile container loader 8100''' minimized. Additionally, in implementations, a center express lane for small items being delivered into the bottom of a container without folding prior to loading folded articles atop the unfolded small articles could be picked up by the container loader (e.g., refillable cartridge 8100''' and container 7800''') between the two sides. Alternatively, two different households' clothing could be serviced on a dedicated end of the packing queue platform 8200. The implementation of FIG. 36A thus provides a number of process flow configurations for balancing across a process line 100 a plurality of loads of laundry belonging to a plurality of customers.

Figure 36B:
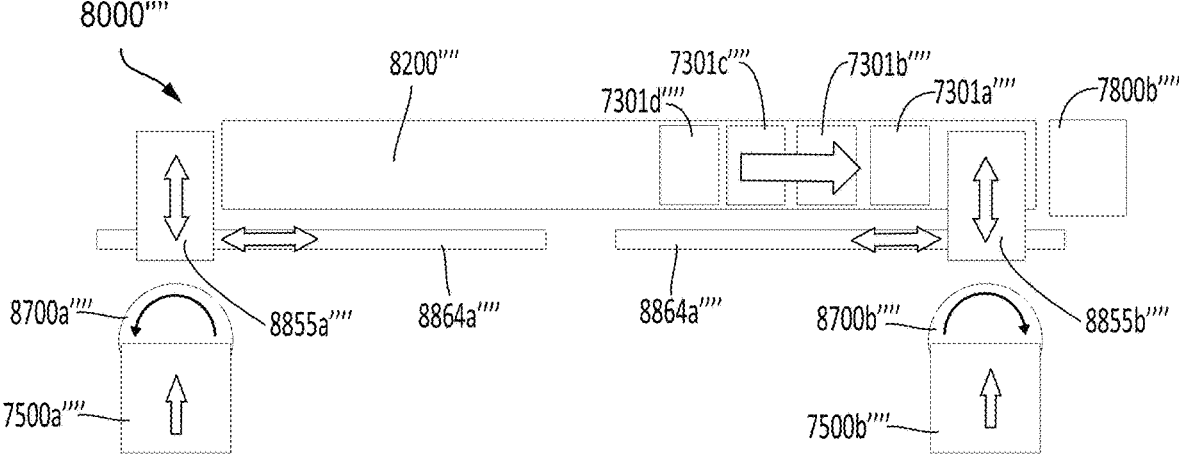
FIG. 36B depicts a schematic example alternate layout of the system of FIG. 3 comprising a double ended stacking and packing queue serviced by two orienters and two conveyor placer and elevator assemblies with respective access to the two orienters and to packing cartridges respectively disposed at either outside end of the double ended queue.

Alternatively, as shown in the implementation of FIG. 36B the system 8000'''' comprises one packing queue platform 8200'''', two placer conveyors 8855*a''''-b''''*, and one packing queue platform feeding a single container 7800*b''''*. In this implementation, the queue stacks are disposed on a packing queue platform 8200'''' comprising a long conveyor. The long packing queue conveyor 8200'''' shuttles stacks 7301*a''''-d''''* of folded laundry articles back and forth to be loaded from each conveyor 8855*a''''-b''''*. The long packing queue conveyor 8200''' moves in synchronicity with timing of the folding device 7000 producing a folded article and moves stacks to the appropriate conveyor side for stacking higher in advance of a conveyor 8855*a″″-b″″* being loaded. Stacks 8200″″ comprising a long conveyor. A first set of stacks 7301*a″″-d″″* can also be queued on either side of the queue conveyor 8200″″ in this system, and then a second set of stacks loaded after the first set 7301*a″″-d″″*, without as much moving of the queue conveyor back and forth.

Figures 37A, 37B:
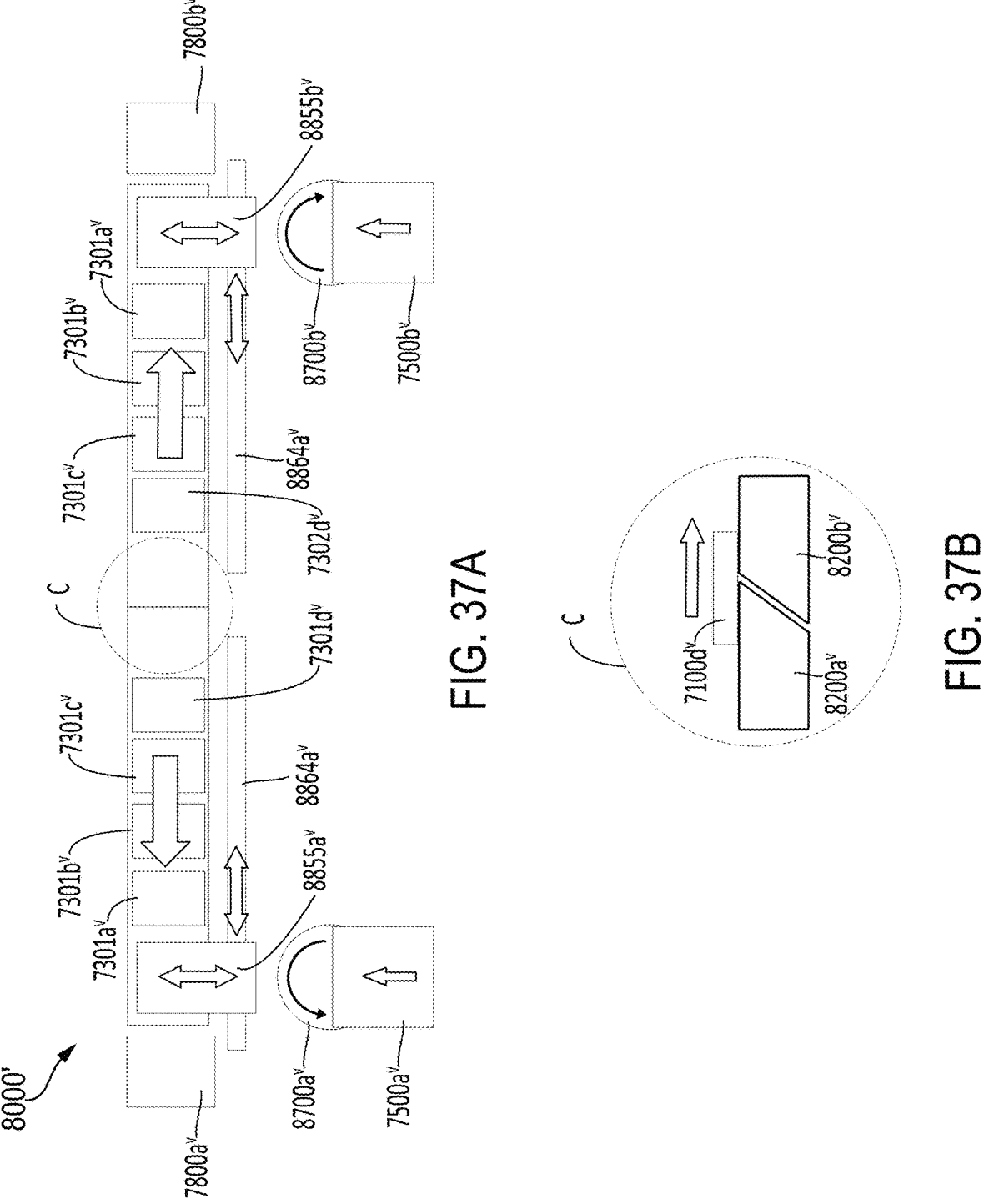
FIG. 37A depicts a schematic example alternate layout of the system of FIG. 3 comprising a double ended stacking and packing queue with abutted, overlapping ends, the double ended queue being serviced by two orienters and two conveyor placer and elevator assemblies with respective access to the two orienters and to packing cartridges respectively disposed at either free end of the double ended queue.
FIG. 37B depicts an enlarged side view of an overlapping portion of the end abutted packing queues of FIG. 37A forming a continuous rolling surface for supporting a folded article thereon.

Additionally or alternatively, as shown in FIGS. 37A-B, the system 8000ᵛ comprises two packing stations 7800*a*ᵛ, 7800*b*ᵛ each one of which is disposed on the far ends of two abutted queue conveyor platforms 8200*a*ᵛ, 8200*b*ᵛ. The two queue conveyor platforms 8200*a*ᵛ, 8200*b*ᵛ can both receive one household's folded laundry articles and send the articles to the same one of the two packing stations 7800*a*ᵛ, 7800*b*ᵛ. Alternatively, each one of the two packing stations 7800*a*ᵛ, 7800*b*ᵛ is configured to receive folded laundry articles from one of two different households, and each one of the two packing stations 7800*a*ᵛ, 7800*b*ᵛ sends articles to its dedicated packing station. As shown in the magnified side view C in FIG. 37B, in this implementation, the queue platform comprises two abutted queue conveyor platforms 8200*a*ᵛ, 8200*b*ᵛ. The abutted ends of the two abutted queue conveyor platforms 8200*a*ᵛ, 8200*b*ᵛ are angled to form an overlap as shown in FIG. 37B, thereby bridging any gap in between the two abutted queue conveyor platforms 8200*a*ᵛ, 8200*b*ᵛ and allowing the two abutted queue conveyor platforms 8200*a*ᵛ, 8200*b*ᵛ to run separately or in tandem.

The preceding implementations are intended to be illustrative of several of the plurality of layouts of the system 8000. The location of one or more devices of the systems described can be changed within an aggregate system to enable efficient processing of one or more containers of household laundry.

Once the deformable article 7300 is folded by the folding device 7000, a retrieving conveyor 7500 operates to extract the folded article 7300 from a platform 7100 of the folding device 7000. As previously described with regard to implementations, the retrieving conveyor 7500 deposits an unoriented, folded article 7300 from the platform 7100 onto the orienter 8700.

Figure 38:
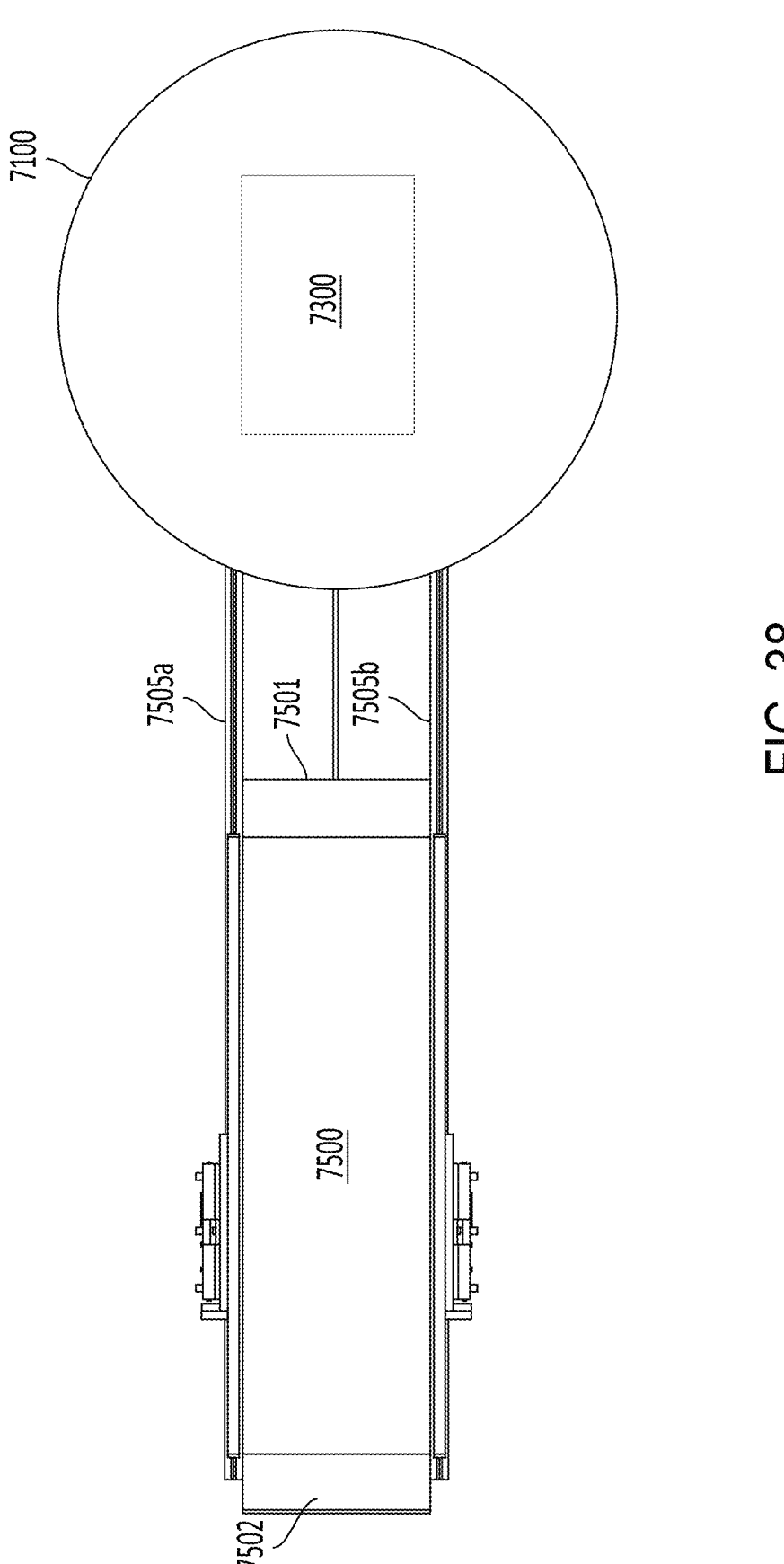
FIG. 38 depicts an example schematic plan view of a folded laundry article on a folding device.
Figure 39:
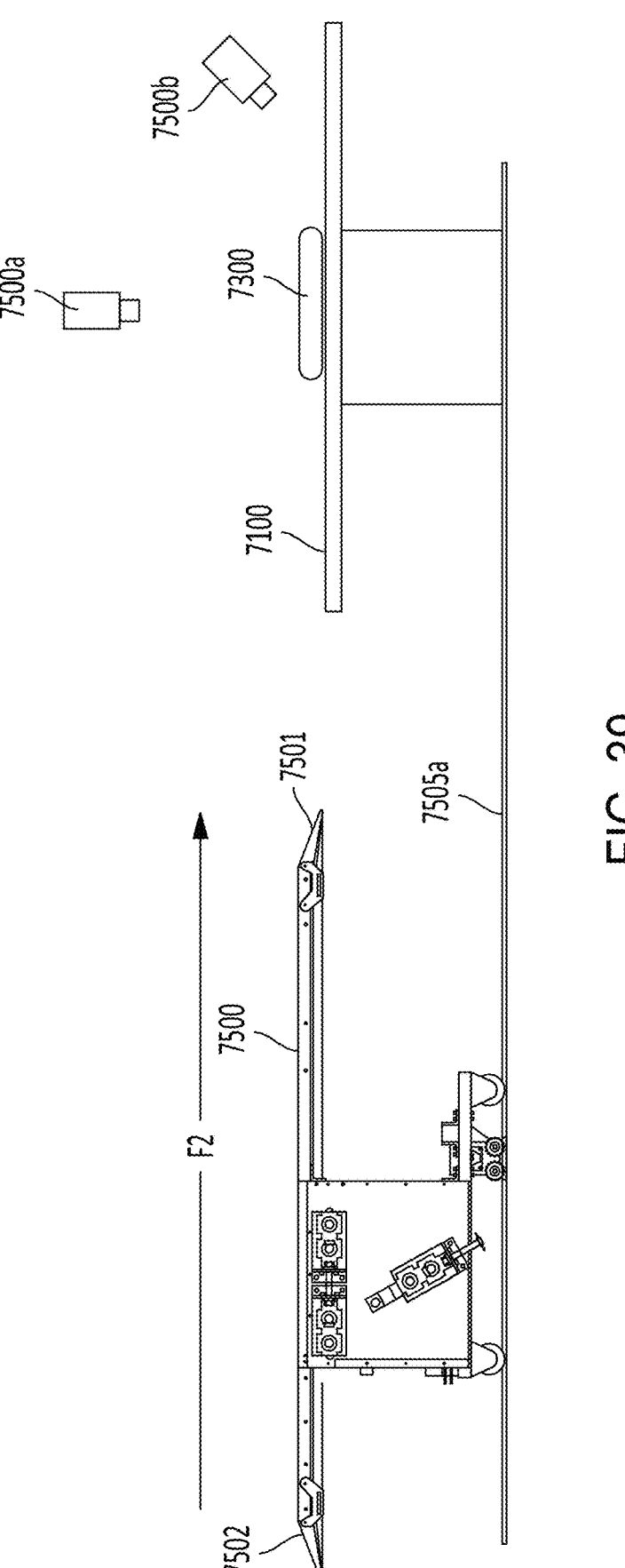
FIG. 39 depicts a side view of FIG. 38 showing an alignment of a movable retrieving conveyor with a surface of the folding device.
Figure 40:
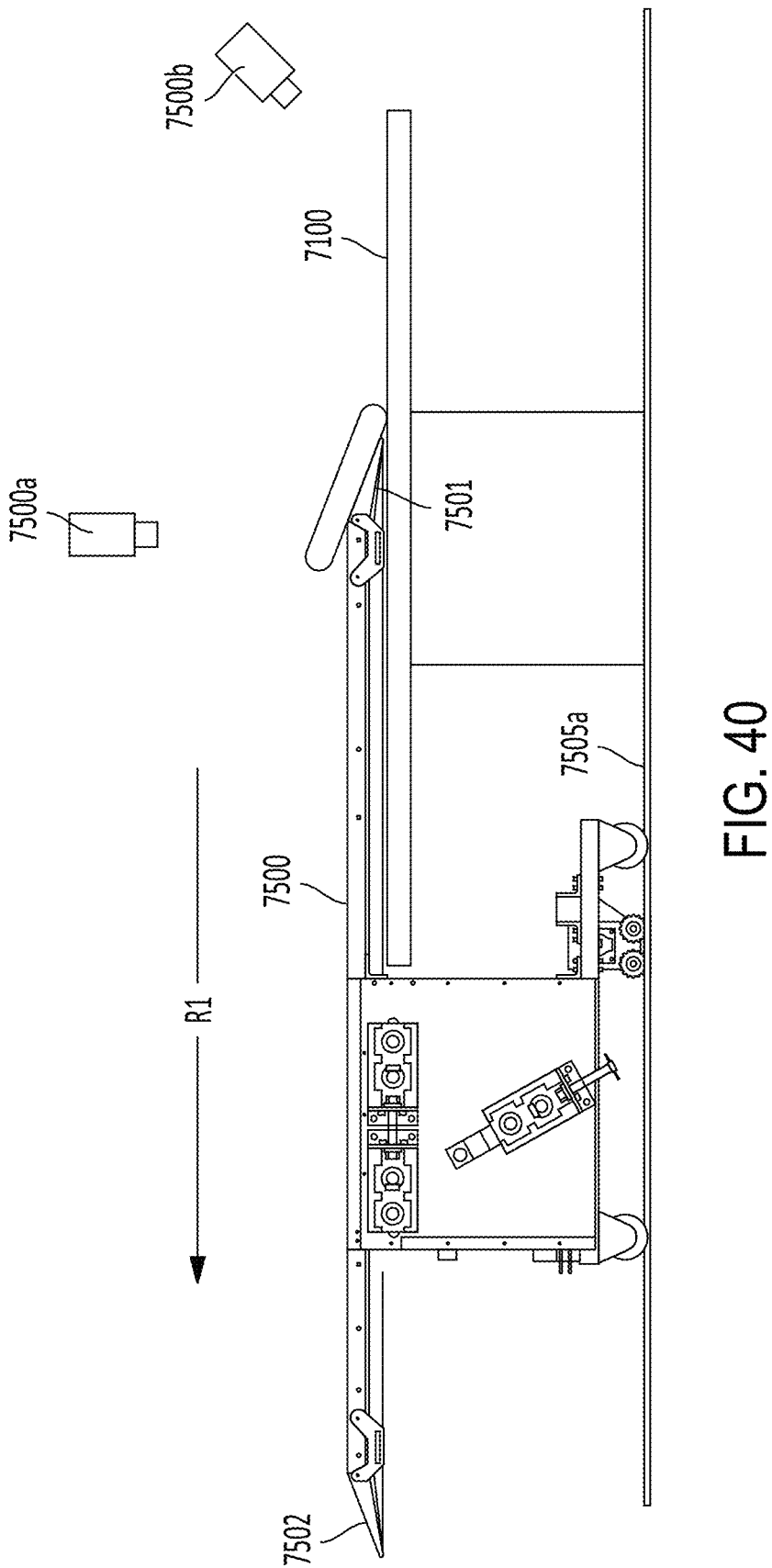
FIG. 40 depicts a movable retrieving conveyor of FIG. 39 extending over the surface of the folding device to retrieve the folded laundry article.

Turning now to FIGS. 38-40, the retrieving conveyor 7500 is in operable communication with a controller 6005, 7005, 8005 configured to actuate drive wheels disposed on a pair of rails 7505*a-b* for aligning the retrieving conveyor 7500 with the folding platform 7100. The controller receives a signal from a sensor 7450*a-b* (FIG. 25) configured to detect a proximity of a leading edge 7501 of the retrieving conveyor 7500 to the folded article 7300. Once the leading edge 7501 moves under the folded article 7300, the circulating belt 8854 pulls the article up onto the conveyor. In implementations, the leading edge 7501 of the conveyor 7500 comprises a steeply angled downward slope for retrieving the folded article 7300 without disturbing the folds. The leading edge 7501 is sized to slide under the folded article 7300 as the folded article is drawn upward onto the conveyor 7500. The leading edge 7501 slides over the surface 7105 of the platform 7100 and comprises a clearance in a range of between about 0.25 mm to 5 mm. The rails 7505*a-b* receive thereon wheels of the conveyor 7500. In implementations, the rails 7505*a-b* extend to a position at or near a center axis (diameter) of the platform 7100 so the leading edge 7501 of the conveyor 7500 can cantilever and extend past the middle of the platform 7100 and ensure that the conveyor 7500 is able to reach the folded deformable article 7300, wherever it lies. In implementations, the platform 7100 can rotate to put the folded article 7300 along the path of the conveyor 7500 for retrieval, and the conveyor 7500 thus is wide enough to pick up the diagonal of the largest folded area footprint along a line but does not need to be as wide as the diameter of the platform 7100. Additionally or alternatively, the controller 7005 rotates the rotatable platform 7100 to assist with alignment of the folded deformable article 7300 to the leading edge 7501. The retrieving conveyor is configured to move folded articles from an angled depositing edge 7502 of the retrieving conveyor 7500 to the rotatable orienter 8700, as shown in FIG. 23A.

Returning to FIG. 25, in implementations, a folding robot 7000 (also alternatively referred to hereinafter as "folding device") for folding a deformable laundry article comprises a rotatable platform 7100 configured to receive the deformable laundry article for folding to one of a plurality of area footprints. The rotatable platform 7100 comprises a substantially flat, smooth surface 7105. In implementations, the device 7000 includes at least one clamp 7200, 7200*a*, 7200*b* configured to raise and lower from the surface 7105 of the rotatable platform and slidably move parallel to the surface 7105, the at least one clamp 7200, 7200*a*, 7200*b* being in operable communication with at least one clamp drive 7205, 7205*a*, 7205*b* and being configured to clamp the deformable article to the surface 7105 in a lowered position. In implementations, the at least one clamp 7200, 7200*a*, 7200*b* can be an elongated rod. In other implementations, the at least one clamp 7200, 7200*a*, 7200*b* can be an elongated flat, spatula-like bar. In implementations, the at least one clamp 7200 can comprise two retractable clamps 7200*a*, 7200*b*. Additionally, the folding robot 7000 comprises at least one of a folding rod or blade 7400 for sliding beneath an article, lifting a portion of the article, and translating over the surface 7105 of the rotatable platform while lifting and then releasing the article to fold the lifted portion atop another portion of the article resting on the surface. Additionally, in implementations, a spatula 7400 is configured to slide under a folded article and lift the folded article to place it on the surface 7105 in proper alignment for retrieval by at least one conveyor 7500, 8855 at an orientation that can be affected by rotating the rotatable platform 7100 thereby eliminating a need for a separate orienting table 8700 downstream from the folding device 7000.

As described previously with regard to implementations, the deformable article 7300 is one of a plurality of deformable laundry articles comprising two or more article types of at least one of different sizes and different shapes. In implementations, each of the two or more article types comprises a longest dimension of between about 4 cm to 500 cm. For example, the deformable article 7300 can be one of a plurality of laundry articles comprising a single load of household laundry. Household laundry can comprise many types of bodily worn garments and cloth articles requiring washing (e.g., sheets, tablecloths, curtains, bath rugs). These garments and articles are deformable meaning they do not hold their shape. Because garments and other cloth articles are supple, they deform when manipulated. Different items of the plurality of laundry articles may have different thickness and stiffness values depending on the material and style of the item. For example, a woven bathmat will be stiffer than a silk blouse. The plurality of laundry articles in a single load of household laundry also can comprise many different laundry articles each having a different weight. Additionally, the size of each deformable article 7300 of the plurality of laundry articles can vary greatly within a single load of laundry, such that folding each deformable article 7300 requires maneuvers particular to each article as determined by at least one of article type (e.g., shirt, pants, sock, bathrobe, zippered top, hooded sweatshirt, blouse, button front shirt, sweater, baby clothes, coats, blankets, coats, curtains, bed sheets, and towels), article size, article material thickness, receiving container remaining available volume, and dynamical changing responses to each sequential maneuver.

In examples, the device 7000 further comprises one or more sensors 7450*a-b* configured to at least one of detect one of one or more features and capture one or more images of the deformable article disposed on the rotatable platform. In examples, the device 7000 further comprises a controller 7005 in operative communication with a table drive motor 7110, at least one clamp drive 7205, at least one sweep drive 7405, and one or more sensors 7450*a-b* disposed about the surface of the platform 7100. As described previously with regard to implementations, the one or more sensors 7450*a-b* comprise at least one of a 3-D camera, an IR sensor, a 2-D camera, LIDAR, LADAR, a sonar proximity sensor, an ultrasonic ranging sensor, a radar sensor (e.g., including Doppler radar and/or millimeter-wave radar), and a pair of stereo depth cameras. In implementations, the one or more sensors can be configured to output 3-D image data to the controller. Additionally or alternatively, in implementations, the one or more sensors can be configured to output one or more 2-D images to the controller. In implementations the one or more sensors 7450*a-b* comprises a REALSENSE camera, positioned above the rotatable platform 7100 and aimed at the surface 7105. In implementations, the surface of the platform 7100 is non-speculative. In implementations, the surface 7105 is a single color, such as white or grey, for providing readily detected contrast to most deformable articles 7300. In examples, the controller is configured 7005 to receive one or more output signals from the one or more sensors 7450, determine, based on the received one or more output signals, at least one of an article type and size of the deformable article 7300

Additionally, in implementation, the controller 7005 can determine the at least one final folded dimension of a laundry article by identifying in a memory store one or more pre-determined final folded dimensions associated with the determined at least one of the article type and the article size. In examples, the at least one final folded dimension is dynamically selected based on the determined at least one of article type and article size and determining one or more fold lines is based at least in part on the dynamically selected final folded dimension. The one or more final folded dimensions can be one or more of the volumetric envelope dimensions of the folded article. The one or more volumetric envelope dimensions can be, for example a predetermined final rectangle size (e.g., area footprint Wx*Lx) associated with at least one of article type and article size or predetermined volumetric dimensions (FW×FL×FH) associated with at least one of the article type and article size. The predetermined one or more dimensions can inform the identification of fold lines and the sequence of folds.

In examples, determining the article type comprises processing the received output signal of the one or more sensors with a neural network classifier. In examples, the one or more sensors comprises at least one of a 3-D camera, an IR sensor, a 2-D camera, LIDAR, LADAR, a sonar proximity sensor, an ultrasonic ranging sensor, a radar sensor (e.g., including Doppler radar and/or millimeter-wave radar), and a pair of stereo depth cameras. In examples, the controller is configured to receive an output signal comprising 3-D image data of the deformable article. Alternatively or additionally, in examples, the controller is configured to receive an output signal comprising one or more 2-D images of the deformable article. In examples, determining article type comprises performing a size invariant imagery comparison to classified images stored in a memory in communication with the controller. In examples, the controller is further configured to determine, based on a comparison of a received output signal of the one or more sensors to data stored in a memory in communication with the controller, at least one of an article type, a front side, a back side, and an inside surface of the deformable laundry article In examples, the one or more sensors comprises at least one of a 3-D camera, an IR sensor, a 2-D camera, LIDAR, LADAR, a sonar proximity sensor, an ultrasonic ranging sensor, a radar sensor (e.g., including Doppler radar and/or millimeter-wave radar), and a pair of stereo depth cameras. In implementations, the controller is configured to receive an output signal comprising one or more 2-D images of the deformable article, and determining the article type comprises performing a size invariant imagery comparison to classified images stored in a memory in communication with the controller.

In all of the preceding implementation of the folding device 7000, the controller 7005 of the folding device is configured to communicate at least one of a predicted or achieved area footprint and folded article height to the at least one controller 8005 of the packing and queuing system 8000.

Additionally or alternatively, in implementations, the controller 7005 of the folding device can determine based on one or more received signals that a laundry article is too small for folding. For example, the article could be a baby sock, a pair of underwear, or a long, thin article like a scarf. In such instances, the controller 7005 can instruct the folding device 7000 to forgo folding the laundry article and instead pass the unfolded laundry article through the remainder of the process line unfolded. The conveyor 8855 can receive the article and deposit the unfolded laundry article into one or more containers 7800 on the container conveyor such that the unfolded articles are deposited in a container prior to loading the one or more folded laundry articles and/or stacks of folded laundry articles from the queue platform 8200 into the conveyor. Additionally or alternatively, the conveyor 8855 can deposit the unfolded laundry articles in one or more piles on the queue platform for conveyance in aggregate to a bottom or top of a container 7800. Additionally or alternatively, the gantry rails 8864 can extend beyond either end of the platform 8200 enabling the conveyor 8855 to cantilever over a container and directly deposit small articles into the container, by passing the queue Q on the platform 8200.

In embodiments, any of the one or more robots in the process line preceding the queueing and packing system 8000 can determine one or more articles of household laundry is too small for folding and provide the one or more too small for folding laundry articles to the packing station for loading into an empty container 7800. For example, a repositioning robot 6000 can identify and collect in a container the one or more too small for folding laundry articles and the collection container can transit on rails to the packing station, skipping any processing by subsequent robots in the process line and eliminating the time of those subsequent robots having to handle the article.

In embodiments, one or more gantry cranes mounted above or aside at least one of the separation robot 5000, the repositing robot 6000, the folding robot 7000, and the orienter 8700 can retrieve an article determined by one or more sensors and controllers to be too small for folding, carry it to a container 7800 at the packing station, and release the unfolded article into the container. Alternatively, the one or more gantry cranes can comprise a robotic arm on a mobile base for retrieving a too small article from one robot in the process line and transiting across the floor to the packing station for depositing the unfolded laundry article in a container 7800.

Figure 41:
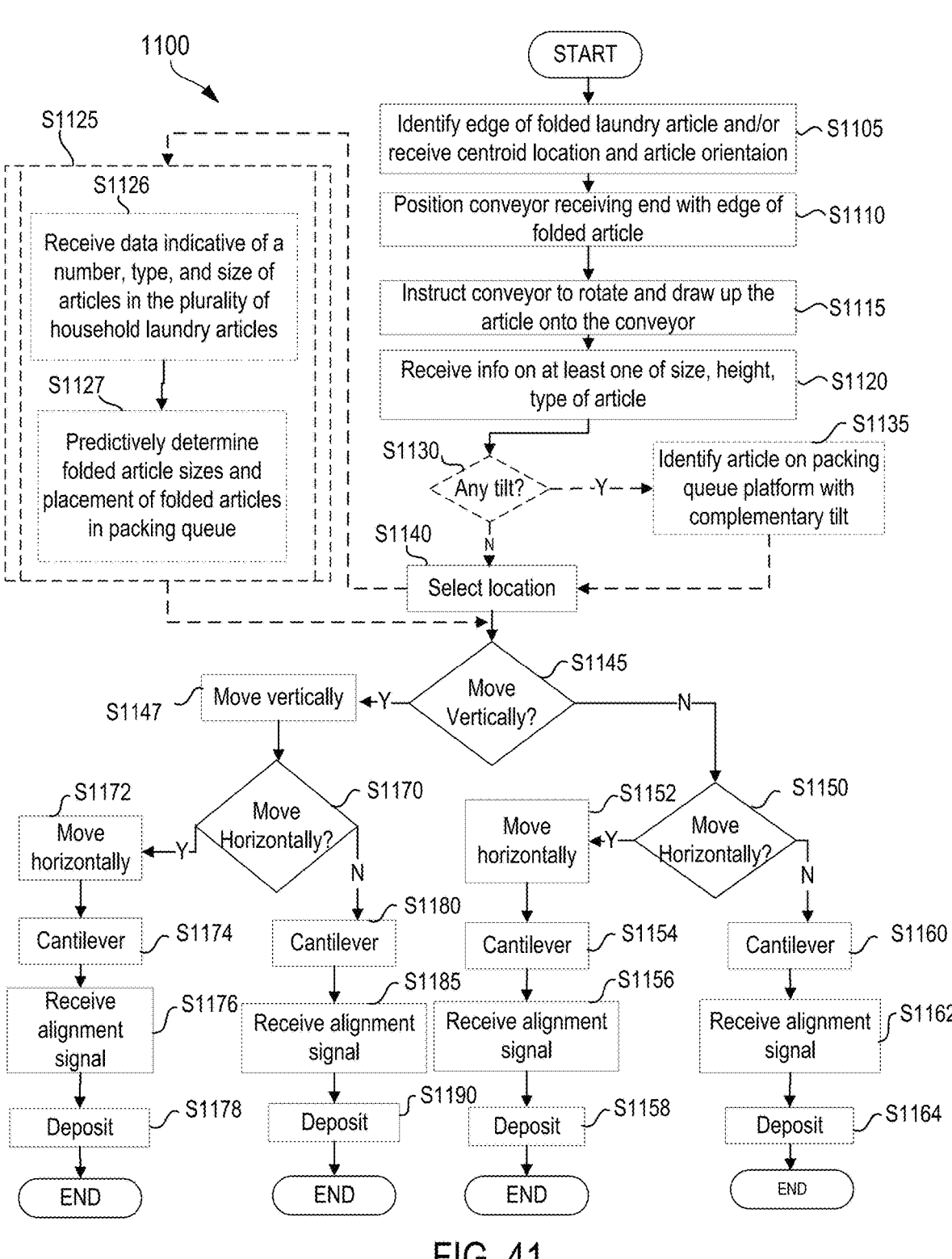
FIG. 41 depicts an example method of intelligently queuing folded household laundry articles for ordered packing into a shipping container for return to a customer household.

Referring now to FIG. 41, any of the examples and implementations described previously with regard to the system 8000 are applicable to implementations described herein with regard to a method 1100 of robotically arranging a plurality of folded household laundry articles in a packing queue. The method 1100 of queuing is configured to be executed autonomously by one or more controllers, and the one or more controllers are configured to be in operative communication with the one or more processors, sensors, and drives of the system 8000 described with regard to all of the preceding implementations. In examples, the one or more controllers are configured to communicate with each device of the system 8000 over a communication network 230 via at least one of wired and wireless communication protocols.

In implementations, the method 1100, comprises at least one of identifying S1105 an edge of a folded laundry article disposed on a surface and receiving a location of a centroid and an orientation of a bounding rectangle of the article from a sensor of a previous robot, such as the folding device 7000. In implementations, the determination is based on a sensor signal of one or more sensors disposed proximate an orienter or folding table as described previously with regard to implementations. In implementations, the controller is configured to instruct the orienter to rotate the folded article there on to orient a forward edge for retrieval by a placer conveyor. In implementations, the forward edge comprises at least one of a fold bend and a thickness complementary to a matching depth of a sloped surface of a queued article or stack of articles on which the folded article will be deposited to create a non-leaning top surface of a stack. The method comprises positioning S1110 a retrieving end of a conveyor 8855 in contact with the identified edge E of the folded laundry article 7300, rotating S1115 a conveyor surface in contact with the edge E of the folded laundry article 7300 to retrieve the folded laundry article onto the conveyor 8855 and position the folded article adjacent a depositing end, and receiving S1120 data indicative of at least two of an area footprint of the folded laundry article, an orientation of the area footprint relative to a longitudinal axis of the packing queue, a height of the folded laundry article, and an article type. Additionally, retrieving the folded laundry article 7300 comprises circulating a conveyor belt 8854 to pull the article up onto the conveyor 8855 at the same time that the cantilever drive motor 8865 pushes the conveyor 8855 receiving end 8856 under the folded laundry article 7300 such that the folded laundry article 7300 remains stationary as the conveyor 8855 retrieves it. The conveyor 8855 thus rotates itself under the folded laundry article while pulling the folded laundry article up onto the conveyor therefore avoiding unfolding the bottom folded layers, which would occur just pulling the folded laundry article in place.

Optionally the method comprises determining S1130 whether the folded article has a sloped (e.g., tilted) top surface (e.g., uneven thickness) and identifying S1135 an article on the packing queue platform comprising a complementary tilt. Additionally or alternatively, in implementations, tilt matching can be done at the orienter before the conveyor retrieves the folded laundry article 7300. For example, the controller 8005 could first select a queue location based on other criteria (e.g., article size or type category, e.g., pants, shirts, dresses, etc.), and then determine based on a received sensor signal whether any existing folded laundry article or stack of folded laundry articles at the queue location are tilted. The orienter can then rotate the folded laundry article to give it a complementary tilt prior to retrieval and deposition by the conveyor 8855.

The method comprises selecting S1140, based on the received data, a queue location along a length of a packing queue platform at which to deposit the folded laundry article, moving S1145, S1157, S1150, S1152, S1170, S1172 the conveyor 8855 at least one of vertically and laterally to align the depositing end with the predetermined position along the length of the packing queue platform 8200, and cantilevering S1174 the depositing end of the conveyor over the packing queue platform to deposit S1178 the folded laundry article into the packing queue at the predetermined position.

Optionally, the method comprises selecting S1125 the location by receiving S1126 data indicative of a number of articles, article types, and articles sizes in the plurality of household laundry articles and predictively determining folded article area footprints and ordered placement of the folded laundry articles in the packing queue. As previously described with regard to implementations, the method comprises tracking the heights of the queue articles 7300 or stacks 7301 of articles on the queue platform and establishing their order along the parallel queues $Q_{1-2}$ for optimized filling of the refillable cartridge 8100. For example, the one or more unbound folded laundry articles 7300a-n can be queued in stacks of known heights. The method comprises calculating an appropriate number of stacks to insert into the refillable cartridge 8100 to optimize filling the container 7800 with as little empty space as possible and without exceeding the hold volume of the container 7800. In implementations, this calculation can be based, at least in part, on information communicated by a controller of a previous robot, e.g., the dirty laundry separating robot 3000, about the quantity of article sizes and/or types in a load of laundry. Additionally or alternatively, the controller 8005 is configured to queue folded laundry articles and stacks of folded laundry articles on the queue conveyor 8200 until a sum total of the stacks queued would fill the container. Stacking on the queue conveyor 8200 is then paused, and the queued stacks 7301 and/or articles 7300 are then loaded into the container. This has the benefit of not needing information about which articles are arriving next on the queue conveyor 8200.

In implementations, the method comprises an orienter preceding the conveyor receiving the folded laundry article from an autonomous folding device and rotating the folded laundry article such that the edge is oriented substantially parallel to the retrieving end. In implementations, the received data is configured to be processed by at least one controller in communication with one or more sensors disposed proximate at least one of the autonomous folding device and the orienter. The one or more sensors comprise an optical sensor. In implementations, the optical sensor comprises at least one of a 3-D camera, an IR sensor, a 2-D camera, LIDAR, LADAR, a sonar proximity sensor, an ultrasonic ranging sensor, a radar sensor, and a pair of stereo depth cameras. Identifying the edge of the folded laundry article comprises detecting with the one or more sensors a position and location of the edge relative to a known retrieving end orientation and location.

In implementations, as described previously with regard to implementations, the received data is configured to be communicated via a wired or wireless communication network 230 to at least one controller 8005 in operable communication with one or more drives of the conveyor 8855, a conveyor cantilever motor 8865, and a conveyor gantry 8860. In implementations, the method further comprises executing, by the at least one controller 8005, a set of instructions in operable communication with the drives and one or more position sensors. In implementations, the retrieving end and the depositing end are substantially parallel to a longitudinal axis LQ of the packing queue platform 8200, and the one or more drives comprises an elevator drive configured to raise and lower the conveyor vertically and a cantilever drive configured to slide the conveyor forward and backward toward and away from the packing queue platform. The cantilever drive is in operable communication with a cantilever drive motor 8865 configured to engage a support carriage 8870 of the conveyor 8855. In implementations, positioning further comprises instructing at least one of an elevator drive and a cantilever drive to position the retrieving end at a height in a range of between about 0.1 mm to 7 mm above the surface.

In implementations, the one or more drives of the conveyor gantry comprises a linear drive configured to move the conveyor laterally along a fixed rail or rails 8864a-b to the selected queue location, and the fixed rail is substantially parallel to the packing queue platform. In implementations, the method further comprises receiving an output signal from at least one positional encoder determinative of a relative position of the conveyor 8855 along a length of the fixed rail. In implementations, the positional encoder comprises a motor encoder with a re-calibrating limit switch at at least one extreme end of the gantry travel along the gantry rails 8864a-b.

In implementations, depositing the folded laundry article into the packing queue further comprises cantilevering the depositing end of the conveyor 8855 over the platform 8200 at a selected queue location and instructing a conveyor drive to rotate the conveyor surface. The method further comprises receiving a sensor signal indicative of the folded laundry article being proximate the depositing end and reversing the cantilevering direction. The sensor signal comprises an output of one or more sensors disposed at least one of on the conveyor gantry and proximate the packing queue platform. In implementations, the one or more sensors comprise an optical sensor. The optical sensor comprises at least one of a 3-D camera, an IR sensor, a 2-D camera, LIDAR, LADAR, a sonar proximity sensor, an ultrasonic ranging sensor, a radar sensor, and a pair of stereo depth cameras.

In implementations, depositing the folded laundry article 7300 into the packing queue Q comprises at least one of depositing the folded laundry article onto the packing queue platform and depositing the folded laundry article atop at least one other of the plurality of folded household laundry articles disposed on the packing queue platform. In implementations, depositing further comprises instructing at least one of an elevator drive and a cantilever drive to position the depositing edge at a height in a range of between about 5 mm to 75 mm above a surface of either the packing queue platform 8200 or the at least one other of the plurality of folded household laundry articles 7300 disposed on the packing queue platform. Aligning the depositing end with the selected queue location along the length of the packing queue platform further comprises aligning the depositing end with a top surface of the at least one other of the plurality of folded household laundry articles. As previously described with regard to implementations, depositing further comprises identifying, based on the received sensor signal, at least one of an area footprint and a centroid of the at least one other of the plurality of folded laundry articles, and the method further comprises determining, based on the received sensor signal, a centroid of the folded laundry article and depositing the at least one folded laundry article atop the at least one other of the plurality of folded laundry articles such that the centroids align. In implementations, the method further comprises depositing the folded laundry article atop the at least one other of the plurality of folded laundry articles such that the area footprint of the folded laundry article aligns with the area footprint of the at least one other of the plurality of folded laundry articles.

Depositing further comprises detecting, based on the received sensor signal, a sloped receiving surface of the at least one other folded laundry article and depositing thereon a folded laundry article comprising an oppositely sloped top surface. In implementations, the controller is further configured, based on a received sensor signal indicative of a tilted stack of folded laundry articles disposed on the queue platform, to instruct an orienter to rotate a folded laundry article such that a tilt of the folded laundry article is opposite that of the tilted stack of folded laundry articles.

In implementations, the method further comprises detecting, based on the received sensor signal, a height of a stack comprising the folded laundry article and at least one other of the plurality of folded household laundry articles. The method comprises lowering one or more compression plungers disposed on the conveyor gantry, the one or more compression plungers being configured to compress the stack. In any of the implementations, the method comprises calculating a final stack height based on received data indicative of a height of the folded laundry article and a detected height of the at least one other of the plurality of folded household laundry articles and determining the final stack height will not exceed a threshold height range. The threshold height for stability comprises a range of between about 25 cm to 65 cm. Additionally or alternatively, the controller 8005 is configured to determine one stack's height based on the heights of other stacks in the queue so that heights of loaded stacks on either side of the queue $Q_{a-b}$ are complementary and are stacked side by side in a stable configuration during and after loading. The controller 8005 thus keeps track of an overall sum of stack heights in the queue and determines individual stack heights accordingly.

In implementations, the stack is one of a plurality of stacks disposed on the packing queue platform. The queue platform comprises two parallel conveyors and the plurality of stacks are laterally spaced and staggered between near and far ones of the two parallel conveyors. In implementations, each pairing of staggered stacks comprises substantially even stack heights. Additionally or alternatively, each pairing of staggered stacks can be of the same category such that individual articles can be added to either side of the queue $Q_{a-b}$ to keep the overall stack sums even in height. The plurality of stacks can be laterally spaced between adjacent predetermined locations such that the conveyor cantilevered above the queue platform avoids contacting one or more adjacent stacks. In implementations, the lateral spacing is at least 8 mm.

In implementations, the packing queue platform comprises at least one movable conveyor configured to move a plurality of folded laundry articles thereon toward a packing cartridge. In implementations, the folded laundry article area footprint comprises one of a plurality of predetermined folded article area footprints. In implementations, selecting a packing queue location comprises selecting from a plurality of predetermined locations along the packing queue platform at which to deposit the folded laundry article as described previously with regard to implementations.

In implementations, the received data comprises an article type and an article size of the folded laundry article and one or more article types and one or more article sizes of each of the plurality of household laundry articles to be folded subsequently. In implementations, the one or more article types and one or more articles sizes of the plurality of household laundry articles are detected by sensors of one or more preceding autonomous devices comprising at least one of an autonomous folding device and at least one autonomous separating device configured to separate individual items from the plurality of household laundry articles. In implementations, selecting a queue location comprises receiving from a controller in operable communication with the one or more preceding autonomous devices a predetermined queue location for each one of the plurality of household laundry articles based on detected quantities of each article type and size preceding the packing queue platform and a predicted folded article area footprint for each one of plurality of household laundry items.

In implementations, the plurality of folded laundry articles are sorted into at least one of article type and area footprint on the queue platform and the at least one of article type, and the area footprint is duplicated in each one of two parallel queues disposed on the queue conveyor such the each one of the plurality of folded household laundry articles can be placed in either of the two parallel queues. In implementations, the method further comprises sorting the plurality of folded household laundry articles during loading onto the packing queue platform based on a cumulative height of each of the two parallel queues from a refillable cartridge end to an opposite end of the queue. The queue platform comprises at least one extendible conveyor portion configured to move a plurality of folded laundry articles thereon toward a packing cartridge.

In implementations, the packing queue platform comprises a movable conveyor configured to move a plurality of folded laundry articles thereon toward a packing cartridge.

In implementations, the folded laundry article area footprint comprises one of a plurality of predetermined folded article area footprints.

In implementations, the folded laundry article is one of the plurality of folded household laundry articles. The plurality of folded household laundry articles comprises household laundry belonging to a common household. In implementations, the household laundry comprises two or more article types of at least one of different sizes and different shapes. Each of the two or more article types comprises a longest dimension of between about 4 cm to 500 cm.

In implementations, the surface comprises a folding surface of an autonomous folding device, and the autonomous folding device is configured to rotate the folded laundry article such that the edge is substantially parallel to the retrieving end of the conveyor.

In implementations, the surface comprises a conveyor configured to retrieve the folded laundry article from an autonomous folding device, and the autonomous folding device is configured to rotate the folded laundry article such that the edge is substantially parallel to the retrieving end of the conveyor.

In implementations, the surface comprises a stationary platform on to which the folded laundry article is disposed from an autonomous folding device, and the autonomous folding device is configured to rotate the folded laundry article such that the edge is substantially parallel to the retrieving end of the conveyor.

In implementations, the packing queue platform comprises at least one conveyor.

In implementations, the packing queue platform comprises two or more vertically stacked platforms.

In implementations, the packing queue platform comprises two or more end abutted platforms.

All of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors or circuitry or collection of circuits, e.g., a module) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips and/or magnetic disks, into a different state.

Although the subject matter contained herein has been described in detail for the purpose of illustration, it is to be understood that such detail is solely for that purpose and that the present disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

Other examples are within the scope and spirit of the description and claims. Additionally, certain functions described above can be implemented using software, hardware, firmware, hardwiring, or combinations of any of these. Features implementing functions can also be physically located at various positions, including being distributed such that portions of functions are implemented at different physical locations.

What is claimed is:

1. A system for autonomously stacking a plurality of folded laundry articles on a packing queue platform, comprising:

the packing queue platform configured to receive thereon the plurality of folded laundry articles in one or more stacks for loading into a container;

a conveyor configured to deposit a folded laundry article of the plurality of folded laundry articles along a length of the packing queue platform at least one of on the packing queue platform and atop a previously deposited one or more folded laundry articles of a plurality of laundry articles in a stack;

a vertically actuated elevator coupled to the packing queue platform, the vertically actuated elevator configured to raise and lower the conveyor affixed to the vertically actuated elevator and configured to transit the conveyor along the length of the packing queue platform;

one or more sensors disposed adjacent at least one of the packing queue platform and the vertically actuated elevator, the one or more sensors being configured to detect a height of a folded laundry article disposed on the conveyor and a height of the previously deposited one or more folded laundry articles on the packing queue platform; and a controller in operable communication with a conveyor drive configured to rotate a surface of the conveyor, an elevator drive of the vertically actuated elevator configured to raise and lower the conveyor vertically, a cantilever drive configured to slide the conveyor forward and backward toward and away from the packing queue platform, a rail drive configured to move the conveyor laterally along the length of the packing queue platform, and the one or more sensors, the controller being configured to receive an output signal from the one or more sensors determinative of the height of the folded laundry article disposed on the conveyor and the height of the previously deposited one or more folded laundry articles, determine whether the height of the previously deposited one or more folded laundry articles is short enough to receive the folded laundry article from the conveyor in a stack having a final height that does not exceed a threshold height;

deposit the folded laundry article, upon determining the previously deposited one or more folded laundry articles are short enough to receive the folded laundry article in a stack without the final height exceeding the threshold height, atop the previously deposited one or more folded laundry articles; and deposit the folded laundry article atop the previously deposited one or more folded laundry articles and compress the stack to at or below the threshold height for compact loading into the container upon determining the final height of the stack is not short enough to receive the folded laundry article by a buffer height in a range of between about 5 to 15 cm.

2. The system of claim 1, wherein the controller is further configured to instruct the elevator drive and the cantilever drive to compress the stack by cantilevering the conveyor over the packing queue platform and lowering the conveyor to press a bottom surface of the conveyor against a top surface of the stack.

3. The system of claim 1, further comprising one or more driven compression plungers in operable communication with the controller, the one or more driven compression plungers being configured to compress the stack of folded laundry articles on the packing queue platform.

4. The system of claim 3, wherein the one or more driven compression plungers are disposed on at least one of the vertically actuated elevator and the packing queue platform, and at least one of the one or more sensors comprises a position sensor disposed on or proximate the one or more driven compression plungers.

5. The system of claim 4, wherein the position sensor is configured to sense a height the previously deposited one or more folded laundry articles on the packing queue platform and output a signal indicative of the height to the controller.

6. The system of claim 4 wherein the position sensor comprises at least one of an encoder on a drive motor of the one or more driven compression plungers and a distance sensor measuring the height of at least one of the one or more driven compression plungers from some fixed point.

7. The system of claim 4, wherein the position sensor comprises an optical distance sensor mounted above the one or more driven compression plungers configured to measure at least one of the height of the one or more driven compression plungers and the height of the previously deposited one or more folded laundry articles on the packing queue platform.

8. The system of claim 4, wherein the one or more sensors comprise at least one position sensor disposed about the packing queue platform, such as point cloud sensors and other cameras configured to detect a depth.

9. The system of claim 1, wherein the one or more sensors comprise at least one of one or more point cloud sensors and one or more cameras configured to detect a depth.

10. The system of claim 1, wherein depositing the folded laundry article atop the previously deposited one or more folded laundry articles further comprises the controller being configured to instruct the elevator drive to position a depositing end of the conveyor at a height in a range of between about 5 mm to 75 mm above a surface of the previously deposited one or more folded laundry articles disposed on the packing queue platform;

instruct the cantilever drive to cantilever the depositing end of the conveyor over the packing queue platform, and instruct simultaneously, upon receiving a sensor signal from the one or more sensors indicative of the folded laundry article being proximate the depositing end, the conveyor drive to rotate the surface of the conveyor and the cantilever drive to withdraw the depositing end to deposit the folded laundry article in the stack atop the previously deposited one or more folded laundry articles.

11. The system of claim 1, wherein the plurality of folded laundry articles comprises at least one of two or more types of laundry articles and two or more sizes of laundry articles.

12. The system of claim 1, wherein the plurality of folded laundry articles comprises two or more article types of at least one of different sizes and different shapes, wherein each of the two or more article types comprise a longest dimension of between about 4 cm to 500 cm, and wherein a plurality of folded laundry articles comprises laundry articles belong to a common household.

13. The system of claim 1, wherein the plurality of folded laundry articles are unbound and not wrapped, sealed, restrained, or fastened in any way.

14. A method of autonomously stacking and compressing a plurality of unbound folded laundry articles in a packing queue, comprising:

receiving, at a controller, an output signal from one or more sensors determinative of a height of an unbound folded laundry article of the plurality of unbound folded laundry articles disposed on a conveyor configured to cantilever over a packing queue platform and deposit the unbound folded laundry article thereon atop one or more previously deposited unbound folded laundry articles disposed on the packing queue platform;

receiving an output signal from the one or more sensors determinative of a height of the one or more previously deposited unbound folded laundry articles disposed on the packing queue platform;

calculating a final stack height based the height of the unbound folded laundry article and the height of the one or more previously deposited unbound folded laundry articles;

determining the final stack height will not exceed a threshold height by more than a buffer height, wherein the buffer height comprises a range of between about 5 to 15 cm;

depositing in a stack the unbound folded laundry article atop the one or more previously deposited unbound folded laundry articles upon determining the final stack height will not exceed a threshold height by more than a buffer height; and compressing the stack to a final stack height at or below the threshold height for compact loading into a container.

15. The method of claim 14, further comprising lowering one or more compression plungers disposed on a conveyor gantry, the one or more compression plungers being configured to compress the stack to at or below the threshold height.

16. The method of claim 14, further comprising instructing a vertical elevator drive of the conveyor and a cantilever drive of the conveyor to compress the stack by cantilevering the conveyor over the packing queue platform and lowering the conveyor to press a bottom surface of the conveyor against a top surface of the stack.

17. The method of claim 14, wherein depositing the unbound folded laundry article atop the one or more previously deposited unbound folded laundry articles further comprises the controller being configured to instruct a vertical elevator drive to position a depositing end of the conveyor at a height in a range of between about 5 mm to 75 mm above a surface of the one or more previously deposited unbound folded laundry articles disposed on the packing queue platform;

instruct a cantilever drive to cantilever the depositing end of the conveyor over the packing queue platform, and instruct simultaneously, upon receiving a sensor signal from the one or more sensors indicative of the unbound folded laundry article being proximate the depositing end, a conveyor drive to rotate the surface of the conveyor and the cantilever drive to withdraw the depositing end to deposit the unbound folded laundry article in the stack atop the one or more previously deposited unbound folded laundry articles.

18. The method of claim 14, wherein the plurality of unbound folded laundry articles comprises at least one of two or more types of laundry articles and two or more sizes of laundry articles.

19. The method of claim 14, wherein the plurality of unbound folded laundry articles comprises two or more article types of at least one of different sizes and different shapes, wherein each of the two or more article types comprise a longest dimension of between about 4 cm to 500 cm, and wherein a plurality of folded laundry articles comprises laundry articles belong to a common household.

20. The method of claim 14 wherein the threshold height comprises a range of 25 cm to 65 cm.

* * * * *